March 17, 1936.  E. A. HOLMGREN  2,034,037
LASTING MACHINE
Filed May 18, 1933    21 Sheets-Sheet 2
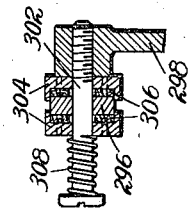
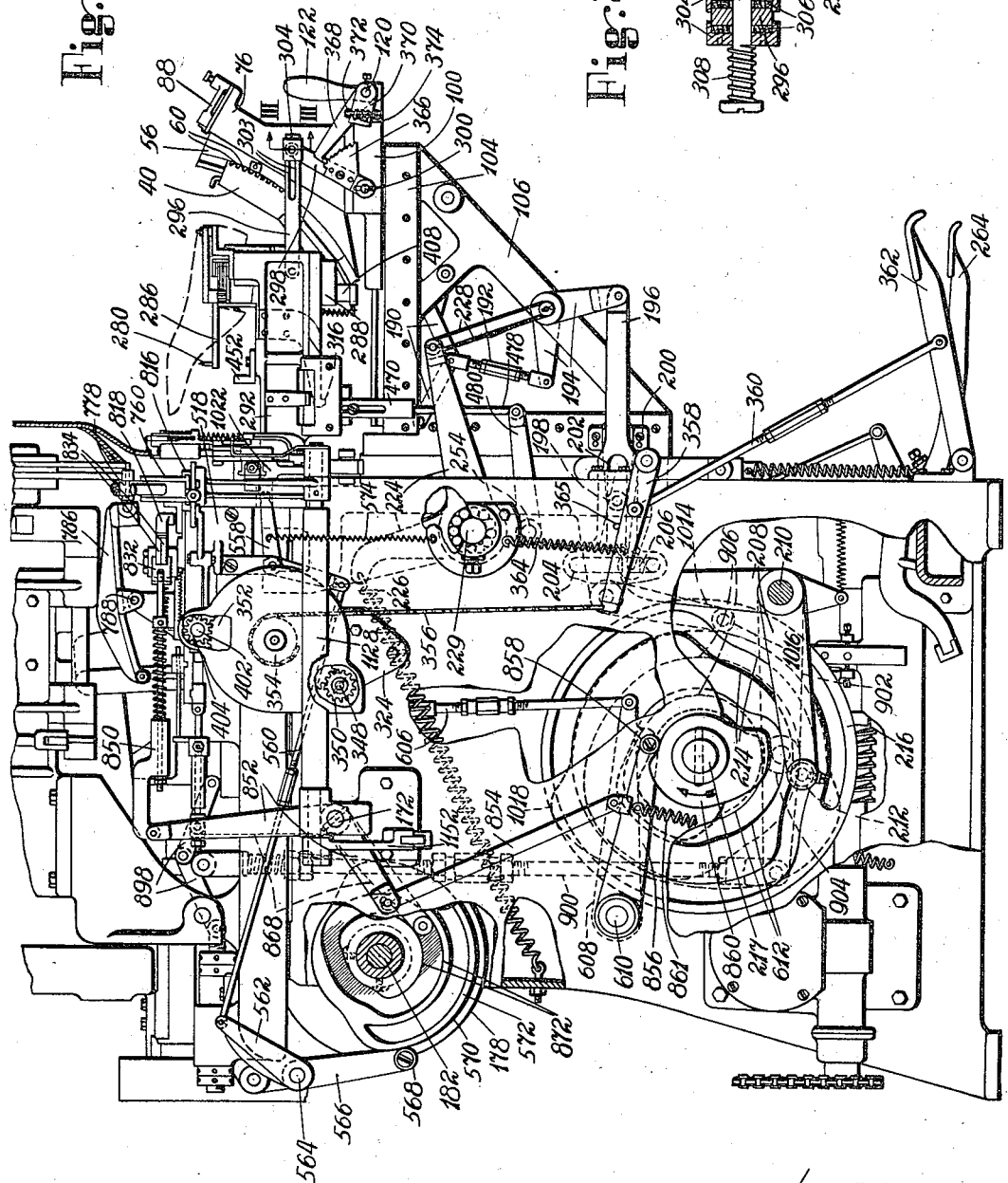
INVENTOR
Eric A. Holmgren
By his Attorney
Harlow M. Davis March 17, 1936.  E. A. HOLMGREN  2,034,037
LASTING MACHINE
Filed May 18, 1933  21 Sheets-Sheet 3

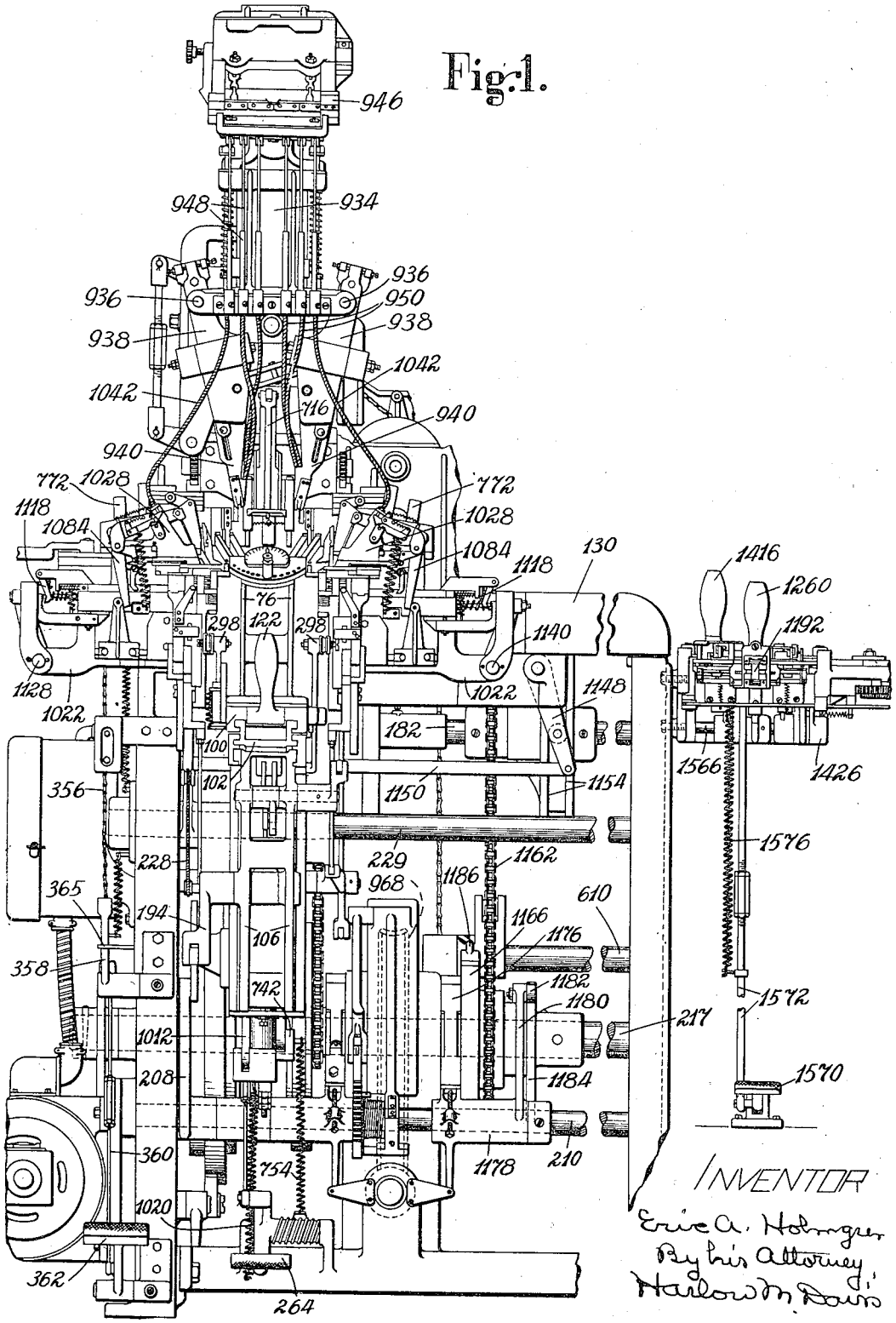

INVENTOR
Eric A. Holmgren
By his Attorney
Harlow M. Davis

March 17, 1936.  E. A. HOLMGREN  2,034,037
LASTING MACHINE
Filed May 18, 1933   21 Sheets-Sheet 4

INVENTOR
Eric A. Holmgren
By his Attorney
Harlow M. Davis

March 17, 1936.　　　E. A. HOLMGREN　　　2,034,037

LASTING MACHINE

Filed May 18, 1933　　　21 Sheets-Sheet 5

INVENTOR
Eric A. Holmgren
By his Attorney
Harlow M. Davis

March 17, 1936. E. A. HOLMGREN 2,034,037
LASTING MACHINE
Filed May 18, 1933 21 Sheets-Sheet 6

INVENTOR
Eric A. Holmgren
By his Attorney
Harlow D. Davis

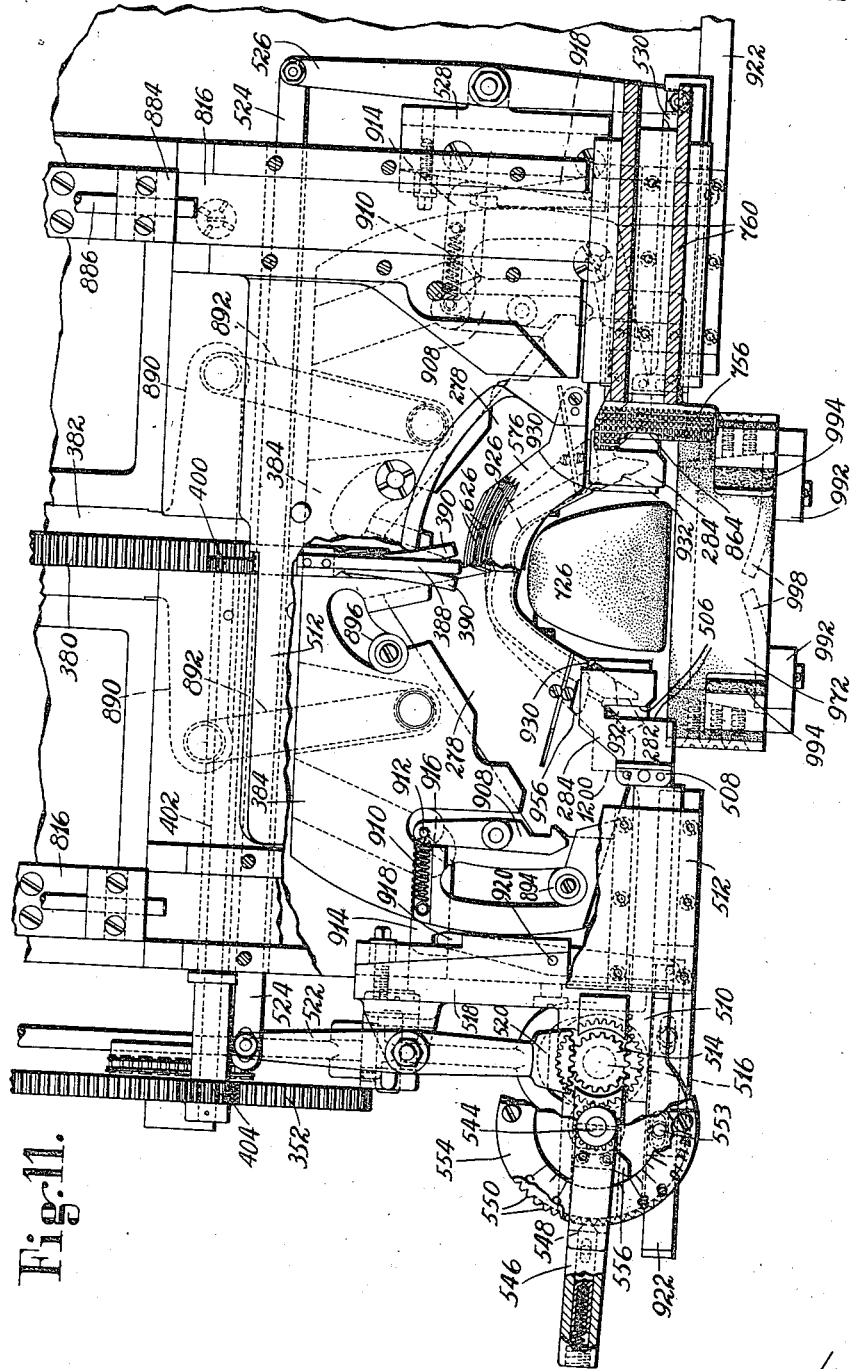

March 17, 1936.  E. A. HOLMGREN  2,034,037
LASTING MACHINE
Filed May 18, 1933  21 Sheets-Sheet 8
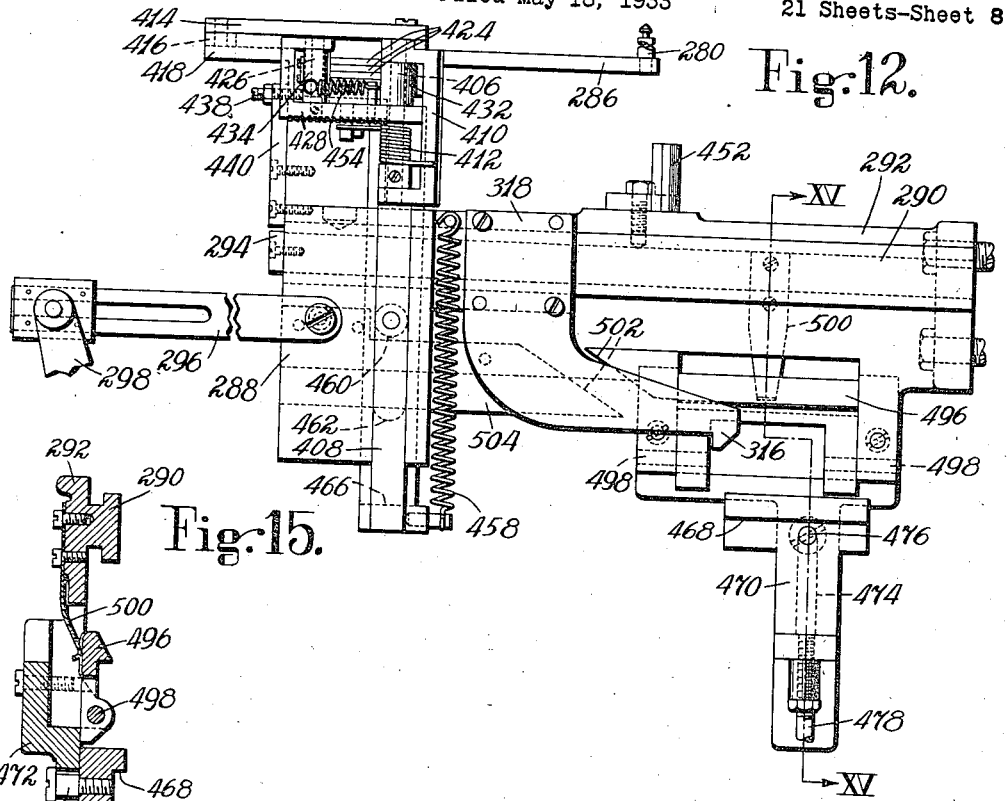
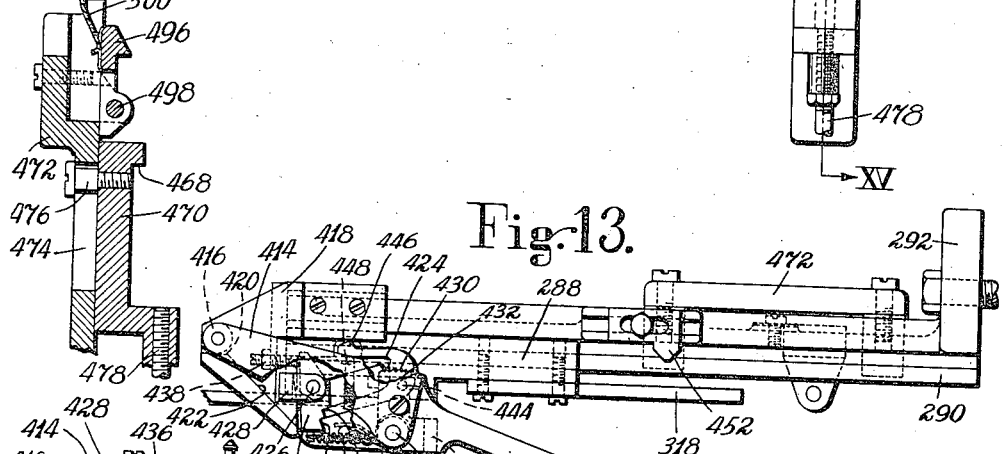
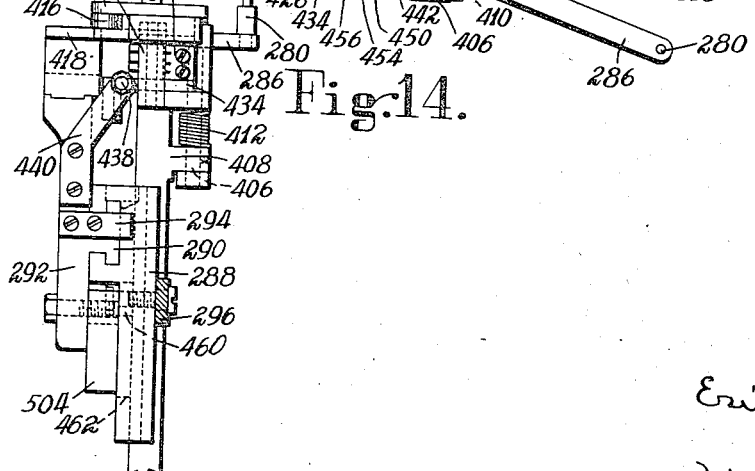
INVENTOR:
Eric A. Holmgren
By his Attorney
Harlow M. Davis March 17, 1936.  E. A. HOLMGREN  2,034,037
LASTING MACHINE
Filed May 18, 1933   21 Sheets-Sheet 9
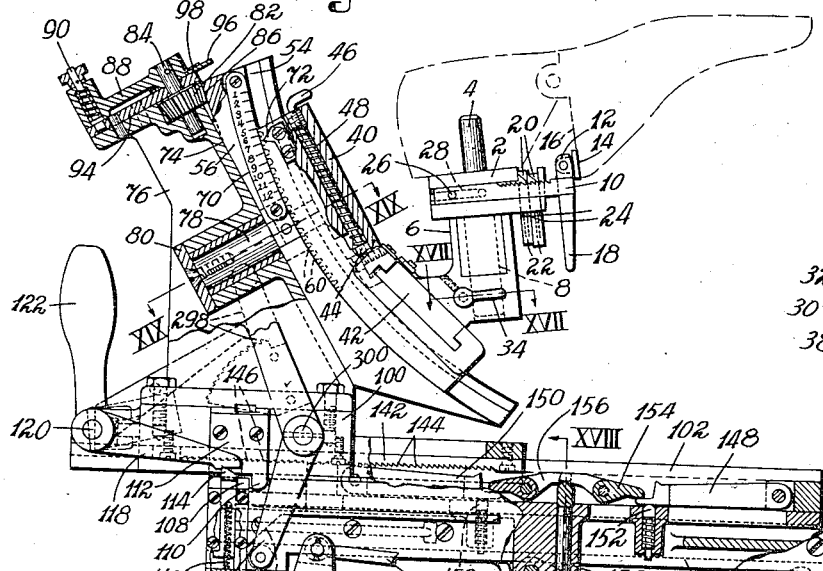
Fig. 16.
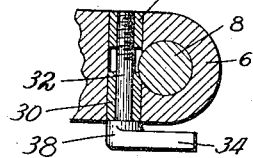
Fig. 17.
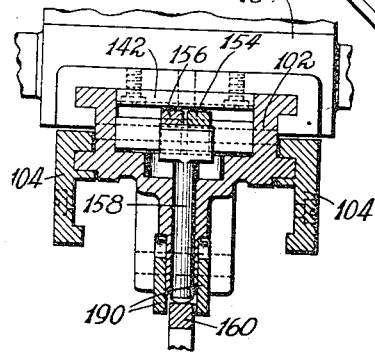
Fig. 18.
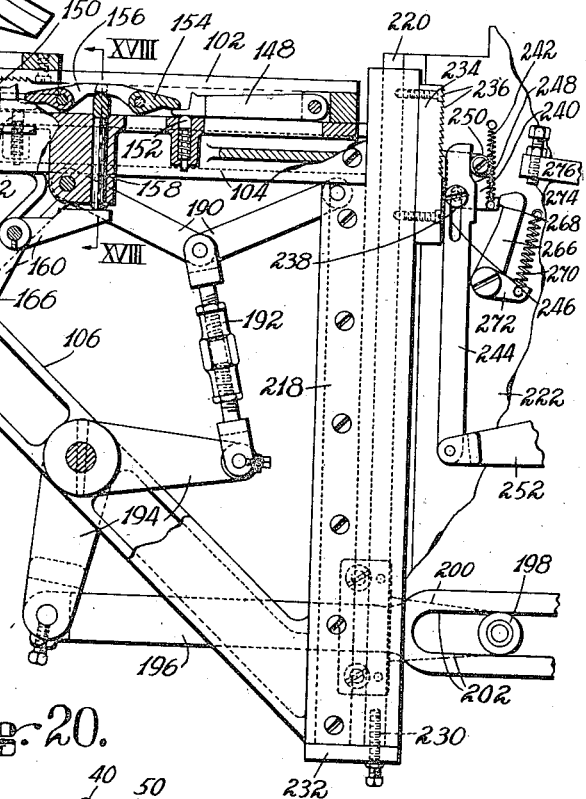
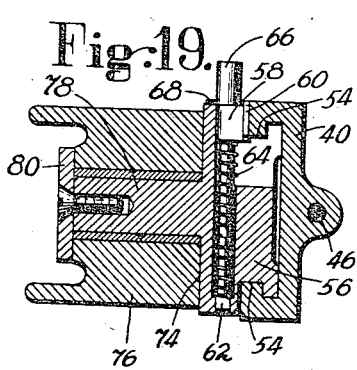
Fig. 19.
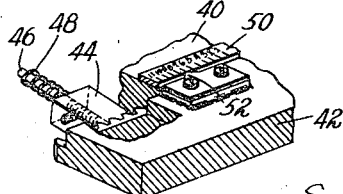
Fig. 20.
INVENTOR
Eric A. Holmgren
By his Attorney
Harlow M. Davis March 17, 1936.  E. A. HOLMGREN  2,034,037
LASTING MACHINE
Filed May 18, 1933    21 Sheets-Sheet 10

INVENTOR
Eric A. Holmgren
By his Attorney
Harlow M. Davis

March 17, 1936. E. A. HOLMGREN 2,034,037
LASTING MACHINE
Filed May 18, 1933 21 Sheets-Sheet 11

INVENTOR
Eric A. Holmgren
By his Attorney
Harlow M. Davis

March 17, 1936.  E. A. HOLMGREN  2,034,037
LASTING MACHINE
Filed May 18, 1933   21 Sheets-Sheet 12

INVENTOR
Eric A. Holmgren
By his Attorney
Harlow M. Davis

March 17, 1936.　　　E. A. HOLMGREN　　　2,034,037
LASTING MACHINE
Filed May 18, 1933　　　21 Sheets-Sheet 13
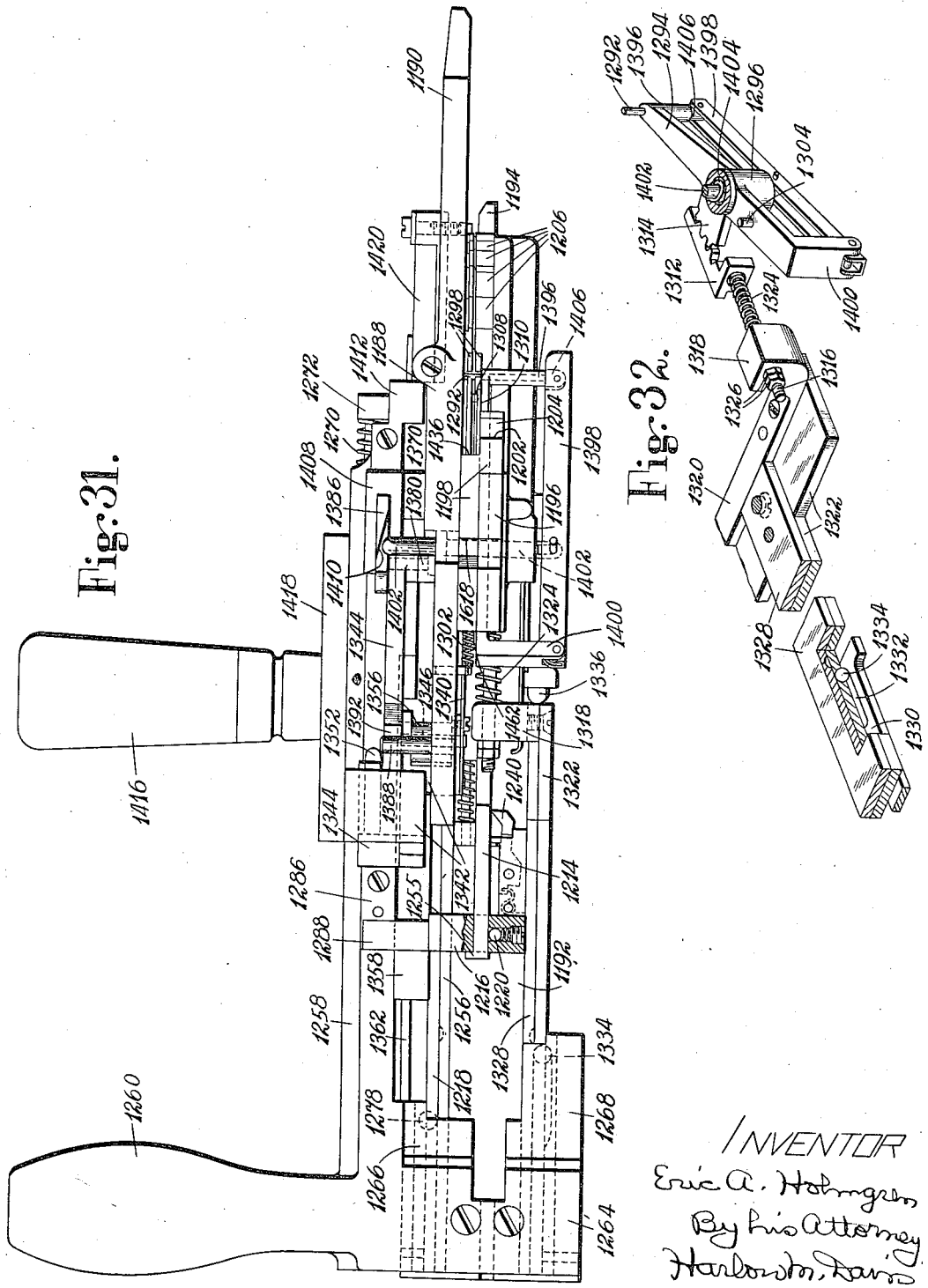

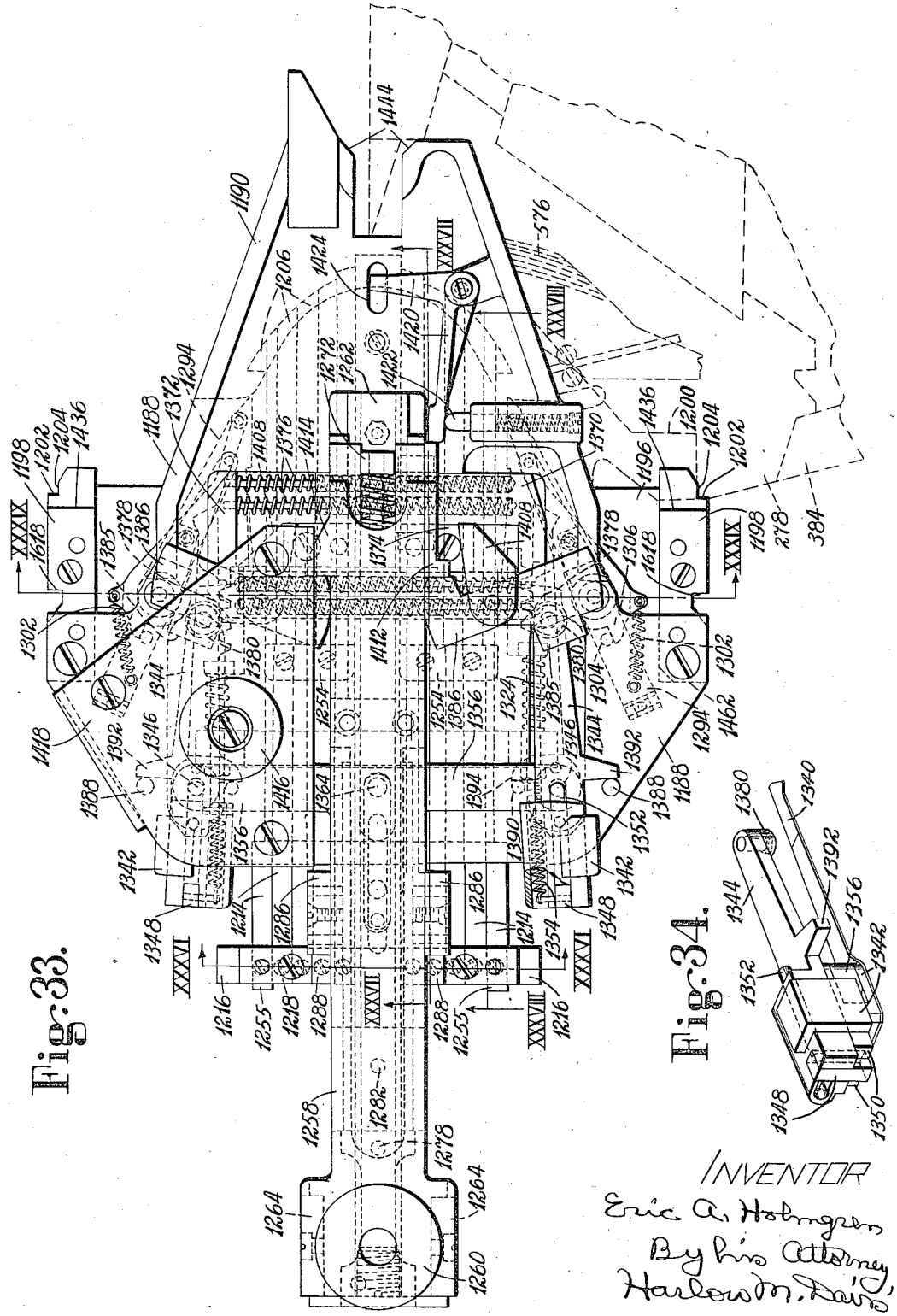

March 17, 1936.  E. A. HOLMGREN  2,034,037
LASTING MACHINE
Filed May 18, 1933  21 Sheets-Sheet 15
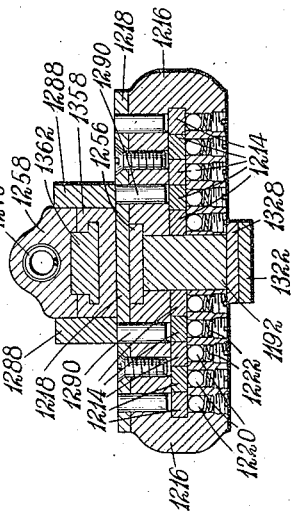
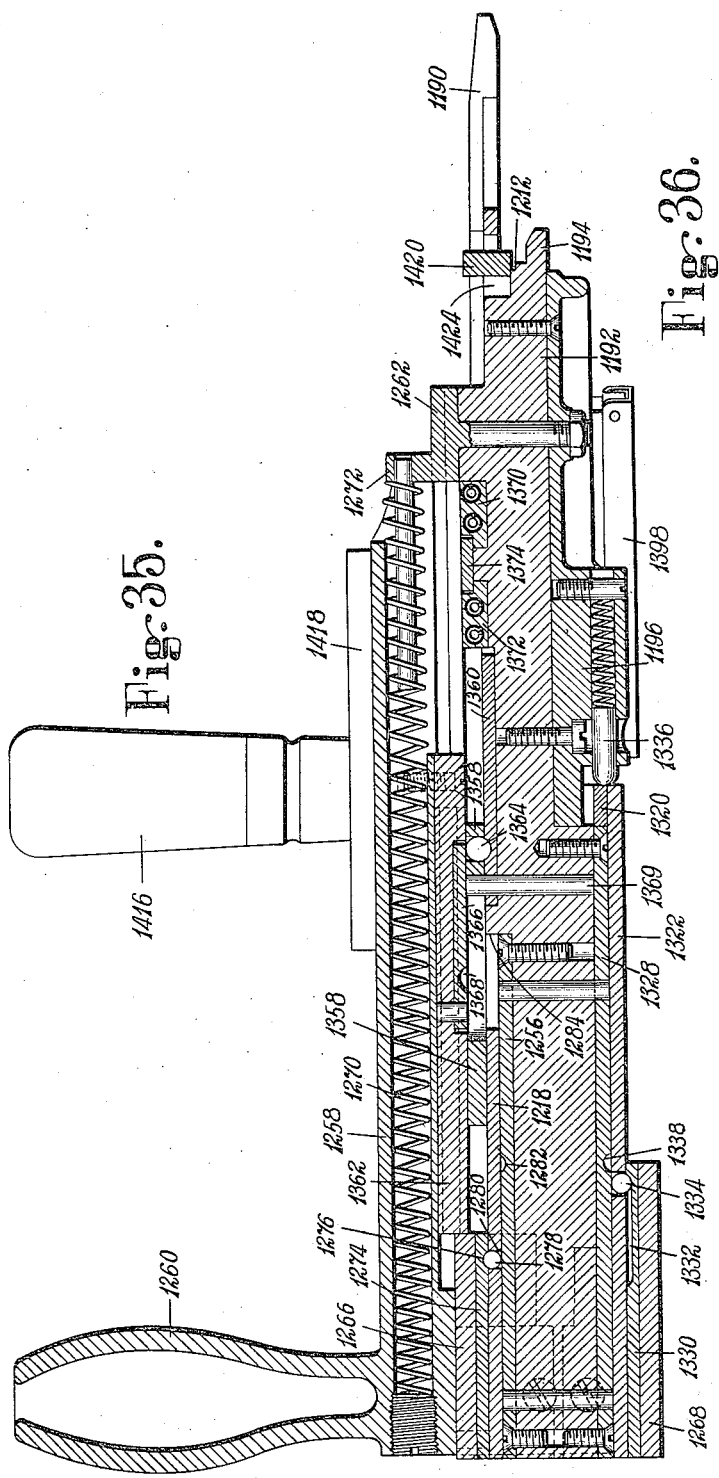
INVENTOR
Eric A. Holmgren
By his Attorney
Harlow M. Davis March 17, 1936.  E. A. HOLMGREN  2,034,037

LASTING MACHINE

Filed May 18, 1933      21 Sheets-Sheet 16

INVENTOR
Eric A. Holmgren
By his Attorney
Harlow M. Davis

March 17, 1936.    E. A. HOLMGREN    2,034,037
LASTING MACHINE
Filed May 18, 1933    21 Sheets-Sheet 17

INVENTOR
Eric A. Holmgren
By his Attorney
Harborow Davis

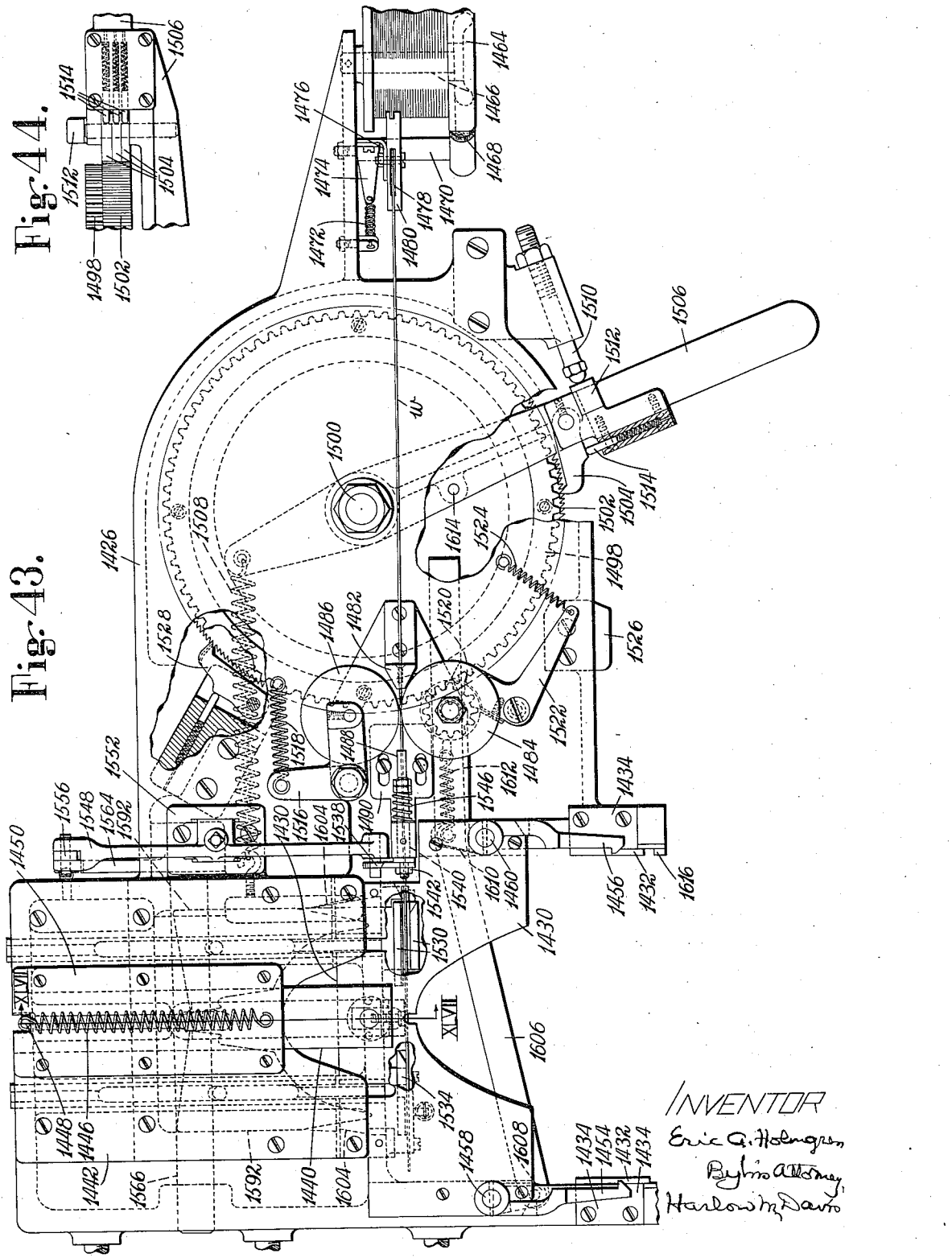

March 17, 1936.　　　　E. A. HOLMGREN　　　　2,034,037
LASTING MACHINE
Filed May 18, 1933　　　21 Sheets-Sheet 19
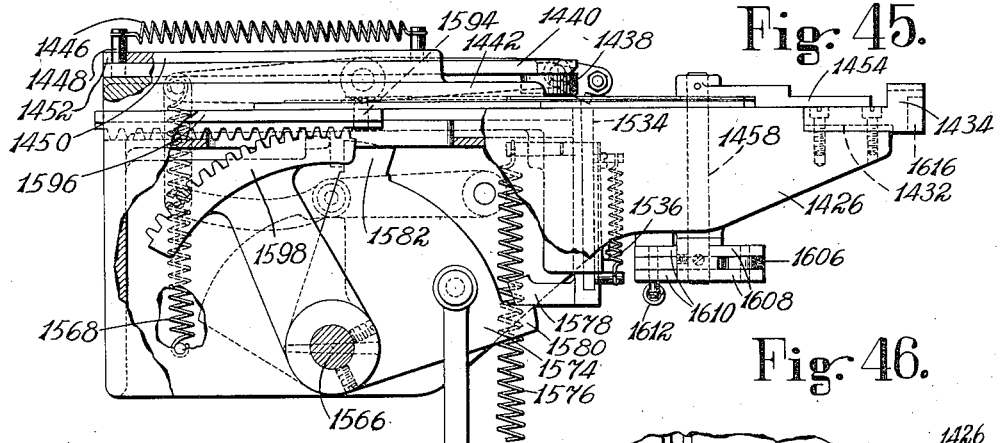
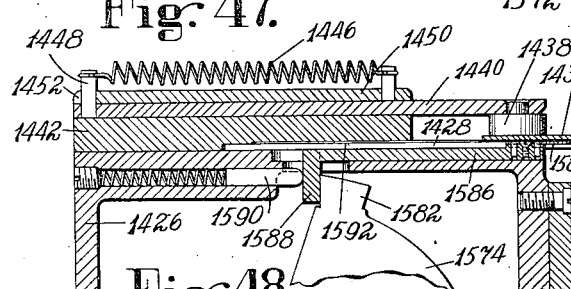
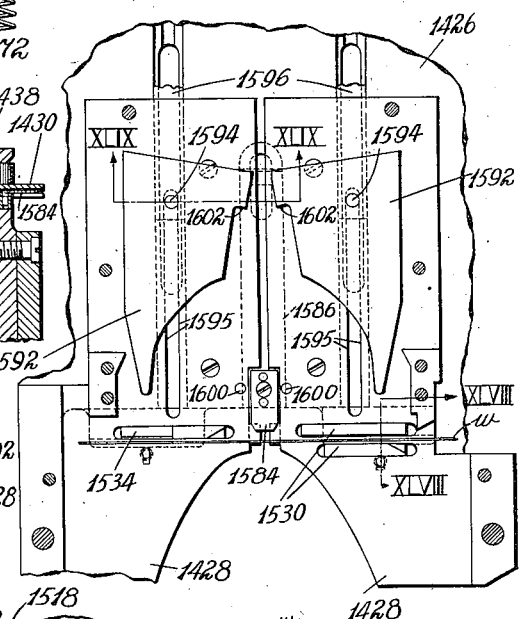
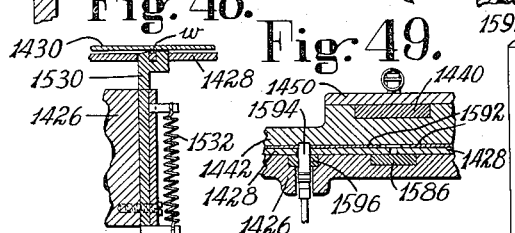
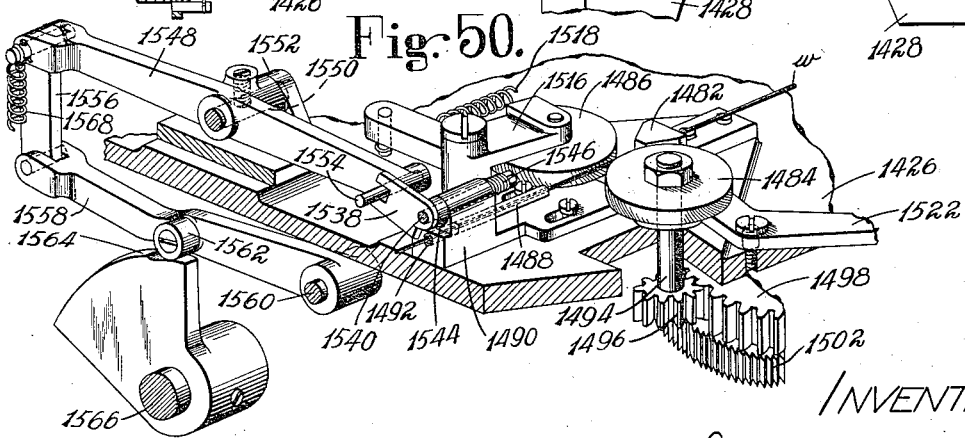
INVENTOR
Eric A. Holmgren
By his Attorney
Harlow M. Davis March 17, 1936.   E. A. HOLMGREN   2,034,037
LASTING MACHINE
Filed May 18, 1933     21 Sheets-Sheet 20

INVENTOR
Eric A. Holmgren
By his Attorney
Harlow D. Davis

March 17, 1936. E. A. HOLMGREN 2,034,037
LASTING MACHINE
Filed May 18, 1933 21 Sheets-Sheet 21
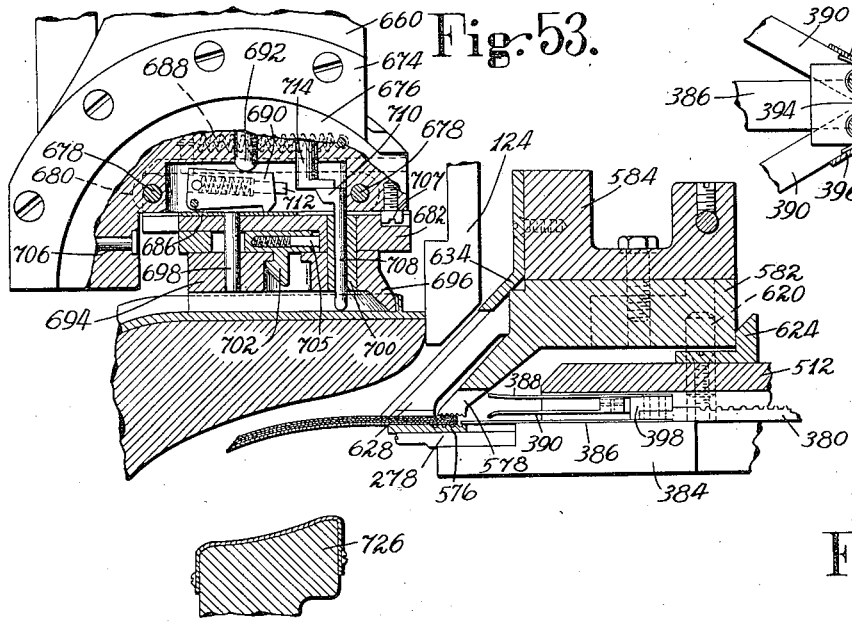
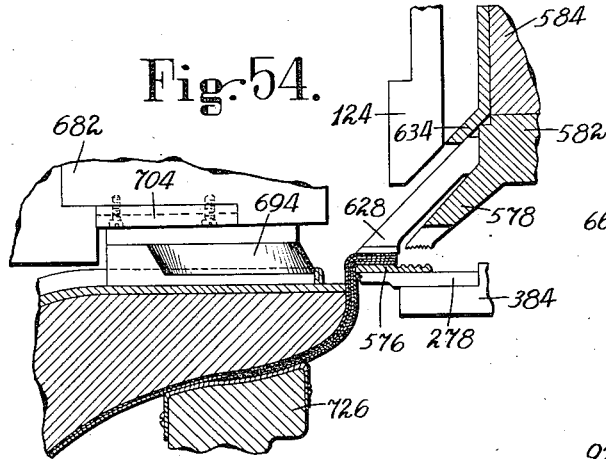
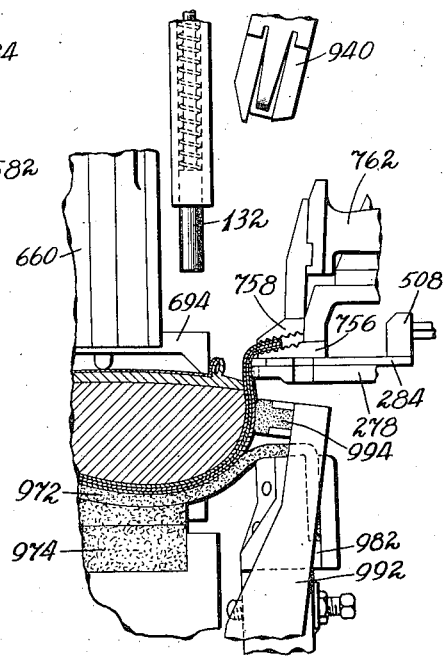
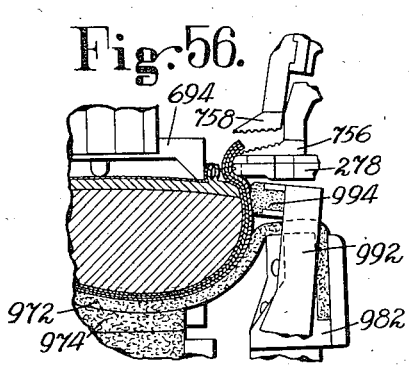
INVENTOR
Eric A. Holmgren
By his Attorney
Harlow M. Davis

UNITED STATES PATENT OFFICE 2,034,037

LASTING MACHINE

Eric A. Holmgren, Lynn, Mass., assignor to United Shoe Machinery Corporation, Paterson, N. J., a corporation of New Jersey Application May 18, 1933, Serial No. 671,664

303 Claims. (Cl. 12—4)

This invention relates to lasting machines, and is herein illustrated as embodied in a machine constructed to operate upon a previously untensioned upper to stretch it lengthwise and then to conform it tightly to the contour of a last at the toe porion and substantially as far rearwardly as the ball line, and also to wipe inwardly and fasten in lasted relation to an insole on the last the margin of the portions of the upper thus operated upon, the invention further being illustrated with reference to the lasting of a shoe of the welt type. In some respects, especially with reference to the toe-lasting means, the machine herein shown is broadly similar in its general organization to a machine shown in Letters Patent No. 1,968,146, granted upon an application of mine on July 31, 1934. It is to be understood, however, that the invention in various novel aspects is not limited to an organization of that character, nor to a machine for lasting the particular portions of a shoe above mentioned or for lasting a welt shoe.

Among its various features the invention provides novel means for pulling or stretching the upper lengthwise before it is conformed to the contour of the forepart of the last, the term "upper" being generally used hereinafter as inclusive of the usual layers of different upper materials. As illustrated, such lengthwise pulling or stretching of the upper is effected by rectilinear movement of a work carrier that supports the last with the upper and an insole mounted thereon and is moved initially by the operator to present the last with its toe end face in a position that is invariable regardless of the size of the last. Thereafter the work carrier is locked to a member that is operated to impart to it automatically an upper-stretching movement of predetermined extent relatively to means that clamps the margin of the toe end of the upper. In the continued operation of the machine herein shown the last is moved heightwise in a rectilinear path, together with its supporting means, to render the lasting means effective to conform the upper tightly to the contour of the toe end of the last.

Novel features of the invention are further to be recognized in the means provided for clamping the margin of the toe end of the upper during the above-described upper-stretching and conforming operations, the construction shown being such that the margin is clamped and held positively during the lengthwise upper-stretching movement of the last, and is clamped yieldingly in such manner as to permit it to slip in response to the pull of the last on the upper as the last receives its heightwise movement. As illustrated, such clamping of the upper positively and yieldingly is effected respectively through different clamp members mounted on a single carrier that is operated at the required time to release the upper from the positive clamping pressure while continuing to clamp it yieldingly, a single positive clamp member being provided and a plurality of yieldable members. The margin of the upper is thus clamped in an outspread position over toe wipers that operate later in the cycle of the machine to wipe it inwardly over the insole; but in the construction shown it is not clamped upon the wipers themselves, but upon a stationary clamp member or plate positioned immediately above the wipers. The above-mentioned carrier, as illustrated, is supported on parallel links for bodily movement both along and toward the plane of the opposed clamping plate to carry the clamp members supported thereon from initial retracted positions toward clamping positions, means being provided for guiding it in a path perpendicular to said plane in the final portion of its movement. The members that clamp the upper yieldingly are thus carried first into engagement with the upper, and as the carrier continues its movement to bring the positive clamp member into clamping position it acts on the yieldable members to force them somewhat outwardly along the surface of the upper toward the edge of the upper. This assists in insuring that the upper materials, including the lining, will lie, when clamped, in a smoothly outspread condition without the presence of objectionable wrinkles. It is to be understood that in the means thus provided for operating and controlling a clamp member or members the invention is not limited to an organization including both yieldable and positive clamp members as herein disclosed.

In general similarity to the machine shown in the above-mentioned Letters Patent, the machine herein shown is provided with grippers that grip the margin of the upper outspread in locations at and near the ends of the tip seam to assist in controlling it in the upper-shaping operation, these grippers being moved inwardly toward the sides of the last and also lengthwise of the last in directions toward its heel end while gripping the upper. The construction herein shown comprises novel means for imparting to the grippers their inward movements and also for moving them lengthwise of the last, provision being afforded for adjustably varying the amount of such movement lengthwise of the last. Mechanism is further provided for preventing any uncontrolled movements of the grippers lengthwise of the last through strain of the upper thereon in the lasting operation, to afford better insurance that the ends of the tip seam will be properly positioned. In accordance with still other novel features, the grippers are moved somewhat inwardly toward each other before gripping the upper, to obtain a better hold on the upper; and in the gripping of the upper one of the jaws of each gripper is so controlled as to insure that the upper will be properly gripped in outspread condition without objectionable displacement or wrinkling of the upper materials.

For imparting to the last its heightwise movement as hereinabove described, there is provided a member that acts on the last through contact with the bottom face of the insole and is so constructed as to engage the inner face of the lip of the insole around the toe to support the lip against the pressure of the toe wipers, this member being moved into contact with the insole before the last receives its lengthwise upper-stretching movement. To insure against damage to the lip, the construction shown is such that this member is carried substantially into contact with the insole in a position in which it is retracted a substantial distance lengthwise of the last from that portion of the lip that extends around the end of the toe and is then moved forwardly into contact with that portion of the lip. As illustrated, such forward movement of the member is effected by spring means released by mechanism that is controlled by contact with the insole. When the last thereafter receives its lengthwise upper-stretching movement, this member is carried along with it by the action of the insole thereon and is thus returned to a position in which it is held by a latch against the force of the spring means. The insole-engaging member, as shown, is carried by a swinging arm relatively to which it is movable about an axis extending widthwise of the last; and in accordance with another feature of the invention, mechanism is provided for determinately varying the position of the member relatively to the arm to maintain it in substantially parallel relation to the bottom face of the insole as it is carried by the arm into engagement with the insole and acts thereafter upon it to impart to the last its rectilinear heightwise movement.

The position of the toe end of each upper in relation to the lasting means is determined by jig pins that engage the upper in jig holes provided therein at the opposite sides of the toe and are moved to positions determined by slots formed in the toe wipers and in adjustable gage plates adjacent to the wipers, substantially as disclosed in the above-mentioned Letters Patent. In the construction herein shown, however, the jig pins are not portable as in the earlier construction, but are mounted on the machine in positions to receive the upper when the work is presented to the machine; and further novel features of the invention are to be recognized in the means provided for supporting and controlling the jig pins. As illustrated, they are presented initially in positions in which they are far enough retracted rearwardly of the toe end face of the last and are near enough together to facilitate the mounting of the upper thereon whatever may be the size of the upper; and as the work carried is moved forwardly by the operator to present the work to the lasting means they are swung yieldingly apart to straighten the upper laterally and are also moved forward relatively to the work carrier to take up any lengthwise slack in the upper. Such forward movement is imparted to the pins by spring-operated mechanism that is advanced by the operator into position to connect with them, this mechanism serving to move them along with the work carrier after taking up the slack in the upper. Additional means, operated by the work carrier, is further provided to assist in completing their movements into upper-presenting positions. In accordance with still other features of the invention, the machine has novel means for withdrawing the jig pins from the upper and for controlling their return to starting positions.

To assist in guiding the outspread toe portion of the upper into proper relation to the lasting means during the work-presenting movement of the work carrier, the invention further provides a novel guiding device comprising, as shown, members that support and control the extreme toe end of the upper. This device is connected to the above-mentioned spring-operated mechanism that imparts forward movement to the jig pins, and is advanced into upper-supporting position as that mechanism is moved by the operator to connect it with the jig pins. Thereafter, as the work carrier and the jig pins receive their movements to present the upper to the lasting means, the upper-guiding device is moved along with them while supporting and controlling the toe end of the upper.

For fastening the toe portion of the upper in lasted relation to the lip of the insole, the machine is constructed, in accordance with a further feature of the invention, to apply around the toe an upper-holding binder having loops at its ends and to drive fastenings through the loops to fasten the binder to the shoe. As illustrated, the binder is positioned in a groove in the edges of the toe wipers and is accordingly applied to the upper by the wipers, the loops being located in alinement with notches provided in the edges of the wipers to receive the fastenings. These binder-holding fastenings, and also two others that are utilized to fasten the upper rearwardly of the ends of the binder, are driven from fastening-inserting devices that are operated and controlled by means of substantially the same character as disclosed in the previously mentioned Letters Patent, the several devices being moved toward the plane of the wipers and inwardly along said plane into their fastening-inserting positions. As herein shown the construction is such that the devices from which the fastenings are driven through the loops in the binder interlock with the wipers for better insurance that they will be accurately positioned in relation to the loops.

Various novel features of the invention are further to be recognized in means provided for presenting each toe binder to the lasting means. As illustrated, the binder is presented in the groove in the toe wipers by a manually operated device of novel construction, including binder-supporting members that adjust themselves to the edges of the wipers and pushers that are operated to push the binder from these members into the groove in the wipers. Novel means also is provided for forming the loops at the ends of the binder, the binder-presenting device having members that bend the end portions of the binder around pins positioned in the notches in the wipers and further act to force into the groove in the wipers portions of the binder near the pins. To permit the withdrawal of the binder-presenting device without disturbing the binder, it is further provided with means for removing the pins from the loops in the binder. In the construction shown the movement of the binder-supporting members to positions determined by the edges of the wipers, the pushing of the binder into the groove in the wipers, the formation of the loops and the withdrawal of the pins from the loops are all effected by forward movement of a single member manipulated by the operator.

Novel mechanism also is provided for delivering each binder to the binder-presenting device. Included in this mechanism are means for feeding binder wire, means for cutting off a piece of wire of proper length for the binder, and means for transferring the binder to the binder-supporting members with which the presenting device is equipped. In the construction shown this transferring means comprises plates having curved binder-engaging edges and mechanism for advancing the plates bodily to deliver the binder to the binder-supporting members and for also swinging them to move the end portions of the binder into proper relation to retaining devices on the members that support the binder ends. As illustrated, the wire-feeding means is movable by a hand lever and the cutting and transferring means by a treadle.

In combination with means for lasting the toe portion of the shoe, the invention further provides means for lasting the forepart from the toe portion substantially as far rearwardly as the ball line. For conforming the upper to the last in this location the construction shown comprises a rubber band or apron that extends across the top of the forepart of the last and is connected at its ends to members that act to wrap it about the last with a frictional drawing action on the upper, together with wiping members located nearer the edge of the last bottom than the band for wiping the upper at the sides of the last heightwise of the last. For laying inwardly over the insole the margin of the portion of the upper acted upon by this conforming means and for fastening the margin to the insole, there are provided overlaying and fastening devices that are moved inwardly toward each other at the opposite sides of the last, these devices in the construction shown being operated through a clutch that is controlled separately from the clutch through which the main portion of the machine is operated. Each of these devices comprises a wiper for wiping the upper over the insole and mechanism for driving a fastening part way into the shoe and last to fasten the upper. As the wiper is moved inwardly over the shoe bottom, it is deflected more or less heightwise of the shoe by wedging action of the shoe thereon; and for better insurance against displacement of the overwiped upper as the wiper is thereafter withdrawn from over the shoe bottom, means is provided for holding it against return movement heightwise of the shoe until after it has been withdrawn from the shoe.

The above and other features of the invention, including various novel details of construction and combinations of parts, will now be more particularly described by reference to the accompanying drawings and pointed out in the claims.

In the drawings,

Fig. 1 is a view in front elevation of a machine in which the invention is embodied, with parts broken away;

Fig. 2 is a view of the lower portion of the machine in left-hand side elevation, with parts broken away;

Fig. 3 is a section on the line III—III of Fig. 2;

Fig. 11 is a plan view of a portion of the machine, with parts broken away;

Fig. 12 is a view in right-hand side elevation of one of the jig pins and the parts that support and control it, the parts shown being those located at the left-hand side of the front portion of the machine;

Fig. 13 is a plan view of the parts shown in Fig. 12;

Fig. 14 is a view in front elevation of the parts shown in Figs. 12 and 13;

Fig. 15 is a section on the line XV—XV of Fig. 12;

Fig. 16 is a view partly in right-hand side elevation and partly in section showing the work-supporting means and parts associated therewith;

Fig. 17 is a section on the line XVII—XVII of Fig. 16;

Fig. 18 is a section on the line XVIII—XVIII of Fig. 16;

Fig. 19 is a section on the line XIX—XIX of Fig. 16;

Fig. 20 is a detail perspective view of a portion of the structure shown in Fig. 16, with parts broken away;

Fig. 31 shows in right-hand side elevation the device provided for presenting the toe binder to the wipers;

Fig. 32 is a perspective view of a portion of the structure of the binder-presenting device;

Fig. 33 is a plan view of the binder-presenting device, illustrating by dotted lines its relation to the wipers;

Fig. 34 is a perspective view of a portion of the device;

Fig. 35 is a central vertical section longitudinally of the device;

Fig. 36 is a section on the line XXXVI—XXXVI of Fig. 33;

Fig. 43 is a plan view, with parts broken away, showing the mechanism provided for delivering a binder to the binder-presenting device;

Fig. 44 is a detail view in elevation of a portion of the structure shown in Fig. 43;

Fig. 45 is a view, partly in left-hand side elevation and partly in section, of the mechanism shown in Fig. 43;

Fig. 46 is a plan view of a portion of the mechanism, with parts removed;

Fig. 47 is a section on the line XLVII—XLVII of Fig. 43;

Fig. 48 is a section on the line XLVIII—XLVIII of Fig. 46;

Fig. 49 is a section on the line XLIX—XLIX of Fig. 46, showing also parts omitted from that figure;

Fig. 50 is a perspective view of a portion of the means provided for feeding and cutting the wire;

Fig. 52 is a plan view, with parts broken away, showing in greater detail the upper-guiding device shown in Fig. 7;

Fig. 53 is a view mainly in vertical section illustrating the relation of the work to parts that operate thereon at the time in the cycle of the machine when the clamping of the margin of the upper takes place;

Fig. 54 is a view illustrating the positions of certain parts shown in Fig. 53 at the end of the downward movement of the last and shoe;

Fig. 55 shows in front elevation a portion of the means for conforming the upper to the contour of the last at the rear of the toe, and also one of the toe wipers and the side gripper associated therewith as positioned at the time in the cycle illustrated in Fig. 54;

Fig. 56 is a view similar to a portion of Fig. 55, but showing the parts as they are positioned a little later in the cycle;

Figure 4:
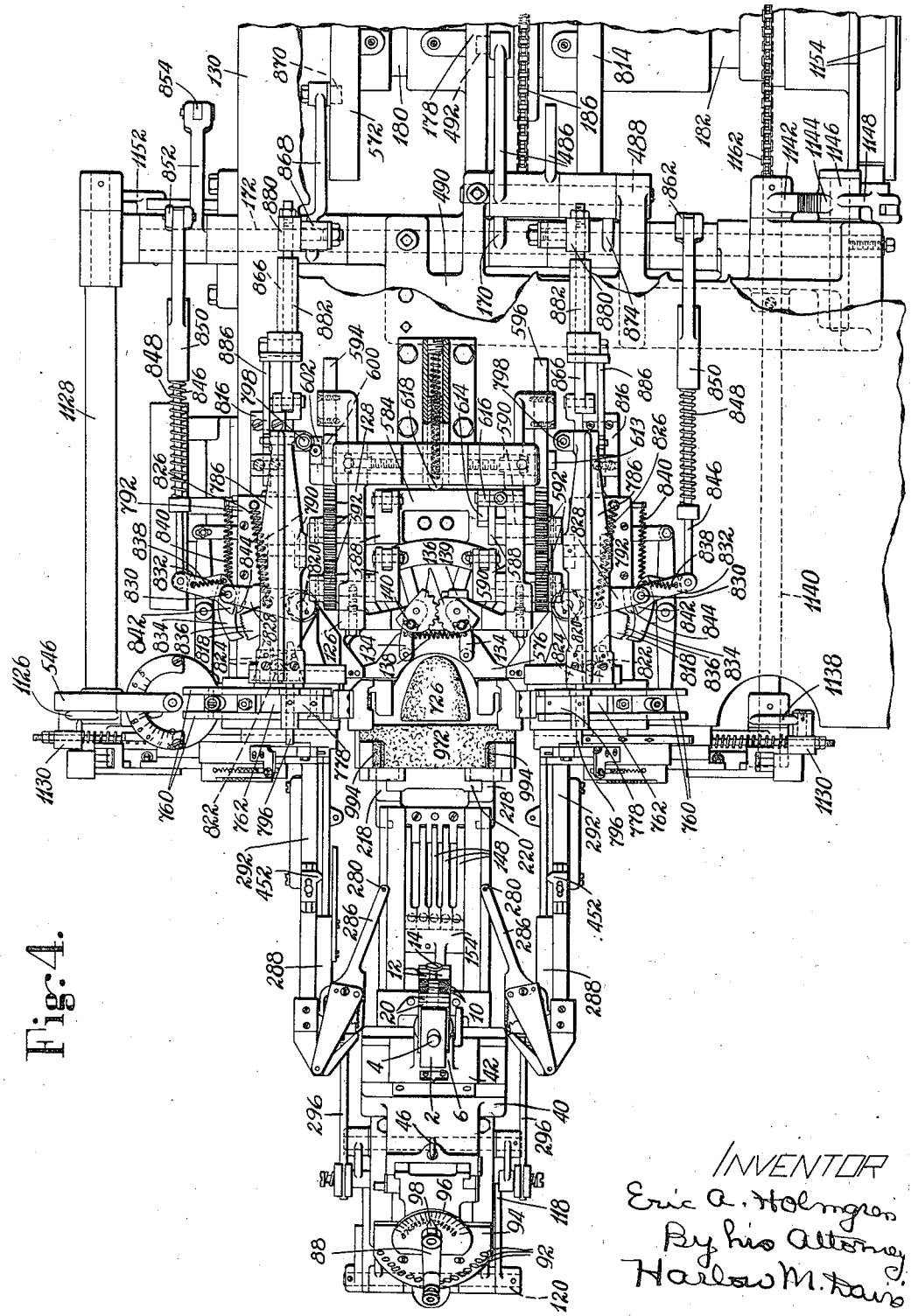
Fig. 4 is a plan view of a portion of the machine, with parts broken away, the tacking mechanism at the top of the machine being omitted.

It is contemplated that, in general similarity to the disclosure of the above-mentioned Letters Patent, the invention will preferably be embodied in a twin machine having two sets of instrumentalities with their operating and controlling mechanisms for operating respectively upon right and lift shoes, each set being independent of the other as far as its operation and control are concerned. For an understanding of the present invention, however, reference need be made only to one of the sets of instrumentalities and the parts associated therewith, and accordingly the drawings and the following description are confined mainly to the structure included in one half of such a twin machine.

For positioning a last with an upper and an insole assembled thereon (hereinafter frequently referred to inclusively as the shoe) in proper relation to the lasting instrumentalities there is provided a work support so constructed as to permit various adjustments for shoes of different styles and sizes. To support the last by its heel end there is a block 2 (Fig. 16) arranged to engage the top of the cone of the inverted last and provided with a pin 4 that projects into the spindle hole of the last, the block resting upon a bracket 6 and having a depending stem 8 positioned in a socket formed in the bracket. Mounted on the block 2 is means which by contact with the rear face of the forepart portion of a divided or hinge last in a recess between its forepart portion and its heel-end portion assists in supporting the forepart of the last against pressure applied on its bottom face in the manner hereinafter described. This means comprises a slide 10 having spaced portions (Fig. 4) movable rectilinearly in directions lengthwise of the last in guideways formed in opposite sides of the block 2 and having at its forward end upstanding ears 12 on which there is pivotally mounted for turning movement about a horizontal axis a member 14 arranged to contact with the rear face 16 of the forepart of the last, as illustrated in Fig. 16. Depending from the slide 10 is a finger 18 by which the operator may move the slide forwardly to seat the member 14 against the face 16 after mounting the last with its shoe materials on the pin 4. The slide 10 is then held against retractive movement by one or the other of two detent members 20 arranged to engage teeth formed on the upper faces of the two spaced portions of the slide 10, these members having depending stems 22 movable upwardly or downwardly in an opening in the block 2 and urged in a downward direction by spring-pressed plungers 24 engaging the lower face of the block. It will be understood that two members 20 are provided for the sake of greater precision in holding the slide 10 in the position determined by the rear face of the forepart of the last. The operator raises the detent members 20 by lifting their depending stems 22 with his fingers to permit retractive movement of the slide 10 to release the last. To maintain the slide 10 in assembled relation to the block 2 there is provided a pin 26 carried by the slide and extending into a slot 28 formed in one side of the block.

To assist in properly positioning the forepart of the last, the block 2 and the parts supported thereon, together with the depending stem 8, may be adjusted about the axis of the stem. For holding the block in adjusted position there is provided a bushing 30 (Fig. 17) slidingly mounted in a transverse opening in the bracket 6 and arranged to engage the stem 8 frictionally. Extending through the bushing 30 is a shaft 32 arranged to be turned by a handle 34 and threaded in a sleeve 36 which is held fast in the opening in the bracket 6. The handle 34 has a hub portion 38 that bears on the outer end of the bushing 30, and when the handle is turned the bushing is accordingly forced into firm frictional engagement with the stem 8.

The bracket 6 is mounted for rectilinear movement in directions widthwise of the last in a holder 40. For this purpose the bracket has a base portion 42 movable in guideways in the holder 40. The bracket is maintained in adjusted position by a detent member 44 (Fig. 20) having teeth arranged to engage corresponding teeth formed on one side of the base portion 42 of the bracket. For withdrawing this detent member from operative position there is provided a rod 46 extending upwardly through an opening in the holder 40 and on the lower end of which the detent member is fastened. A spring 48 tends to hold the member 44 in operative position. To enable the operator readily to withdraw the member from operative position the upper end of the rod 46 is bent laterally, as shown in Fig. 16. Mounted on the holder 40 is a plate 50 (Fig. 20) having a scale thereon arranged to cooperate with a pointer 52 on the base 42 of the bracket 6 to indicate different adjusted positions of the bracket. It will be evident that by such bodily adjustment of the bracket 6 in directions widthwise of the last, combined with the above-described adjustment of the block 2 about an axis extending heightwise of the last, the forepart of a last of any style and size may be properly positioned laterally in relation to the lasting means.

To assist in positioning the bottom face of the forepart of the last in the proper plane relatively to the lasting instrumentalities, the holder 40 is adjustable about an axis extending widthwise of the last and located, as shown, substantially at the ball of the last. It will be understood that the location of this axis in relation to the last will vary somewhat in accordance with the size of the last, but it will usually lie, in any case, in the vicinity of the forepart portion of the last. For this purpose the holder is mounted for movement along curved guideways 54 formed on a block 56 (Figs. 16 and 19). To maintain the holder in adjusted position there is provided a detent 58 arranged to engage teeth 60 (Fig. 2) formed on the holder 40. The detent 58 is fast on a rod 62 (Fig. 19) movable lengthwise in a transverse opening in the block 56 against the resistance of a spring 64 to disconnect the detent from the teeth 60 when the operator presses inwardly on a stem 66 on the detent. A plate 68 limits outward movement of the detent under the influence of the spring. To indicate different adjusted positions of the holder 40 there is a scale plate 70 (Fig. 16) on the block 56 cooperating with a pointer 72 on the holder.

The block 56 is so mounted that by movement thereof the last-supporting block 2 and the pin 4 may be tipped laterally to assist further in positioning lasts of different styles and sizes with the bottoms of their foreparts in proper relation to the lasting instrumentalities. To this end, the block 56 has a flat face 74 in engagement with a corresponding flat face formed on a supporting bracket 76, and is provided with a stem 78 rotatable in a bearing in the bracket 76 about an axis extending generally lengthwise of the last but inclined somewhat heightwise of the last. A plate 80 fast on the end of the stem 78 and overlapping the bracket 76 holds the block 56 in assembled relation to the bracket. For adjusting the block 56 about the axis of the stem there is provided a beveled pinion 82 mounted on a shaft 84 rotatable in bearings in the bracket 76, the pinion engaging teeth 86 formed on the block. The pinion 82 is turned by a lever 88 fast on the shaft 84 and provided with a spring-pressed pin 90 arranged to enter any one of a number of holes 92 (Fig. 4) formed in a plate 94 that is fast on the bracket 76 to maintain the block 56 in adjusted position. For indicating purposes there is a scale 96 on the plate 94 cooperating with a pointer 98 that is carried by the lever 88.

The bracket 76 is fast on a work carrier or slide 100 which is movable forwardly or inwardly toward the lasting means in a rectilinear path to carry the parts supported thereon from a position in which the operator mounts the last and its shoe materials on the work support to a position in which the work is presented in proper relation to the lasting instrumentalities for the beginning of the lasting operation. The slide 100 is thus movable along guideways formed on a second slide 102 (Figs. 16 and 18) which is movable in directions parallel to the path of movement of the slide 100 for a purpose hereinafter described, the slide 102 being supported on gibs 104 fast on a vertically movable slide or support 106. Outward movement of the slide 100 is limited by a projection 108 (Fig. 16) on one of the gibs 104 which is arranged to engage a finger 110 formed on a plate 112 fast on the slide 100. This slide is held in its outermost position by a latch 114 vertically movable in one of the gibs 104 and arranged to engage a shoulder on the plate 112, as illustrated in Fig. 16, the latch being urged upward by a spring 116. For depressing the latch 114 to release the slide 100 and permit the operator to move the latter inwardly to present the work, there is provided an arm 118 arranged to engage a portion of the latch that projects laterally beyond the plate 112, this arm being fast on a rockshaft 120 on the slide 100. Fast also on this rockshaft is a handle 122 by which the operator turns the shaft to depress the latch and by which also the operator imparts inward and outward movements to the slide 100.

Inward movement of the slide 100 to present the work as above described is limited by contact of the end face of the last with an end gage 124 (Fig. 5) which is fast on a bracket 126 secured to another bracket 128, the bracket 128 being mounted on a top plate 130 on the frame of the machine. The end gage 124 is thus stationary at all times. For greater precision in positioning the last accurately in proper relation to the lasting instrumentalities, in view of the opportunity for some lateral movement of the forepart of the last supported as hereinbefore described, there are further provided two gages 132 (Figs. 5 and 6) arranged to contact with the opposite sides of the toe end of the last. These gages are carried by arms 134 (Fig. 4) pivotally supported on the bracket 126 and connected by gear segments 136 for equalized swinging movements toward and from each other, the arms being pulled inwardly toward each other by a spring 138. Such inward movements of the arms are limited by contact of one of the segments 136 with a lug 139 on the bracket 126. It will be understood that through contact of the last with the gage members 132 the arms 134 are swung apart equal distances to receive the toe end of the last and act to centralize the latter accurately. There is provision for adjustment of each arm 134 relatively to its controlling segment 136 by a screw and slot connection 140 between these parts. The gage members 132 are so mounted in the arms 134 that they may be moved upwardly against the resistance of springs 141 (Fig. 6) if engaged by the shoe when the shoe is moved upwardly in the return of the parts to starting positions near the end of the cycle of operations.

After the slide 100 has been moved inwardly by the operator to present the work in the manner above described it is, at a predetermined time in the cycle of operations of the machine, automatically locked to the slide 102 to prevent relative movement of these two slides in either direction. For this purpose there is fastened to the slide 100 a plate 142 (Figs. 16 and 18) provided with two sets of ratchet teeth 144 and 146 pointed respectively in opposite directions. Carried by the slide 102 below the plate 142 are two sets of pawls 148 and 150 arranged respectively to cooperate with the teeth 144 and 146, the different pawls of each set being arranged in staggered relation for greater precision. Mounted in the slide 102 are spring-pressed plungers 152 which tend to swing the pawls 148 and 150 upwardly to engage the ratchet teeth. The pawls, however, are maintained initially in depressed positions, as shown in Fig. 16, by levers 154 and 156 carried by the slide 102. One arm of the lever 154 overlies and depresses all the pawls 148, and one arm of the lever 156 is similarly arranged in relation to the pawls 150. The other arm of each lever rests upon the head of a plunger 158 movable vertically in an opening in the slide 102 and engaged at its lower end by one arm of a bell-crank lever 160 pivotally mounted on the slide 106 which supports the slide 102. For controlling the bell-crank lever 160 there is provided on the slide 106 another bell-crank lever 162 one arm of which has a projection 164 arranged to engage a roll 166 on the lever 160. The bell-crank lever 162 is connected by a link 168 (Fig. 5) to one arm of a bell-crank lever 170 mounted to turn about a rockshaft 172 (hereinafter referred to) near the rear of the machine, the other arm of this bell-crank lever carrying a roll 174 engaged by a path cam 176 formed in one side of a cam wheel 178. The cam wheel 178 is fast on a sleeve 180 mounted to turn about a fixed shaft 182, this sleeve being provided with a sprocket wheel 184 driven by a chain 186 from another sprocket wheel 188 to which movements are imparted intermittently in time relation to the movements of other parts, as hereinafter described. At an early stage in the operation of the machine the cam 176 imparts movement in a counterclockwise direction (Fig. 16) to the bell-crank lever 162 to carry the projection 164 away from the roll 166, whereupon the pawls 148 and 150 are moved upwardly by the plungers 152 into locking relation to the teeth 144 and 146. The pawls 150 thus lock the slide 100 against retractive movement toward the operator relatively to the slide 102. The pawls 148, on the other hand, serve to lock the slides 100 and 102 together in such manner that if the slide 102 is moved outwardly toward the operator the slide 100 is carried with it.

Shortly after the beginning of the cycle of operations of the machine the marginal portion of the upper is clamped around the toe end by means hereinafter described, and thereafter outward movement is imparted to the slide 102 to move the last in a lengthwise direction and thus to stretch the upper lengthwise, the pawls 148 serving at this time to transmit movement from the slide 102 to the slide 100. For thus operating the slide 102 there is provided a toggle 190 (Fig. 16) one arm of which is connected to the vertically movable slide 106 and the other arm to the slide 102. The toggle 190 is operated through a link 192 by a bell-crank lever 194 on the slide 106. Connected to one arm of this bell-crank lever is a bar 196 supported on the slide 106 by a roll 198 (Figs. 2 and 16) which is mounted on a bracket 200 fast on the slide and lies in a slot 202 formed in the bar. At its inner end the bar 196 is provided with a vertical slot 204 in which is mounted a block 206 pivotally supported on the upper end of one arm of a bell-crank lever 208. This bell-crank lever is mounted to turn on a fixed shaft or rod 210 and carries a roll 212 engaged by a path cam 214 formed in one side of a cam wheel 216 on a shaft 217. When movement in a counterclockwise direction (Fig. 2) is imparted to the bell-crank lever 208 the toggle 190 is straightened through the connections described to impart upper-stretching movement of predetermined extent to the slide 102 and the last-supporting means thereon. It will be evident that the vertical slot 204 in the bar 196 permits such downward and upward movements as the slide 106 receives in the operation of the machine for purposes hereinafter described.

The slide 106 is provided on its opposite sides with gibs 218 (Figs. 4 and 16) which interlock with a dovetailed projection 220 on the front of a bracket 222 (Fig. 5) fast on the frame of the machine, the slide thus being guided for vertical movements. The slide 106 and the shoe-supporting means thereon are normally maintained in an upraised position by a bell-crank lever 224 (Fig. 2) under the influence of a spring 226 connected to one arm of the lever, the other arm being connected to the slide 106 by a flexible cable 228. The lever 224 is mounted to turn on a fixed shaft 229. To limit upward movement of the slide 106 under the influence of the spring 226 there is provided a screw 230 (Fig. 5) adjustably mounted in a plate 232 on the lower end of one of the gibs 218 and arranged to contact with the lower end face of the projection 220. It will be understood that the spring 226 yields to permit such downward movement of the slide 106 as is required in the operation of the machine and when permitted returns the slide to its uppermost position.

It is desirable that when the operator mounts the work on the work support the latter be held firmly against downward movement. There is accordingly fastened on one of the gibs 218 of the slide 106 a plate 234 (Fig. 16) provided with ratchet teeth 236, and pivotally mounted on the stationary bracket 222 by means of a screw 238 is a pawl 240 arranged to engage the ratchet teeth 236. A spring 242 normally holds the pawl in engagement with the teeth. To swing the pawl away from the ratchet teeth and thus to release the work support for downward movement, there is provided a vertically movable bar 244 having a slot 246 through which the screw 238 extends to guide the bar in its vertical movements, and formed on the bar 244 is a cam face 248 arranged to engage a roll 250 on the pawl 240 to swing the pawl away from the ratchet teeth when the bar is moved upwardly. For imparting such upward movement to the bar 244 there is provided a bell-crank lever 252 (Fig. 5) mounted to turn about a rockshaft 254 supported on the lower end of the bracket 222. One arm of the bell-crank lever 252 is connected to the bar 244 and the other arm is connected by a link 260 to an arm 262 which is fast on a treadle 264 by depression of which the machine is started as hereinafter described. It will thus be seen that by depression of the starting treadle the slide 106 is unlocked to permit downward movement of the work support in the operation of the machine. When the pawl 240 is swung out of engagement with the ratchet teeth 236 it is held in its idle position by a latch 266 (Fig. 16) which hooks over the top of a lug 268 on the pawl, the latch being mounted on the bracket 222 and controlled by a spring 270. At a predetermined time in the operation of the machine, as more particularly hereinafter described, the latch 266 is retracted from the pawl 240 to cause the latter again to lock the work support against downward movement. For this purpose an arm 272 on the latch is engaged by a screw 274 carried by a forwardly projecting downwardly movable bar 276 (Fig. 5) operated as also hereinafter described.

Before the work is mounted on the work support the upper materials and the insole are assembled on the last and the upper is fastened to the last at the heel end by one or more assembling tacks t (Fig. 7), the insole being fastened to the last at the forepart by tacks t'; and when the work carrier 100 is moved inwardly as hereinbefore described to present the work in position to be operated upon, the toe-end portion of the upper materials is carried to a position in which it is outspread substantially in a horizontal plane above toe-embracing wipers 278 (Figs. 6, 7 and 11) which later wipe the marginal portion of the toe end of the upper into lasted relation to the feather and the lip of the insole. For positioning the toe end of the upper in proper relation to the wipers and to the other lasting instrumentalities, so that the tip line will be at the proper distance from the toe end face of the last and in proper angular relation to the last, there are provided jig pins 280 which enter jig holes previously formed in the margin of the upper materials at the opposite sides of the toe substantially at the ends of the tip seam, in general similarity to the disclosure of my previously mentioned Letters Patent, the upper-presenting positions of the jig pins being determined by contact with the wipers 278 in slots 282 formed in the wipers and by further contact with gage plates 284 above the wipers, as hereinafter more particularly described. In the machine herein shown, however, the jig pins 280, instead of being mounted on a portable presenter as disclosed in the above-mentioned Letters Patent, are permanently positioned on the machine. For this purpose they are mounted on arms 286 (Figs. 4, 12 and 13) supported as hereinafter described on horizontally movable slides or carriers 288. These slides are guided for inward and outward movements in paths parallel to the path of movement of the work support slide 100 on dovetailed projections 290 formed on brackets 292 that are fast on the front of the frame of the machine. Initially the slides 288 are positioned at the outer ends of the brackets 292 in engagement with stops 294 on the brackets, the jig pins 280 being thus retracted far enough from the toe end of a last when the latter is mounted on the work support to permit the operator readily to mount the toe end of the upper upon the jig pins, as will be evident by reference to Fig. 2. It will be understood that the upper as thus positioned rests upon portions of the pins that are of comparatively large diameter, with the reduced end portions of the pins projecting through the jig holes, in the same manner as disclosed in the above-mentioned Letters Patent.

The slides 288 are connected together by means including links 296 pivotally connected at their inner ends to the slides and connected at their outer end portions to arms 298 which are fast on a rockshaft 300 (Figs. 2 and 16) supported on the slide 100. The connection between each link 296 and the corresponding arm 298 is a frictional connection (Figs. 2 and 3) to permit relative movement of these parts for a purpose hereinafter explained. This frictional connection comprises a screw 302 that is threaded in the arm and extends through a slot 303 in the link, and plates 304 mounted on the shank of the screw at opposite sides of the link with leather washers 306 between them and the link. A spring 308 on the screw 302 holds the washers 306 in frictional contact with the link. By this means the two slides 288 are connected together in such manner as to move normally in unison when operated as hereinafter described, but with provision for relative movement between them. The two slides are maintained initially in their outermost positions against the stops 294 by an arm 310 (Fig. 16) fast on the rockshaft 300 and provided with a roll 312 in engagement with a cam face 314 formed on one of the gibs 104. This cam face by its engagement with the roll 312 serves to swing the arms 298 outwardly to insure contact of the slides 288 with the stops 294 when the work support slide 100 is moved to its outermost position by the operator. As the slide 100 is moved forwardly by the operator to present the work to the lasting means the arm 310 is released by the cam face 314. This permits the slides 288 to be moved forward relatively to the slide 100 to take up whatever slack there may be in the upper between the jig pins 280 and the heel end face of the last, after which the slides 288 are moved along with the slide 100, as will now be described.

Figure 30:
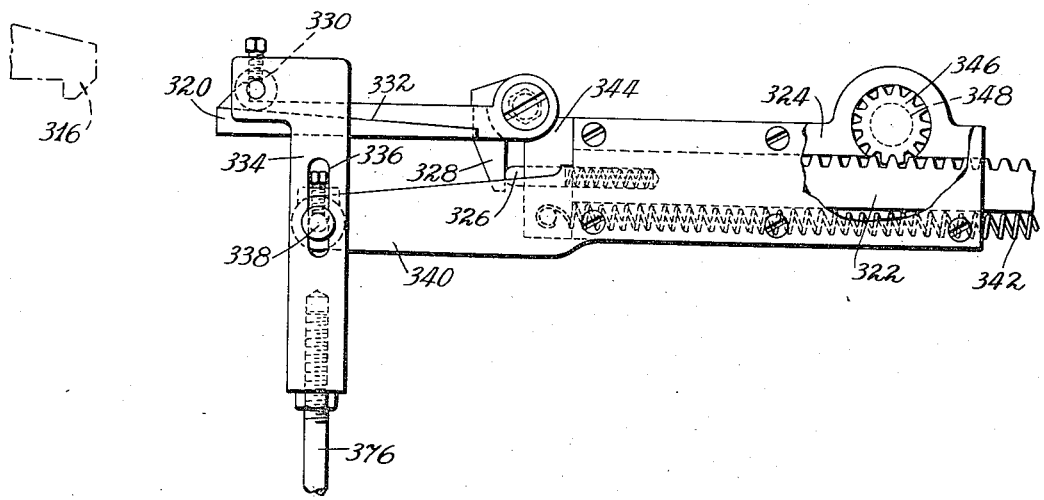
Fig. 30 is a view mainly in right-hand side elevation of a portion of the spring-operated mechanism that connects with the jig pins and imparts to them their forward movement.
Figure 37:
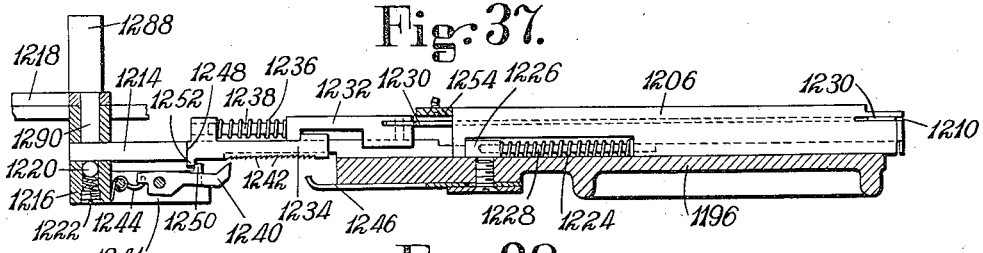
Fig. 37 is a section on the line XXXVII—XXXVII of Fig. 33 with parts omitted.

For imparting the forward movements to the slides 288 there is provided spring-operated mechanism which occupies initially a retracted position and is moved by the operator into position to connect with a lug 316 (Figs. 2 and 12) formed on a plate 318 fast on one of the slides 288. This mechanism comprises a latch 320 (Figs. 5 and 30) pivotally mounted for downward and upward movements on the forward end of a slide 322 mounted in a horizontal guideway in a bracket 324 on the frame of the machine. A spring-pressed plunger 326 in the slide 322 tends by engagement with a finger 328 on the latch 320 to swing the latter upwardly. Such upward movement of the latch is limited by a roll 330 in engagement with a ledge 332 on the latch, the roll being mounted on a vertically movable member 334 controlled as hereinafter described. This member is provided with a slot 336 through which extends a guiding pin 338 mounted on an arm 340 of the bracket 324. A spring 342 connected at one end to the frame of the machine and at the other end to a head 344 on the slide 322 tends to retract the slide and maintains it initially in the position illustrated in Fig. 30 with the head 344 in contact with the bracket 324.

For imparting to the slide 322 movement against the resistance of the spring 342 into position for the latch 320 to connect with the lug 316, there is provided a pinion 346 in engagement with rack teeth on the slide, this pinion being fast on a shaft 348 on which is mounted another pinion 350 (Fig. 2) in engagement with a gear wheel 352 supported on a portion of the bracket 324. The gear wheel 352 has a hub 354 partially encircled by a chain 356 one end of which is connected to the hub and the other end to an arm 358 pivoted on the frame of the machine. The arm 358 is connected by a link 360 to a treadle 362. Accordingly by depression of this treadle the gear wheel 352 is turned in such a direction that the pinion 346 moves the slide 322 into position for the latch 320 to connect with the lug 316. The operator thus depresses the treadle 362 before he imparts to the work support slide 100 its forward movement and then immediately releases the treadle. The arm 358 is lifted by a spring 364 to a position determined by a pin 365 as soon as the treadle 362 is released, but this merely leaves the chain 356 slack, since the lug 316 by its engagement with the latch 320 prevents at this time return of the slide 322 by the spring 342. When the operator begins the forward movement of the work support slide 100, the release of the arm 310 by the cam face 314 renders the spring 342 effective to move both slides 288 forward relatively to the slide 100 by reason of the operating connections between the slides. This serves to take up the slack in the upper. The spring 342 thereafter continues its movement of the slides 288 as the forward movement of the slide 100 continues.

To insure that the jig pins 280 will be fully advanced to the positions determined by the wipers 278 and the gage plates 284 and will be held in the positions thus determined, there is provided means for further operating the slides 288 by the movement of the slide 100. For this purpose there is fast on one of the arms 298 (Fig. 2) a plate 366 with ratchet teeth thereon, and arranged to cooperate with these ratchet teeth is a pawl 368 which is loosely mounted on the shaft 120 controlled by the handle 122 as previously described. A block 370 carried by the shaft 120 serves by engagement with a pin 372 on the pawl 368 to hold the pawl out of engagement with the ratchet teeth when the handle 122 is in its initial position. When the operator moves the handle forwardly to release the slide 100 by depressing the latch 114 and to impart to the slide its forward movement, a light spring 374 pulls the pawl 368 downwardly into engagement with the ratchet teeth on the plate 366, so that when two slides 288 are moved yieldingly forward by the spring 342 as above described, they are held in their advanced positions relatively to the slide 100 by the pawl and ratchet mechanism. Thereafter, in the final portion of the movement of the slide 100, the arms 298, by reason of the pawl and ratchet mechanism, are moved with the slide in fixed relation thereto, so that through their frictional connections with the links 296 they apply a forward push to the slides 288. It will be understood that in this operation the friction washers 306 (Fig. 3) may be carried along the links 296 a greater or less distance depending upon the positions assumed by the jig pins 280 in the slots in the wipers. When the operator pulls on the handle 122 to retract the slide 100 after the lasting operation, the pawl 368 is lifted by the block 370 so as to permit the slides 288 to be returned to their outermost positions by the action of the cam face 314 on the arm 310. At the time of such outward movement of the slides 288 the lug 316 has been released from the slide 322 by downward movement of the latch 320. Such movement of the latch is effected by the previously mentioned member 334 on which the roll 330 is mounted over the ledge 332 on the pawl. For thus operating the member 334 a rod 376 (Figs. 5 and 30) connects the member to an arm 378 that is fast on the previously mentioned lever 252 whereby the work support slide 106 is unlocked through depression of the starting treadle 264. Release of the lug 316 from the slide 322 is, therefore, effected by depression of the starting treadle.

In order to support the extreme toe end of the upper and guide it into proper position above the wipers 278 when the work support slide 100 is moved forwardly, there is provided a device which is projected from a normal retracted position into upper-supporting position by a portion of the same treadle-operated means that moves the slide 322 into position to connect with the lug 316. This device comprises a rack bar 380 (Figs. 5, 7 and 11) guided for movements in directions lengthwise of the last in a slot in a wiper-operating slide 382 more particularly hereinafter referred to and movable also in slots provided in wiper carriers 384 (Fig. 11) on which the wipers 278 are mounted. On one end the rack bar 380 carries a plurality of thin upper-controlling fingers, comprising two fingers 386 and 388 (Fig. 7) arranged to be positioned respectively below and above the toe end of the upper materials and a pair of fingers 390 which diverge from each other for supporting the upper materials at opposite sides of the finger 386. The fingers 390 are pivoted at 392 (Fig. 52) for swinging movements toward and from each other and are controlled by a spring 394 the ends of which bear against projections 396 on the fingers and thus tend to swing the latter apart as far as permitted by engagement of portions of the projections 396 with a member 398 on which the fingers are mounted. When the bar 380 is retracted to its initial position the fingers 390 are engaged by the wiper carriers 384 and are thus swung toward each other into the positions illustrated in Fig. 11. On the other hand, when the bar 380 is advanced toward the work the fingers 390 are swung outwardly by the spring 394 as soon as they are clear of the wiper carriers.

For advancing the bar 380 toward the work the rack teeth thereon are engaged by a pinion 400 (Figs. 5 and 11) fast on a shaft 402 on the outer end of which there is a pinion 404 (Figs. 2 and 11)

in engagement with the previously mentioned gear wheel 352. It will thus be seen that the upper-controlling fingers are advanced toward the work by depression of the treadle 362, and they are, of course, then held against retractive movement under the influence of the same spring 342 that operates the slide 322 (Fig. 30) by the lug 316 in engagement with the pawl 320. After the fingers have thus been advanced into operative position the operator arranges the toe end of the upper in proper relation to them. Since the rack bar 380 and the slide 322 are connected together by the gearing described, they are both retracted simultaneously by the spring 342 under control of the lug 316 as the work support slide 100 and the jig pins are moved forwardly. The fingers 386, 388 and 390 accordingly maintain control of the toe end of the upper until the work arrives in position to be operated upon. When the slide 322 is released from the lug 316 by depression of the starting treadle, as previously described, the upper-controlling fingers are further retracted somewhat by the spring 342 so that they are entirely out of the way during the lasting operation.

Initially the jig pins 280 occupy positions in which they are comparatively near together, as illustrated in Fig. 4, to facilitate the placing of the upper thereon, and as they are moved forwardly toward the wipers they are spread apart to straighten laterally that portion of the upper that is located between them. For this purpose the arms 286 are mounted for swinging movements laterally of the shoe on vertical rods 406 (Figs. 12 and 13) supported on slides 408 that are movable vertically in guideways provided in the horizontally movable slides 288 for a purpose hereinafter described. As shown in Fig. 12, each arm 286 has a downwardly extending yoke-shaped portion 410 engaged by a spring 412 that is coiled about the rod 406, the spring tending to impart outward swinging movement to the arm. For holding the arm in its initial position against the resistance of this spring there is provided a plate 414 which is fast on the arm and carries a roll 416 controlled by a bracket 418 that is fast on the bracket 292 along which the slide 288 is movable. Initially the roll 416 is in engagement with a face 420 on the bracket 418, as illustrated in Fig. 13, and as the slide 288 is moved forwardly to carry the pin 280 toward the wipers the roll runs along a cam face 422 on the bracket 418 arranged at such an angle as to permit the arm 286 to be swung outwardly by the spring 412.

For better insurance that the jig pins, when swung outwardly by the springs 412 to straighten the upper, will be in proper positions to enter the slots in the wipers and in the gage plates 284 near the end of the forward movements of the slides 288, there is provided mechanism that holds each arm 286 against retractive movement from any position to which it is swung by the spring 412, so as to counteract any tendency that there might be under some conditions for both arms to be swung somewhat to one side or the other by the strain of the upper on the pins 280 as the pins apply the forward pull to the upper in the manner previously described. This mechanism comprises a plurality of pawls 424 pivotally mounted on a pin 426 supported on a bracket 428 on the slide 408, the pawls being arranged to engage ratchet teeth 430 formed on a member 432 that is fast on the arm 286. The pawls are arranged in staggered relation for greater precision. Also mounted to turn on the pin 426 is a block 434 between which and the pawls there is provision for only very limited relative movement, and fastened to this block is a spring plate 436 (Fig. 14) provided with fingers that lie against straight faces formed on the hub portions of the pawls. When the parts are in their initial positions a projection on the block 434 is engaged by a screw 438 mounted in an arm 440 that is fast on the bracket 292, and in this manner the block is so positioned with respect to movement about its axis as to cause the spring plate 436 thereon to press the pawls 424 into engagement with the ratchet teeth 430. The block 434 is, moreover, locked in this position by one arm 442 (Fig. 13) of a detent pivoted at 444 on the slide 408 and provided with another arm 446 controlled by a spring-pressed plunger 448. The arm 442 is held initially in a notch 450 in the block 434 by the action of the plunger 448 on the arm 446. It will thus be seen that as the arm 286 is swung outwardly by the spring 412 it is held against retractive movement by the pawls 424, since the arm 442 continues to hold the block 434 in the position illustrated in Fig. 13 after the block has been carried away from the screw 438 by the forward movement of the slide 288. It is desirable, however, that when the jig pins 280 enter the slots in the wipers and in the gage plates 284 they be free to swing in both directions to assume exactly the positions determined by the slots. Accordingly means is provided for withdrawing the pawls 424 from contact with the ratchet teeth 430 near the end of the forward movement of the slides 288. The means for thus operating each set of pawls comprises a member 452 adjustably mounted on the bracket 292 in position to engage the detent arm 446 at the required time and thus to swing the detent in such manner as to withdraw its arm 442 from the notch 450 in the block 434. Thereupon the block is turned about the pin 426 by a spring 454 and by contact with the pawls 424 withdraws them from the ratchet teeth. The detent arm 442 enters a notch 456 in the block to limit such turning movement of the block. When the slides 288 are moved outwardly toward their initial positions after the lasting operation the arms 286 are swung inwardly by the action of the cam faces 422 on the rolls 416, and substantially at the end of such outward movements of the slides the screws 438 act to turn the blocks 434 in such directions as to carry the pawls 424 again into engagement with the ratchet teeth, the detent arms 442 then swinging into locking positions in the notches 450 in the blocks. Just before the pawls are thus moved into contact with the ratchet teeth the rolls 416 arrive in positions to engage the faces 420 which are parallel to the directions of movement of the slides 288, so that the swinging of the arms 286 ceases before the arms are locked by the pawls.

After the margin of the toe end of the upper has been clamped by means hereinafter described it is necessary to withdraw the jig pins 280 from the holes in the upper, and it is for this purpose that the horizontally movable slides 288 are provided with the vertically movable slides 408. Each slide 408 is urged upwardly by a spring 458 (Fig. 12) and carries a roll 460 that lies in a vertical slot 462 formed in the slide 288. Upward movement of the slide 408 under the influence of the spring 458 is limited by contact of the roll 460 with the member 288 at the upper end of the slot 462. At its lower end each slide 408 has a shoulder 466 (Fig. 12) which is carried by movement of the slide 288 to a position under a shoulder 468 on a vertically movable slide 470. The slide 470 is guided by a plate 472 fast on the bracket 292, this plate having a vertical slot 474 through which projects a stud 476 carried by the slide 470. The slide 470 at the left-hand side of the machine is connected by a rod 476 to an arm 480 (Fig. 2) fast on the previously-mentioned rockshaft 254, and the slide at the right-hand side of the machine is connected by a similar rod 478 to one arm of a bell-crank lever 482 (Fig. 5) fast on the shaft 254, the other arm of this bell-crank lever being connected by a link 484 to one arm of a bell-crank lever 486 mounted to turn on a shaft 488 (Figs. 4 and 5) that is supported on a bracket 490 on the frame of the machine. The other arm of the bell-crank lever 486 carries a roll 492 (Fig. 4) engaged by a path cam 494 (Fig. 5) formed in one side of the cam wheel 178. It will thus be seen that through the connections described downward movements are imparted to the slides 408 to withdraw the jig pins from the upper and from the slots in the wipers early in the cycle of operations. As each slide 408 is thus moved downwardly its roll 460 is carried past a latch 496 (Figs. 12 and 15) that is pivotally mounted on pins 498 on the bracket 292 and is controlled by a spring plate 500. It will be seen that the latch 496 is extended for a considerable distance along the path of movement of the slide 288, and by its contact with the roll 460 serves to maintain the slide 408 in its depressed position during a portion of the retractive movement of the slide 288, the member 470 being moved upward before such retractive movement of the slide 288 occurs. By the latch 496 the slide 408 is accordingly held depressed until the jig pin 280 is well clear of parts of the machine above it, whereupon the roll 460 enters an inclined slot 502 (Fig. 12) formed in a member 504 that is fast on the bracket 292, this slot guiding the roll and permitting the upward movement of the slide 408 under the influence of the spring 458 to the initial position determined by the slot 462.

The previously mentioned gage plates 284 (Figs. 6 and 11) positioned immediately over the end portions of the wipers 278 are provided for the same purpose as the corresponding plates shown in the previously mentioned Letters Patent, namely, to vary the locations of the jig pins in lasting shoes of different sizes in view of the contemplated use of the same wipers for a number of sizes. It will be understood that since the toe end faces of lasts of different sizes occupy the same position determined by the end gage 124, the jig pins 280 should be positioned farther forwardly, i. e., nearer this end gage, to position the upper of a comparatively small shoe than in operating upon the upper of a larger shoe. In the construction herein shown the gage plates 284 are provided with slots 506 (Fig. 11) that extend forwardly in directions parallel to the directions of forward movement of the jig pins, while one wall of each of the slots 282 in the wipers is inclined relatively to the slot 506 above it. It will accordingly be evident that adjustment of the plates 284 laterally of the machine serves to vary the distance that the pins 280 can be moved into the slots 282 in the wipers before they are stopped by the inclined walls of these slots. For purposes of such adjustment the left-hand plate 284 is fastened to a lug 508 formed on the inner end of a rack bar 510 movable in a guideway formed in a cover plate 512 that extends over the wiper carriers 384, this rack bar being engaged by a pinion 514 fast on a shaft 516 supported by a bracket 518 on the side of the frame of the machine. The pinion 514 is also engaged by a gear segment 520 formed on one end of a lever 522 that is pivoted between its ends on the bracket 518, the other end of this lever being connected by a cross link 524 to another lever 526 which is pivoted on a bracket 528 on the opposite side of the machine. The lever 526 is connected to a slide 530 arranged similarly to the rack bar 510 and provided with a lug 532 (Fig. 6) on which is fastened the right-hand gage plate 284. It will thus be seen that the two gage plates are connected for simultaneous movements toward and from each other. Adjustment of the plates is effected by turning the shaft 516. For this purpose there is loosely mounted on the shaft a sleeve 534 (Fig. 6) connected to the shaft by a pin 536 which is fast in the shaft and normally lies in the vertical lower end portion of a spiral slot 538 in the sleeve. Formed on the sleeve 534 is a pinion 540 which is in mesh with a vertically elongated pinion 542 on a shaft 544 supported in a bearing in the bracket 518. Fast on the upper end of the shaft 544 is a hand lever 546 by which the adjustments of the gage plates 284 are effected. This lever carries a spring-pressed plunger 548 having a V-shaped end engaged by teeth 550 formed on a plate 552 that is adjustably fastened on the bracket 518 by a clamping screw 553, the lever being held in this manner in any adjusted position. Fastened to the plate 552 is a plate 554 graduated to indicate shoe sizes and cooperating with a pointer 556 on the lever 546 to indicate proper adjusted positions of the gage plates 284.

Figure 6:
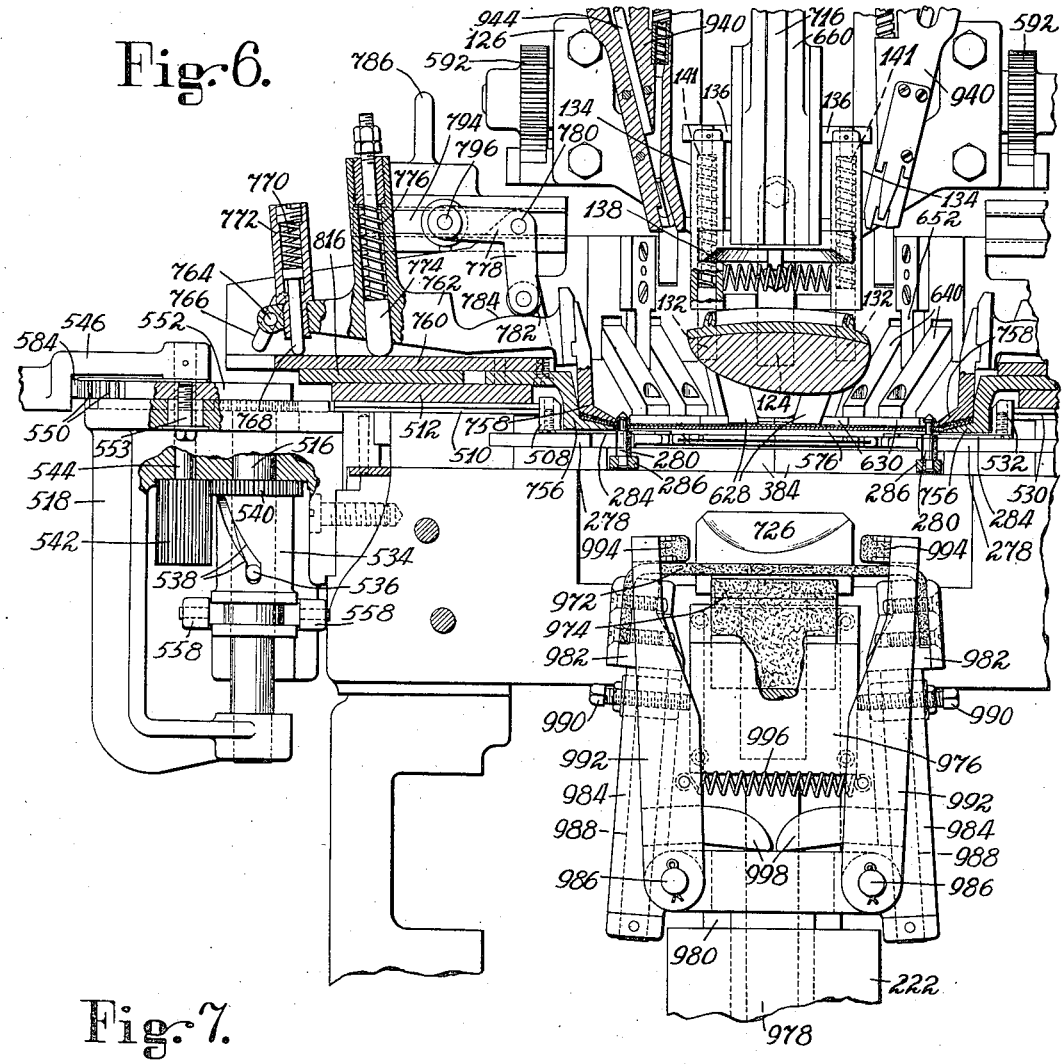
Fig. 6 shows a portion of the machine in front elevation, with parts in section.
Figure 7:
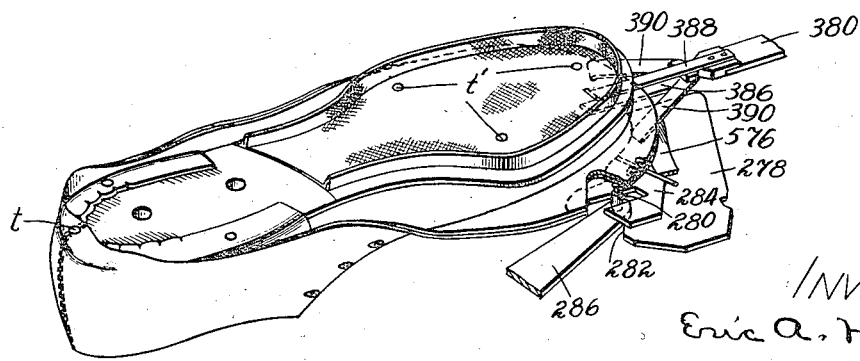
Fig. 7 is a perspective view illustrating the relation of a last and its shoe materials to the device for guiding the toe end of the upper as it is presented to the lasting means and showing also one of the jig pins in its relation to the associated wiper and gage plate.

Whatever may be the adjusted positions of the gage plates 284, it is necessary in the construction herein shown to retract them in each cycle of the machine to positions in which they are out of the way of tacking mechanism hereinafter referred to, and it is for this purpose that the sleeve 534 (Fig. 6) is loosely mounted on the shaft 516. It will be evident that by downward movement of this sleeve from the position in which it is shown in Fig. 6 the shaft 516 is turned by the spiral slot and pin connection 538, 536 between the sleeve and the shaft, the turning movement being in such a direction as to move both gage plates 284 in outward directions. In such downward movement the sleeve is held from turning by its connection with the vertically elongated pinion 542 the position of which is determined by the hand lever 546. To move the sleeve downwardly there is provided a bell-crank lever 558 (Figs. 2 and 6) fulcrumed on the bracket 518, one arm of this lever being forked to connect with the sleeve 534 as illustrated in Fig. 6 and the other arm being connected by a link 560 (Fig. 2) to an arm 562 fast on a rockshaft 564 (see also Fig. 8). Also fast on this rockshaft is an arm 566 provided with a roll 568 engaged by a peripheral cam 570 on a cam wheel 572 fast on the previously mentioned sleeve 180. A spring 574 (Fig. 2) connected to the bell-crank lever 558 serves to impart downward movement to the sleeve 534 when permitted by the cam 570, the cam returning the sleeve to its uppermost position in a positive manner. It will accordingly be evident that, notwithstanding the retractive movements of the gage plates 284 in each cycle of the machine, they are nevertheless always returned to the positions determined by adjustment of the hand lever 546.

Figure 5:
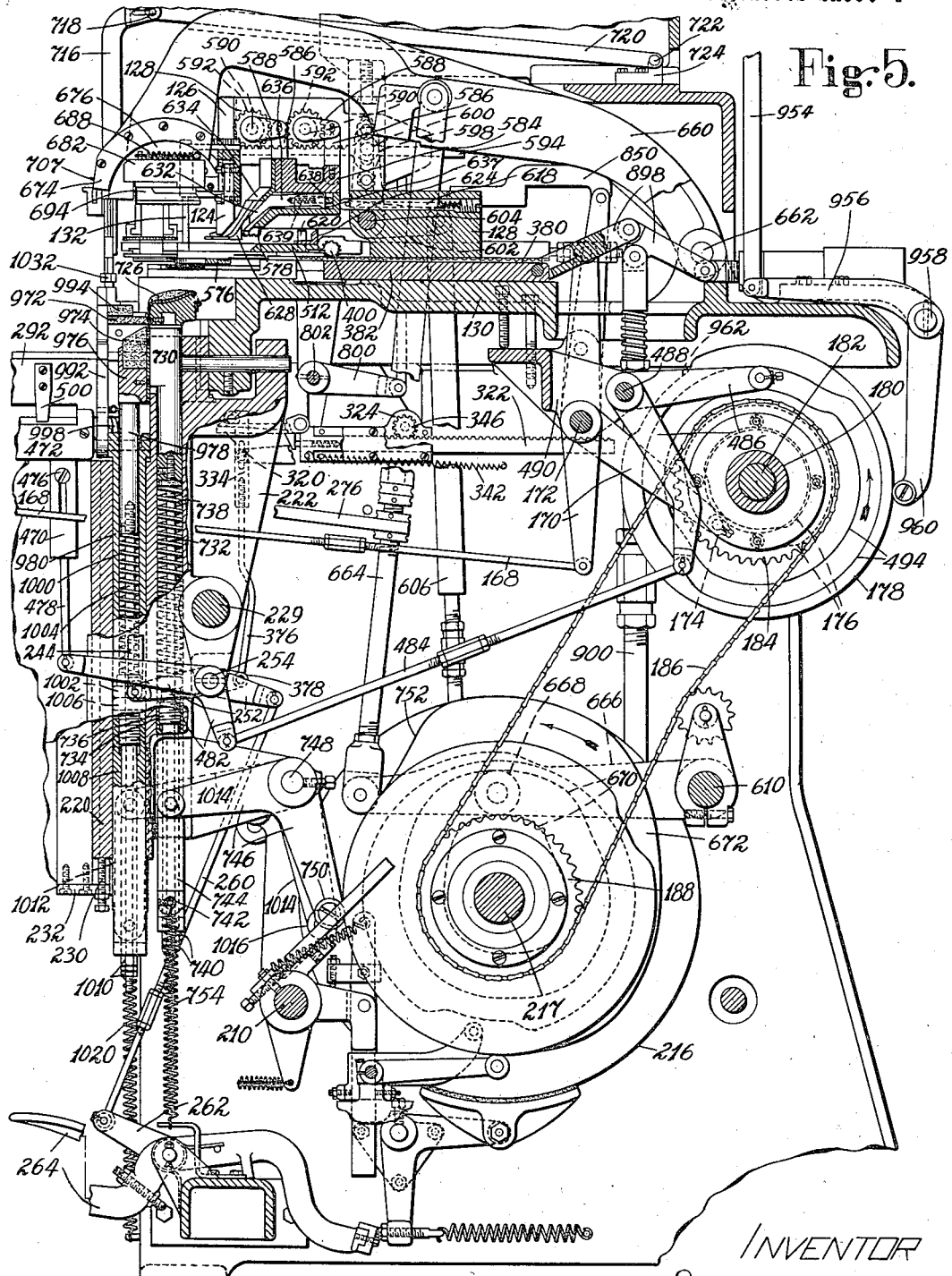
Fig. 5 is a view of the lower portion of the machine partly in right-hand side elevation and partly in section.
Figure 24:
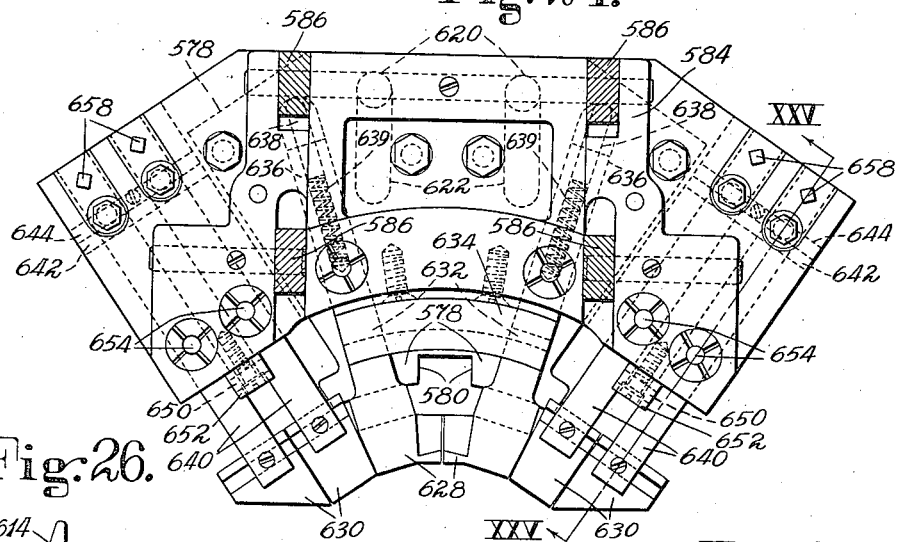
Fig. 24 is a plan view, with parts in section, of the means for clamping the marginal portion of the toe end of the upper.
Figure 26:
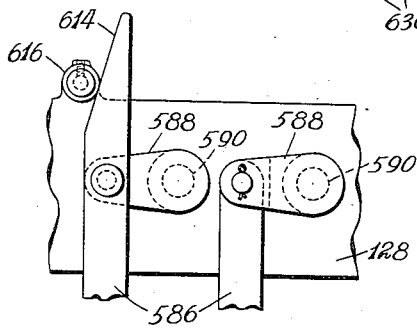
Fig. 26 is a view in left-hand side elevation of a portion of the upper-clamping mechanism.

As previously stated, the marginal portion of the toe end of the upper is clamped in its outspread position above the wipers 278 before the last receives its movement to stretch the upper lengthwise. The upper, however, is not clamped upon the wipers, but upon a stationary lower clamp member or plate 576 (Figs. 4, 5 and 11) positioned immediately above the wipers and fastened to the cover plate 512. For clamping the upper on the plate 576 there is provided means that acts positively to hold the margin of the upper against movement when the last receives its lengthwise upper-stretching movement, and other means that acts thereafter to press the margin of the upper yieldingly upon the plate 576 while permitting gradual withdrawal of the margin from the clamping means in response to the pull of the last thereon when the last receives its downward movement. The means for holding the upper positively comprises a clamp member 578 (Figs. 5 and 24) arranged to engage the upper for a substantial distance about the extreme end of the toe and having a notch 580 formed therein to clear the previously mentioned end gage 124. The member 578 is fast on a carrier 584 on which are also other clamp members hereinafter described, the carrier being supported by four parallel links 586 pivotally suspended at their upper ends on crank arms 588 (Figs. 4 and 5). The crank arms 588 are carried by rockshafts 590 mounted in bearings in the bracket 128, and also fast on these rockshafts are pinions 592. The two left-hand pinions 592 are engaged by a rack bar 594 movably mounted in the bracket 128, and the two right-hand pinions are similarly engaged by a rack bar 596. The rack bar 594 has a vertical slot 598 therein (Fig. 5) in which lies a roll 600 carried by one arm of a bell-crank lever 602 fast on a rockshaft 604, the other arm of this lever being connected by a link 606 to an arm 608 (Fig. 2) mounted on a shaft 610. The arm 608 carries a roll (not shown) engaged by a path cam 612 formed in one side of the cam wheel 216. The right-hand rack bar 596 is similarly connected to an arm 613 (Fig. 4) fast on the rockshaft 604. It will thus be seen that as the two rack bars are moved toward the front of the machine by the mechanism described the carrier 584 is lowered by the crank arms 588 and the links 586, the links being moved bodily downward. One of the right-hand pair of links 586 is extended upwardly (Figs. 4 and 26) and has an inclined face 614 engaged by a roll 616 on the bracket 128, and mounted in this bracket is a spring-pressed plunger 618 (Figs. 4 and 5) which by engagement with the rear end of the member 578 tends to move the carrier 584 and the parts supported thereon toward the front of the machine while swinging the links 586, thus maintaining the face 614 in engagement with the roll 616. Accordingly, as the carrier 584 is lowered to carry the clamp members thereon toward the plane of the plate 576, it is also moved along this plane from an initial retracted position, such movement being controlled by the roll 616 in engagement with the face 614 on the upwardly extended links 586. It will be evident that by the parallel links 586 the carrier and the clamp members thereon are so controlled that they are maintained in substantially the same angular relation to the plate 576 during their movements toward clamping position. To insure against any objectionable displacement of the margin of the upper by the clamp members as the latter are carried into engagement with it, there is provided means for further controlling the carrier 584 in such manner that its final upper-clamping movement is in a direction perpendicular to the plane of the plate 576. This means comprises two pins 620 (Figs. 5 and 24) fast on the cover plate 512 and arranged to enter slots 622 in the member 578, and also a projection 624 on the cover plate between which and the pins 620 a portion of the member 578 enters. It will be understood that movement of the carrier 584 toward the front of the machine is stopped by the pins 620 and thereafter the carrier is moved directly downward to carry the clamp members into clamping position. The clamp member 578 has teeth on its clamping face, and on the portion of the plate 576 that is opposite this clamping face there are corrugations 626 (Fig. 11) to insure that the upper will be held against slipping.

In addition to the positive clamp member 578, there are mounted on the carrier 584, as above suggested, other clamp members which clamp the upper yieldingly against the plate 576 in locations farther from the edge of the upper than the member 578. There are six of these yieldable clamp members, comprising an intermediate pair of members 628 (Fig. 24) and a pair of members 630 at each side of the pair of members 628. The members 628 and 630 have smooth upper-engaging faces that cooperate with smooth portions of the upper face of the plate 576 to permit the marginal portion of the upper to slip in response to the pull of the last thereon in the downward movement of the last, as hereinbefore described. As indicated in Fig. 5, the upper-engaging portions of the members 628 and 630 occupy initially lower positions than the member 578, so that as the carrier 584 is moved downwardly these members engage the upper before the member 578. To guard against any objectionable displacement of the marginal portion of the upper by the members 628 and 630 during further movement of the carrier 584 to bring the member 578 into clamping position, and for better insurance that the toe end of the upper materials, when clamped, will lie in a smoothly outspread condition, the construction is such that during the yield of the members 628 and 630 that occurs in such further movement of the carrier they are moved outwardly toward the edge of the upper along the surface of the upper. For this purpose each member 628 has an upwardly inclined portion 632 engaged by an inclined plate 634 fast on the carrier 584, and a substantially horizontal arm 636 that lies in a recess in the member 578. This recess is larger vertically than the arm 636, and the arm has at its inner end a depending lug 637 that rests on the member 578. A plunger 638 and a spring 639 in the arm 636 hold the member 628 initially in the position indicated in Fig. 5. During such further downward movement of the carrier 584 as occurs after the member 628 arrives in upper-engaging position, the member is moved outward toward the edge of the upper against the resistance of the spring 639 by the action of the plate 634 on the inclined portion 632 of the member, the arm 636 being at the same time tipped upwardly. These movements of the two members 628 not only insure against objectionable displacement of the margin of the upper inwardly toward the last, but also have the tendency to straighten the marginal portion of the upper outwardly over the plate 576 before the upper is clamped by the member 578.

Figure 25:
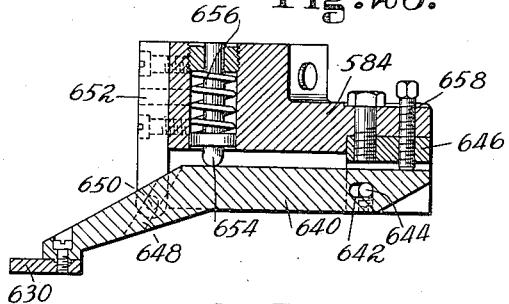
Fig. 25 is a section on the line XXV—XXV of Fig. 24.

Control of the members 630 to produce results substantially as described with reference to the members 628 is afforded by the construction shown in Fig. 25. Each member 630 is fastened to an arm 640 mounted in a recess in the carrier 584, and extending through slots 642 in the outer end portions of each pair of adjacent arms 640 is a pin 644 which is fast in a holder 646 on the carrier. Formed in the sides of the arms that face each other are inclined slots 648 into which extend the opposite ends of a pin 650 mounted in a block 652 on the carrier 584. A plunger 654 controlled by a spring 656 bears on the upper face of each arm 640 and tends to force it downwardly, the limit of movement of the arm about the axis of the pin 644 being determined adjustably by a stop screw 658. It will thus be seen that upon engagement of each member 630 with the upper the spring 656 yields as the carrier 584 continues its movement, and that by reason of the pin-and-slot guiding means between the arm 640 and the carrier there is imparted to the member 630 an outward movement toward the edge of the upper similar to the movement of each member 628.

The cam 612 that operates the above-described upper-clamping means is so shaped that after the movement of the last to stretch the upper lengthwise an upward movement is imparted to the carrier 584 of such extent as to relieve the clamping pressure of the positive clamp member 578 upon the upper. This movement, however, terminates with the clamp members 628 and 630 still held yieldingly in clamping engagement with the upper by their controlling springs 639 and 656, so as to retain control of the marginal portion of the upper as the last receives its downward movement while giving up upper stock as required in the progressive shaping of the upper to the contour of the last.

Figure 27:
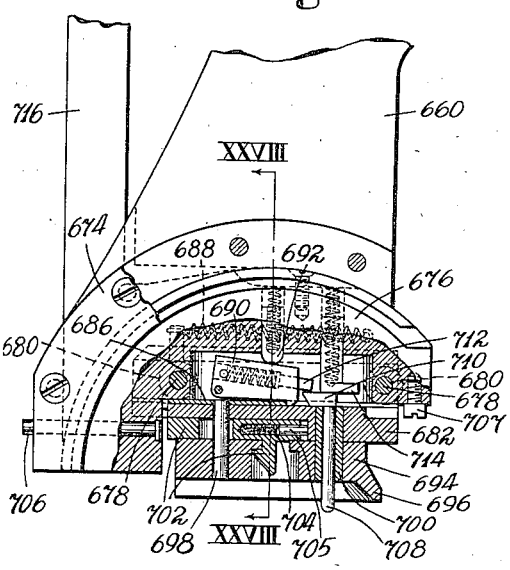
Fig. 27 is a view in right-hand side elevation, with parts broken away, showing a portion of the means for engaging the insole and imparting heightwise movement to the last and shoe.
Figure 28:
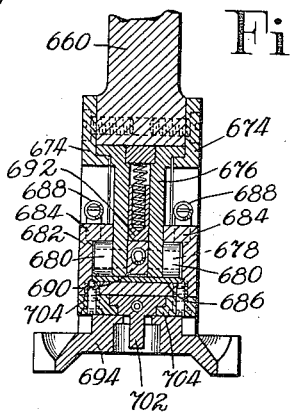
Fig. 28 is a section on the line XXVIII—XXVIII of Fig. 27.

The means for imparting downward movement to the last and the work support in the operation of the machine comprises an arm 660 (Fig. 5) pivoted at 662 on the top plate 130, this arm being connected by a link 664 to an arm 666 pivotally mounted on the rod 610 and provided with a roll 668 engaged by a path cam 670 formed in one side of a cam wheel 672 on the shaft 217. It is this link 664 that carries the bar 276 previously referred to as the means that causes the locking of the work support at the end of its downward movement. Supported on the front end portion of the arm 660 by means of curved gibs 674 (Figs. 27 and 28) that are fastened on opposite sides of the arm is a block 676, the block being swiveled on the gibs for movements about an axis extending widthwise of the last approximately in the location of the bottom face of the insole when the arm 662 is in its shoe-depressing position. Mounted on pins 678 that are fast in the block 676 are four rolls 680, and supported on these rolls is a carrier 682 provided with flanges 684 above the rolls and having a bottom portion extending beneath the rolls from one side of the carrier to the other side. Between this bottom portion of the carrier and the rolls is a thin plate 686 which is fast in the carrier and between which and the flanges 684 the rolls are so confined as to prevent any substantial lost motion heightwise of the shoe between the carrier and the block 676. Springs 688 connected to the carrier 682 and to the block 676 tend to move the carrier in a direction toward the rear of the machine. Initially the carrier is held retracted against the resistance of the springs 688 by a latch 690 which is pivoted to the block 676 within a recess in the block and is urged downwardly by a spring-pressed plunger 692 in the block. In its operating position the latch 690 holds the carrier 682 retracted by engagement with an edge of the plate 686, as shown in Fig. 27. The carrier 682 serves as a support for a shoe-depressing member or plate 694 provided with a downwardly and outwardly extending rim 696 curved similarly to the toe-end portion of the lip of the insole and arranged to support the lip against the inwardly directed pressure of the toe wipers in the lasting operation. The plate 694 is positioned in proper relation to the carrier 682 by a pin 698 and a bushing 700 which are fast on the carrier and project into holes in the plate. To support the plate in the position thus determined there is provided a latch 702 supported by gibs 704 for sliding movements in a recess in the carrier and extending downwardly into position to hook under a portion of the plate in a recess in the latter, as illustrated in Fig. 27. The latch 702 is movable into position to release the plate 694 against the resistance of a spring 704 and a plunger 705, so that the plate may be readily detached at any time to permit a plate of different contour to be substituted for operating upon a shoe of a different size or style. For thus moving the latch there is provided a pin 706 slidingly movable in the block 676 and arranged to engage an end of the latch.

When the carrier 682 that supports the plate 694 is held retracted by the latch 690 as above described, it is so positioned relatively to the arm 660 that as the plate is carried substantially into insole-engaging position by the downward movement of the arm that portion of the rim 696 of the plate that is nearest the end of the toe is at some distance rearwardly of the corresponding portion of the lip of the insole. This affords insurance that the plate will seat itself upon the insole without engaging the top of the lip. Substantially at the time when the plate 694 arrives in insole-engaging position the carrier 682 is released to the action of the springs 688 which then move the carrier toward the end of the toe to carry the rim 696 into contact with the portion of the lip that extends around the end of the toe, such movement of the carrier being limited by contact of a shoulder thereon with the head of a screw 707 in the block 676 (Fig. 53). For thus releasing the carrier there is provided a pin 708 slidingly mounted in the bushing 700 and having at its upper end a finger 710 arranged to contact with a spring-pressed pin 712 in the latch 690 so as to lift the latch. Such lifting of the latch results from contact of the lower end of the pin 708 with the insole just before the plate 694 engages the insole. The pin 708 is controlled by a spring-pressed plunger 714 mounted in the block 676 and tending to force the pin downwardly. By such movement of the carrier 682 the finger 710 is carried away from the pin 712 (Fig. 53), so that the latch 690 is released and is pressed down on the upper face of the plate 686 by the plunger 692. When in the operation of the machine the last receives its lengthwise movement to stretch the upper, as hereinbefore described, the plate 694 and its carrier 682 are moved with it by reason of contact of the insole with the plate, the carrier being thus moved into position to be again caught and held by the latch 690. It will be evident that in this movement the finger 710 will force back the spring-pressed pin 712 in the latch by engaging the end of the pin. When the shoe is finally released by the upward movement of the arm 660, the pin 708 is returned to its initial position by the plunger 714 and accordingly the pin 712 is released by the finger 710 (Fig. 27).

It will be evident that the block 676 is swiveled on the gibs 674 in the manner described in order to permit such relative movement of the block and the arm 660 during depression of the shoe as is required by reason of the fact that the downward movement of the shoe support is a rectilinear movement while the movement of the arm 660 is a swinging movement. It is desirable to control the block 676 in such manner that when the plate 694 arrives in position to engage the insole it will be substantially parallel to the bottom face of the insole. For this purpose the block has integral therewith an upwardly extending bar 716 (Fig. 5) a portion of which is located in a recess in the arm 660, and this bar is connected adjustably by a bolt 718 to the front end of an arm 720 the rear end of which is pivoted at 722 on a stationary bracket 724. By this means relative movement of the block 676 and the arm 660 is at all times controlled and the position of the block relatively to the arm is determinately varied during the swinging of the arm, the relation of the axis of the arm 720 to that of the arm 660 being such that the plate 694 is maintained in substantially parallel relation to the bottom face of the toe end of the insole as it approaches the insole and during the depression of the shoe.

To assist in the lasting operation there is further provided a toe rest 726 (Fig. 5) comprising a metal block hollowed out on its top face to conform substantially to the contour of the top of the toe portion of the shoe and having a leather cover thereon. This toe rest is mounted upon the upper end of a post 730 vertically movable in an opening in the bracket 222 and having threaded in its lower end a downwardly extending rod 732. The rod 732 extends through a thimble 734 which is threaded in the upper end of a sleeve 736 also movable vertically in the opening in the bracket 222, and between this thimble and the lower end of the post 730 is a spring 738. On the lower end of the rod 732 are nuts 740 in engagement with the lower end of the sleeve member 736, and by this means the spring 738 is held compressed between the post 730 and the thimble 734. Pivotally connected to an offset lug 742 (Fig. 1) at the lower end of the sleeve member 736 is a link 744 (Fig. 5) which is connected at its upper end to one arm of a bell-crank lever 746 mounted on a rod 748 on the bracket 222, the other arm of this bell-crank lever carrying a roll 750 in engagement with a peripheral cam 752 on the cam wheel 672. Initially the toe rest occupies a position considerably below the plane of the toe wipers, as illustrated in Figs. 5 and 6, so as not to interfere with the presentation of the work. After the marginal portion of the upper has been clamped as hereinbefore described, but before the last is moved lengthwise to stretch the upper, the toe rest is moved upwardly into clamping engagement with the upper by the operation of the bell-crank lever 746, the post 730 and the sleeve 736 being moved upwardly as a unit until the toe rest engages the shoe, whereupon the spring 738 is compressed by further upward movement of the sleeve. Thereafter the toe rest is forced downward in response to the pressure of the upper and the last thereon as the last receives its downward movement, the sleeve 736 being held stationary at this time and the spring 738 being further compressed by the downward movement of the toe rest and its post 730. Later in the cycle, after the toe wipers have wiped the upper inwardly over the feather of the insole, the spring 738 is rendered effective, in response to a short upward movement of the shoe-depressing arm 660, to force the shoe more firmly up against the wipers. In the final return of the parts to starting positions the toe rest is lowered by the action of a spring 754 connected to the lug 742 on the sleeve 736, this spring acting through the sleeve and the nuts 740 on the rod 732 to impart downward movement to the toe rest post 730 when permitted by the cam 752.

In general similarity to the disclosure of the previously mentioned Letters Patent the machine is also provided with grippers for gripping the outspread marginal portion of the upper at the opposite sides of the forepart rearwardly of the peviously described clamping means to assist in drawing the upper tightly over the forepart of the last and to insure that the opposite ends of the tip seam will be located at the proper distances from the toe end face of the last at the end of the upper-shaping operation. These grippers are positioned immediately over the previously mentioned gage plates 284 (Figs. 6 and 11) and grip the upper at the ends of the tip seam adjacent to the jig pins 280 and in locations extending both forwardly and rearwardly of the tip seam. Each gripper comprises a lower jaw 756 and an upper jaw 758. The jaw 756 is fastened to the lower face of a carrier 760 having two upwardly extending side portions between which is mounted an arm 762 on the inner end of which the upper jaw 758 is secured. The arm 762 at its outer end carries a pin 764 extending into slots 766 formed in the side portions of the carrier 760, and slidingly movable in an opening in the arm is a plunger 768 which bears at its lower end on the carrier 760 and is engaged at its upper end by a spring 770 mounted in a holder 772 on the arm 762. By this means the outer end of the arm is initially upraised as far as permitted by the pin and slot connection 764, 766. Mounted also in the arm 762 is another plunger 774 in engagement with the carrier 760 and controlled by a spring 776, these parts tending to swing the arm in an upward direction to separate the jaw 758 from the jaw 756. The arm 762 is further controlled by a bell-crank lever 778 pivoted on a stud 780 on the carrier 760, one arm of this lever carrying a roll 782 in engagement with a cam face 784 on the arm. It will thus be seen that by movement of the bell-crank lever 778 in a counter-clockwise direction (Fig. 6) the arm 762 is forced downwardly to carry the jaw 758 into upper-gripping position, swinging about the axis of the pin 764. After the jaw 758 has thus arrived in gripping position, the arm 762, by further movement of the bell-crank lever 778, is swung downward about the fulcrum provided by the lower jaw 756, the springs 770 and 776 being compressed more or less in accordance with variations in the thicknesses of different uppers. The pin 764 is thus carried downward along the slots 766, and in the construction herein shown these slots are inclined in such manner as to insure against any inward displacement of the margin of the upper by the jaw 758. Their inclination is, in fact, such as to impart to the jaw 758 and the arm 762 some outward movement, so that the jaw has an outward drawing action on the margin of the upper for better insurance that the margin will be properly gripped in outspread condition between the jaws.

Figure 8:
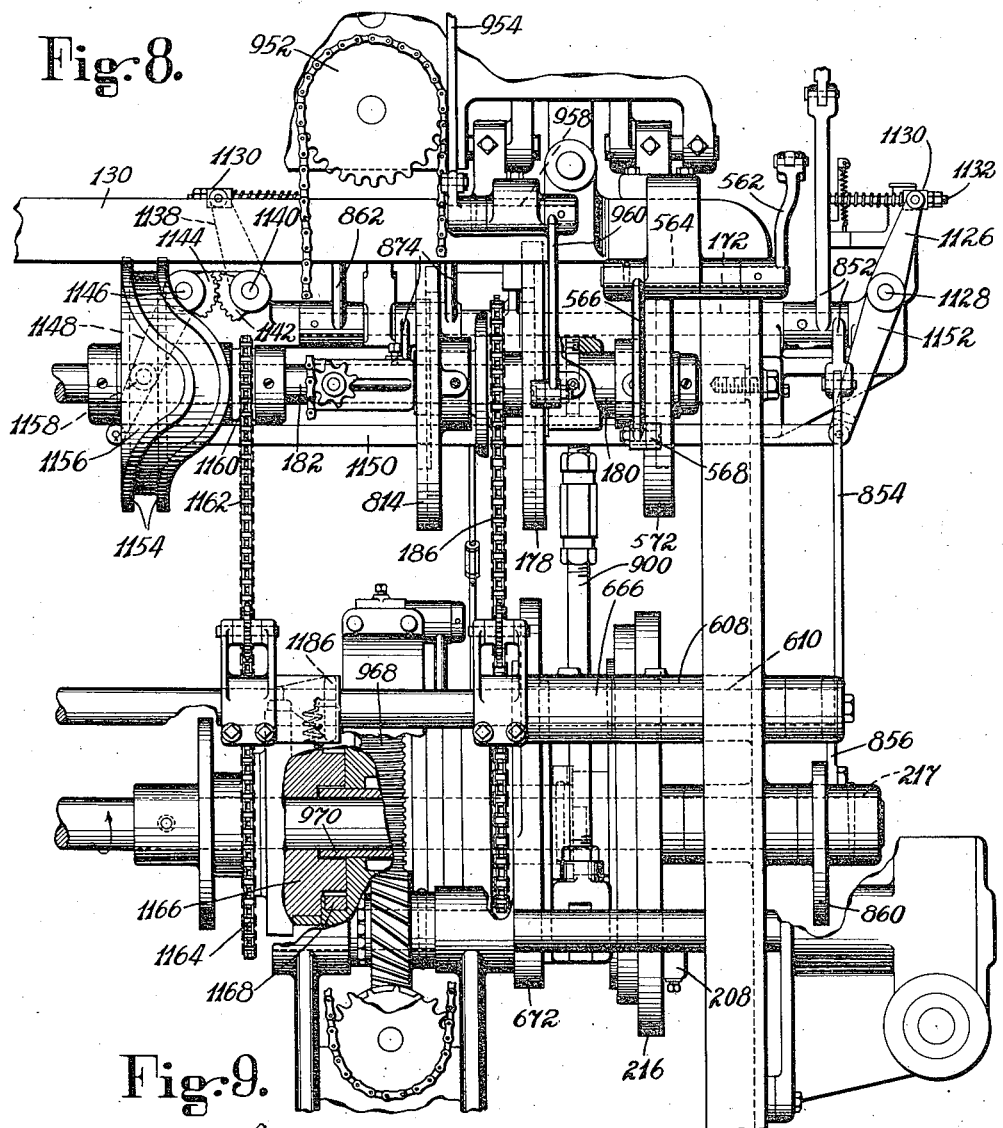
Fig. 8 is a view of the lower portion of the machine in rear elevation, with parts broken away.
Figure 29:
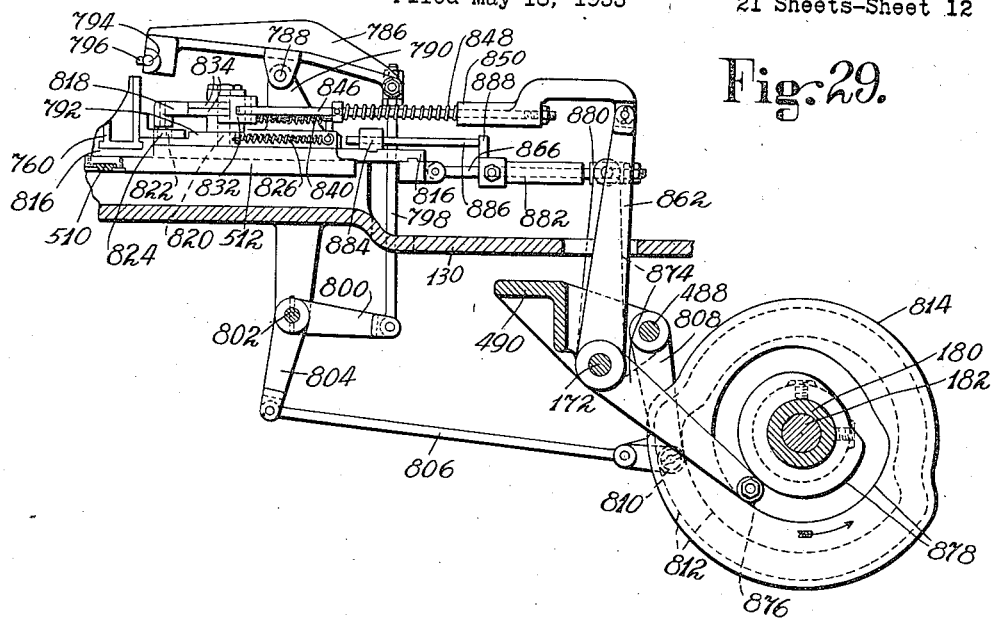
Fig. 29 is a view, partly in right-hand side elevation and partly in section, of a portion of the means for controlling and operating one of the side grippers.

For operating each bell-crank lever 778 there is provided a lever 786 (Figs. 2 and 29) pivotally mounted between its ends on a pin 788 supported on spaced arms 790 that project upwardly from a plate 792 fast on the cover plate 512. For connecting the lever 786 at its front end to the bell-crank lever 778 there are provided two pins 794 and 796 arranged at right angles to each other and in fixed relation to each other, the pin 794 being swiveled in a transverse bearing in the lever 786 and the pin 796 extending through a bearing in the bell-crank lever. By this means connection is maintained between the lever 786 and the bell-crank lever 778 at all times, with provision for movements of the gripper both laterally of the shoe and lengthwise of the shoe as hereinafter described. Each lever 786 is connected at its rear end by a link 798 (Fig. 29) to an arm 800 fast on a rockshaft 802 supported by depending arms on the top frame plate 130, and also fast on this rockshaft is an arm 804 connected by a link 806 to an arm 808 pivotally mounted on the shaft 488. The arm 808 carries a roll 810 engaged by a path cam 812 formed in a cam wheel 814 which is fast on the sleeve 180 that carries the previously mentioned cam wheels 178 and 572 (Fig. 8). By the action of the cam 812 gripper-closing movements are accordingly imparted to the bell-crank levers 778 associated with the opposite side grippers.

Each gripper carrier 760 is mounted for movements in directions widthwise of the last in guideways formed in the front end of a slide 816 which is mounted for movements in directions lengthwise of the last on the cover plate 512. Each gripper carrier is controlled by an arm 818 (Figs. 4 and 29) mounted for swinging movement about a vertical pin 820 on the slide 816 and provided with a roll 822 which lies between fingers 824 on the side of the carrier 760. A spring 826 connected to the arm 818 tends to force the gripper carrier outwardly, its outward movement being limited initially by engagement of the lower gripper jaw 756 with the lug 508 (Fig. 6) on which the gage plate 284 is mounted. For imparting inward movement to the gripper carrier there is provided an arm 828 (Fig. 4) also mounted to swing about the pin 820, on the outer end of which arm there is pivoted on a pin 830 another arm 832 that controls pawls 834 arranged to cooperate with ratchet teeth 836 on the arm 818. The pawls 834 also are pivoted on the pin 830 and are held normally by a spring 838 in positions determined by a shoulder (not shown) on the arm 832. When movement toward the front of the machine is imparted to the arm 832 the pawls are first swung into engagement with the ratchet teeth by movement of the arm 832 relatively to the arm 828, the latter being held in its initial position by a spring 840. Further swinging movement of the arm 832 after the pawls engage the ratchet teeth carries a lug 842 on the arm into engagement with a lug 844 on the arm 828, whereupon by further movement of the arm 832 the arm 828 is carried with it and movement is imparted also through the pawl and ratchet mechanism to the arm 818, thus forcing the gripper carrier inwardly toward the side of the last.

Each arm 832 is operated by a rod 846 to which movement is imparted yieldingly through a spring 848 by a sleeve member 850 slidingly mounted on the rod. The sleeve member 850 at the left-hand side of the machine is connected to one arm of a bell-crank lever 852 (Figs. 2, 4 and 8) fast on the rockshaft 172, the other arm of this lever being connected by a link 854 to an arm 856 that is mounted to swing about the shaft 610 and carries a roll 858 engaged by a cam 860 on the shaft 217. Connected to the arm 856 is a spring 861 that holds the roll against the cam. It will be understood that since the bell-crank lever 852 is fast on the shaft 172 this shaft is rocked by the cam 860. For operating the sleeve member 850 at the right-hand side of the machine there is connected to this member an arm 862 (Figs. 4, 8 and 29) which is fast on the shaft 172 and is therefore operated simultaneously with the bell-crank lever 852. The shape of the cam 860 (Fig. 2) is such that a short inward movement is imparted to the grippers before they grip the upper, so as to insure that they will under all conditions grip a sufficiently wide margin of the upper. When the work is first presented the margin of the upper is outspread over the lower gripper jaws 756, as will be evident by reference to Figs. 6 and 11, but the grippers are at this time retracted far enough to permit the jig pins 280 to enter the slots in the wipers and the gage plates 284. The gripper jaws are so shaped that the portions thereof that are nearest the end of the toe extend farther inwardly than other portions, in front of the jig pins, and the jaws are also provided with recesses located opposite the jig pins, the recesses in the lower jaw being indicated at 864 (Fig. 11). This permits the gripper jaws to be moved a little farther inward before gripping the upper, as above described, after the upper has been presented by the jig pins. Thereafter, at the time in the cycle of the machine when downward movement is imparted to the last, the grippers are moved farther inwardly toward the sides of the last by the cam 860 to maintain control of the side margins of the upper. If at any time the pull of the upper on the grippers should become great enough, they may be pulled inwardly toward the last by the upper, since the pawl and ratchet mechanisms 834, 836 permit inward swinging movements of the arms 818 relatively to the arms 828.

As the grippers are moved inwardly toward the sides of the last in the course of the downward movement of the last, as above described, they are also moved lengthwise of the last toward the heel end of the latter to assist in the proper lasting of the toe and in locating the ends of the tip seam at the proper distances from the end face of the last, as more fully described in the previously mentioned Letters Patent. For this purpose, in the construction herein shown, the slides 816 upon which the gripper carriers 760 are mounted are moved lengthwise of the last through rods 866 pivotally connected to the rear ends of the slides. The left-hand rod 866 is operated by a bell-crank lever 868 (Figs. 2 and 4) mounted to turn about the shaft 172 and provided with a roll 870 engaged by a path cam 872 in the cam wheel 572. The right-hand rod 866 is operated by a bell-crank lever 874 (Fig. 29) mounted to turn on the shaft 172 and provided with a roll 876 engaged by a path cam 878 in the cam wheel 814. It will be understood that both bell-crank levers 868 and 874 are operated in unison by their cams. Between them and the associated rods 866 there is, however, provision for lost-motion which may be varied independently with respect to each of them so as to vary the amount of movement lengthwise of the last imparted respectively to the different grippers. For this purpose there is pivotally mounted on the upper end of each bell-crank lever a sleeve 880 which is confined at one end by nuts on the rod and may slide along the rod a variable distance determined by adjustment of a sleeve 882 fastened to the rod. It will be understood that by contact of the sleeve 880 with the sleeve 882 there is imparted to the slide 816 movement the extent of which is determined by adjustment of the sleeve 882. For better insurance that the ends of the tip seam will be located at exactly the proper distance from the toe end face of the last at the completion of the lasting operation, there is further provided means for guarding against any possible further movement of the grippers lengthwise of the last by strain of the upper thereon after the bell-crank levers 868 and 874 have come to a stop. For this purpose there is slidingly mounted in a block 884 (Fig. 29) fast on each slide 816 a rod 886 arranged to contact at its rear end with a lug 888 on the sleeve 882 and at its front end with a shoulder on the plate 792. The rod 886, the lug 888 and the plate 792 thus serve as stop mechanism to limit the movement of the rod 866. The distance that the sleeve 880 is moved is equal to the distance between it and the sleeve 882 plus the distance that the sleeve 882 is moved before the rod 886 abuts against both the lug 888 and the shoulder on the plate 792, and it will be evident that this is true irrespective of the adjusted position of the sleeve 882 on the rod 866. Accordingly the rod 886 always prevents any further movement of the gripper such as might otherwise be permitted by the space between the sleeve 880 and the nuts on the end of the rod 866 when the two sleeves 880 and 882 are in contact with each other, the amount of relative movement of the parts of the stop mechanism being inversely proportional to the amount of variable lost motion between the sleeves 880 and 882. It will be understood that in the movement of each gripper carrier 760 widthwise of the last the pin 794 slides along its bearing in the end of the gripper-closing lever 786 and that in the movement of the gripper lengthwise of the last the gripper-closing bell-crank lever 778 slides along the pin 796.

The toe wipers 278, as previously stated, are mounted on wiper carriers 384 which are operated by a slide 382 (Fig. 5). On the front end of the slide are arms 890 (Fig. 11) connected by links 892 to the wiper carriers. For guiding the wiper carriers in the proper paths to cause the wipers to close laterally of the shoe as well as advance lengthwise of the shoe there are provided rolls 894 and 896 supported on the top frame plate 130 and lying in curved slots in the carriers. The slide 382 is operated through a toggle 898 (Fig. 5) by a link 900 the lower end of which is pivotally connected to an arm 902 (Fig. 2) mounted to swing about the shaft 210 and provided with a roll 904 engaged by a path cam 906 formed in one side of the cam wheel 216. This wiper-operating mechanism is thus of substantially the same character as disclosed in the previously mentioned Letters Patent. In the construction herein shown the wipers 278 are detachably held on the wiper carriers 384 by latch members 908 (Fig. 11) which are pivoted in recesses in the wiper carriers and interlock with the wipers as illustrated. Each latch member is held normally in wiper-retaining position by a spring 910 in the wiper carrier, the spring being connected at one end to a pin 912 on the latch member. For operating the latch members to release the wipers when desired there are provided slides 914 mounted in guideways in the top frame plate 130 and each having an inclined inner end face 916 arranged to engage a downward extension of the pin 912. Each slide 914 is controlled by a lever 918 pivoted at 920, one on the bracket 518 and the other on the bracket 528, the rear end of the lever lying in a notch in the slide. Connected to the front end of each lever 918 is a transverse slide 922. When the operator desires to release the wipers he pulls the two slides 922 outwardly, and through the connections described the latch members 908 are in this manner swung into inoperative positions by engagement of the slides 914 with the pins 912. It will be understood that by the operative movements of the wiper carriers the pins 912 are carried away from the ends of the slides 914 and that the pins are returned to positions opposite the ends of these slides when the wiper carriers are returned to their starting positions.

Figure 58:
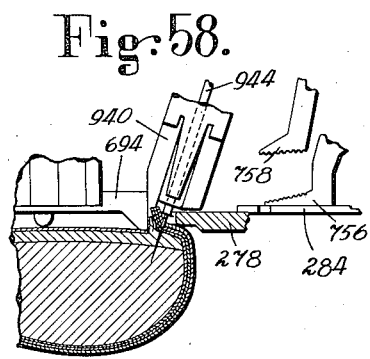
Fig. 58 illustrates the driving of one of the fastenings located immediately at the rear of the toe binder.
Figure 59:
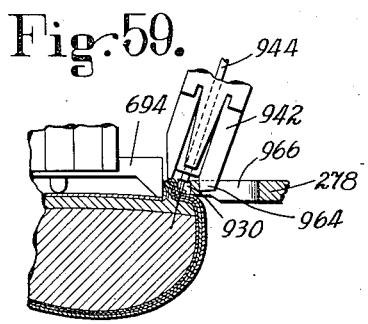
Fig. 59 illustrates the driving of one of the fastenings through the loop in the end of the toe binder.
Figure 60:
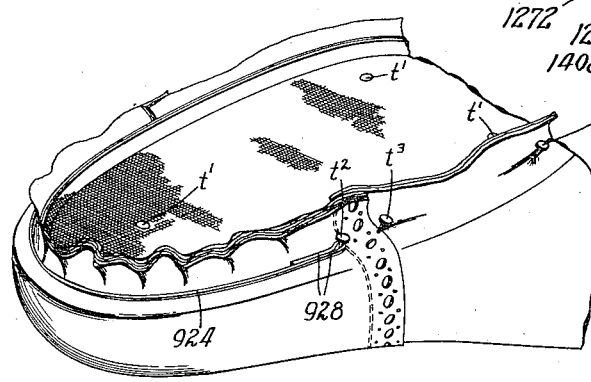
Fig. 60 is a perspective view of the forepart of a shoe lasted by use of the machine.

As the wipers 278 are advanced and closed they carry with them and apply to the upper around the toe a toe binder 924 (Fig. 60), the binder being positioned in a groove 926 (Fig. 11) in the wiping edges of the wipers. As illustrated, this binder is formed of wire and is provided at its ends with loops 928 which lie in enlargements of the groove 926. As thus positioned in the wipers all portions of the binder lie substantially flush with the wiping edges. The binder is presented in the groove 926 in the wipers and the loops 928 are formed thereon prior to the presentation of the work to the machine by the use of mechanism hereinafter described. The openings in the loops are thus positioned in vertical alinement with notches 930 in the edges of the wipers to receive tacks $t^2$ (Fig. 60) driven to fasten the binder to the shoe. These tacks, and other tacks $t^3$ that enter the shoe through notches 932 in the wipers for holding the upper a short distance rearwardly of the ends of the binder, are driven by tacking mechanism shown as a whole in front elevation in Fig. 1. This tacking mechanism is of substantially the same construction, except in certain respects hereinafter noted, as the tacking mechanism disclosed in the above-mentioned Letters Patent, and therefore need not be described in detail. It comprises a carrier 934 movable downwardly and upwardly in the cycle of the machine, and pivoted at 936 on this carrier for swinging movements laterally of the shoe are tacker arms 938 to which movements toward and from each other are imparted in time relation to the movements of the carrier. Supported on each arm 938 are a plurality of tackers yieldingly controlled in such manner as to permit them to move relatively to each other both heightwise and widthwise of the shoe. In the construction herein shown each arm 938 carries only two such tackers, namely a tacker 940 for driving the tack $t^3$ at the rear of the binder and a tacker 942 (Fig. 59) for driving the tack $t^2$ through the loop in the binder. It will be understood that each tacker comprises a tack holder and a tack driver 944, the tacks being supplied to the tack holders by tack-separating mechanism 946 (Fig. 1) mounted on a stationary part of the machine. From the tack-separating mechanism the tacks are conducted through telescopic tubes 948, the lower portions of which move vertically with the carrier 934, to flexible tubes 950 that lead to the tack holders. The tacker mechanism is operated through a clutch separate from the main clutch (hereinafter referred to), this separate clutch being driven by a sprocket wheel 952 (Fig. 8) and being actuated at that time in the cycle of the machine when the toe wipers 278 have substantially completed their inward wiping movements, all as fully disclosed in the above-mentioned Letters Patent. In the construction herein shown, however, the tacker clutch is controlled by a link 954 (Figs. 5 and 8) connected to an arm 956 on a rockshaft 958, the rockshaft being controlled through an arm 960 by a cam 962 on the cam wheel 178. As the tacker mechanism begins its operation the carrier 934 is lowered to carry the tackers downwardly toward the wipers, and the arms 938 are swung first outwardly and then inwardly, as the tackers approach the plane of the wipers, to carry them into the proper positions for driving the tacks in the notches in the wipers. The positions of the tackers 940 that drive the tacks t³ are determined by contact of their lower end portions with shoulders on the plate 694 that rests on the insole, as illustrated in Fig. 58. To insure an accurate relation between the tackers 942 and the binder loops located at the notches 930 in the wipers, so that the tacks will always enter the loops, each tacker 942 in the construction herein shown has a downwardly extending finger 964 (Fig. 59) which enters a slot 966 in the wiper beneath it and engages a shoulder at the inner end of the slot. Each slot 966 (Figs. 41 and 42) has a comparatively wide portion that the finger 964 first enters and a narrower portion into which the finger is carried so as to interlock with the wiper. After the tackers have thus been properly positioned the tacks are driven and the tacker mechanism is then returned to starting position.

The main clutch above referred to is driven by a worm gear 968 (Fig. 8) which turns on a sleeve 970 on the shaft 217 and is operated continuously by driving means of the same character as disclosed in the above-mentioned Letters Patent. The construction of this clutch and of the means whereby it is controlled is also substantially as therein disclosed and therefore need not be described in detail. The clutch is located at the right-hand side of the worm gear 968, as the parts are viewed in Fig. 8, and in the construction herein shown serves to connect the worm gear to the shaft 217 which turns with the cam wheels 216 and 672. Whenever the shaft 217 is thus rotated the sleeve 180 that carries the cam wheels 178, 572 and 814 also is rotated about the stationary shaft 182 by the chain 186 driven by the sprocket wheel 188 (Fig. 5), this sprocket wheel turning with the cam wheel 672. The clutch is actuated in the first instance by the starting treadle 264 and is so controlled that the parts driven thereby come automatically to a stop at that time in the cycle when the toe wipers 278 are at the end of their wiping movements in pressure-applying relation to the upper. The tacker mechanism driven, as above explained, through a separate clutch, then performs its operations, after which the main clutch is actuated by automatic means to cause the parts driven thereby to return to their starting positions, as fully disclosed in the above-mentioned Letters Patent.

In addition to the means described for lasting the toe portion of the shoe, the machine herein shown in further provided with means for lasting the forepart of the shoe from the toe portion substantially as far rearwardly as the ball line. For this purpose there is provided (Figs. 5 and 6) a rubber band or apron 972 extending initially in a horizontal plane under portions of the forepart of the shoe at the rear of the toe rest 126, i. e., farther from the end of the toe than the toe rest, and a rubber pad 974 under the band for applying pressure through the band to the top of the forepart of the upper. The pad 974 is mounted in a recess in a block 976 on the upper end of a plunger 978 which is vertically movable in a sleeve 980, the sleeve being mounted for vertical movement in an opening in the bracket 222. The rubber band 972 is fastened at its opposite ends to blocks 982 supported on arms 984 which are mounted to swing laterally of the shoe on pins 986 supported by ears on the upper end of the sleeve 980. The blocks 982 have depending stems 988 mounted to turn in the arms 984 so that the blocks may turn about axes extending heightwise of the shoe to adjust themselves to the contour of the shoe. The arms 984 are pulled inwardly toward each other by the action of the rubber band, these inward movements being adjustably limited by screws 990 mounted therein for engagement with the sides of the block 976. Also mounted to swing on the pins 986 are arms 992 on the upper ends of which there are mounted wiping members 994 for engaging the upper at the sides of the last above the rubber band 972 and for wiping the upper upwardly toward the edge of the insole. The members 994 are preferably made of leather. By reference to Figs. 4 and 5 it will be seen that these members are so mounted on the arms 992 that they extend forwardly toward the toe rest over the upper face of the band 972. A spring 996 tends to pull the arms 992 inwardly toward each other, their inward movements being limited by contact of fingers 998 thereon with the upper end face of the sleeve member 980.

Mounted in the sleeve member 980 (Fig. 5) is a spring 1000 which is under compression between the lower end of the plunger 978 and a thimble 1002 threaded in the lower end of the sleeve member. Threaded in the lower end of the plunger 978 is a rod 1004 which extends downwardly through the spring 1000 and the thimble 1002 and also through another thimble 1006 threaded in the upper end of a sleeve member 1008 mounted for vertical movements in the opening in the bracket 222 below the sleeve member 980. The sleeve member 1008 has a closed lower end through which the rod 1004 extends, the rod having nuts 1010 thereon which abut against the lower end of the sleeve member so that downward movement of the latter is transmitted positively to the rod and to the plunger 978 on the upper end of the rod. The sleeve member 980 is moved upwardly to cause the lasting means thereon to act on the shoe by upward movement of the sleeve member 1008, the latter acting positively on the sleeve member 980 by reason of the engagement of its thimble 1006 with the thimble 1002. For thus raising the sleeve member 1008 there is provided a link 1012 pivotally connected at its lower end to the sleeve member and at its upper end to one arm of a bell-crank lever 1014 mounted on the rod 148 and provided with a roll 1016 engaged by a peripheral cam 1018 (Fig. 2) on the cam wheel 216. A spring 1020 connected to the lower end of the sleeve member 1008 tends to pull it downwardly and thus maintains the roll 1016 in engagement with the cam. When the cam operates to lift the sleeve member 1008 it moves the rubber band 972 into engagement with the shoe, forces the rubber pad 974 up against the band and also imparts upward movements to the wiping members 994. This action occurs at the time when the shoe is being forced downwardly by the swinging arm 660. As the pressure is applied to the top of the forepart of the shoe by the band 972 and the pad 974 the spring 1000 yields, thus permitting the sleeve member 980 to be moved farther upwardly while the pad is held yieldingly in pressure-applying relation to the upper by increasing compression of the spring. Such continued upward movement of the sleeve member serves to raise the ends of the rubber band which thus acts frictionally on the upper to draw it tightly over the last, and also to raise the wiping members 994 which act frictionally on the upper above the ends of the band to wipe it toward the edge of the insole, these members being spread apart more or less by the wedging action of the shoe thereon. The cam 1018 is so formed that prior to the completion of the downward movement of the shoe the movement of the sleeve member 980 is reversed, so that the band-controlling members 982 and the wipers 994 are carried downwardly with the shoe. At the end of the downward movement of the shoe the sleeve member 980 is again moved upwardly to wrap the band 972 farther around the shoe and to carry the wipers 994 substantially to the edge of the shoe bottom.

Figure 21:
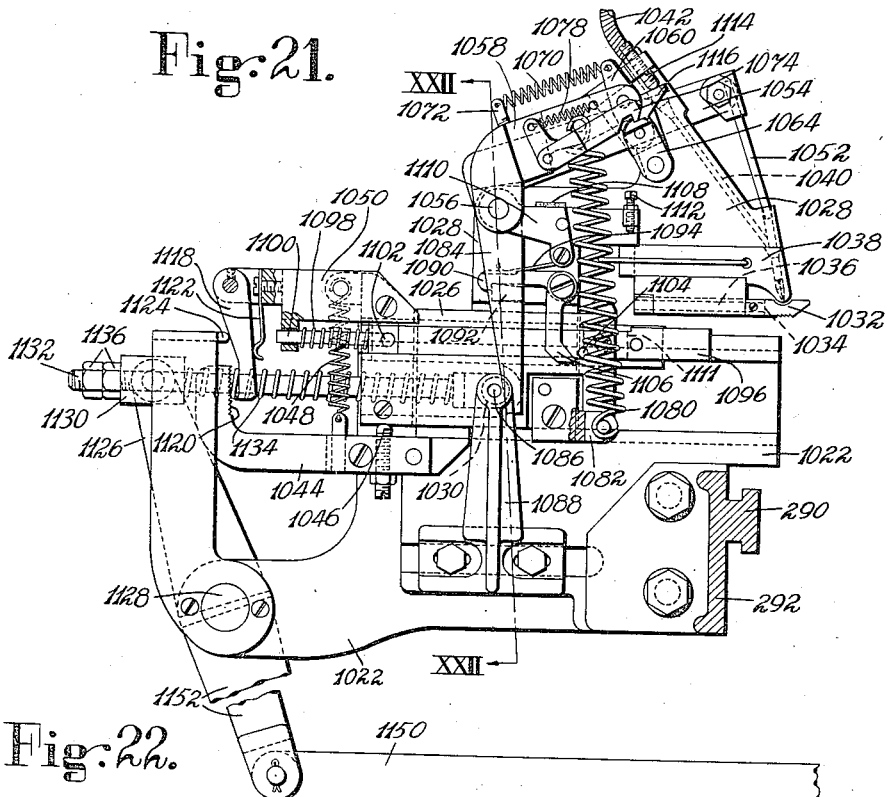
Fig. 21 shows, partly in front elevation and partly in section, one of the devices for overlaying and fastening the margin of the upper at the rear of the toe portion, the device shown being that located at the left-hand side of the machine.
Figure 22:
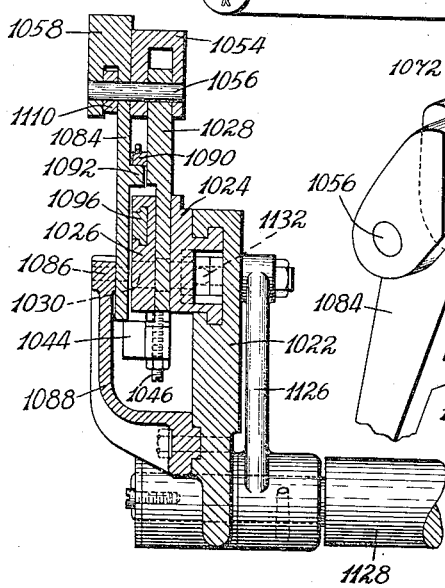
Fig. 22 is a section on the line XXII—XXII of Fig. 21.
Figure 57:
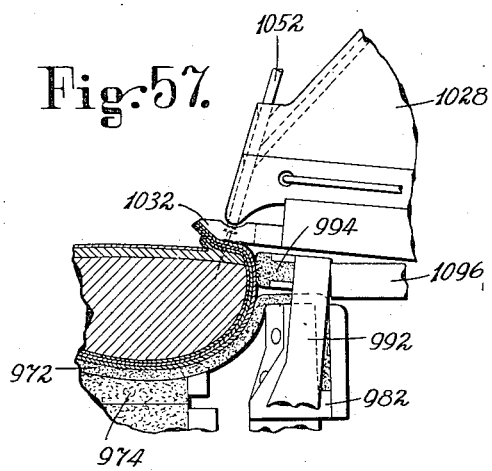
Fig. 57 shows a portion of the upper-conforming means and of one of the side overlaying and fastening devices as the parts are positioned just after the driving of the fastening.

Associated with the means above described for conforming the upper to the last at the rear of the toe portion are mechanisms for laying inwardly over the insole the margin of the portion of the upper thus operated upon and for driving fastenings at or near the ends of the ball line to fasten the upper in those locations in lasted position. Such a fastening tack at one side of the shoe is shown at $t^4$ in Fig. 60. The overlaying and fastening mechanism that operates at the left-hand side of the shoe is shown in detail in Figs. 21, 22 and 23, and it will be understood that similar mechanism is provided at the right-hand side. Fast on the front of the frame is a bracket 1022 (see also Fig. 1) provided with a horizontal guideway for a slide 1024 (Fig. 22) on the front face of which is fastened a plate 1026 having therein a recess to receive the lower portion of another plate 1028. The plate 1028 is pivotally mounted on a stud 1030 which is fast in the slide 1024, and the recess in the plate 1026 is so formed as to permit short swinging movements of the plate 1028 about the stud. Supported on the plate 1028 is a wiper 1032 for wiping the margin of the upper inwardly over the insole as illustrated in Fig. 57, this wiper having a slot 1034 extending inwardly from its edge to permit the driving of the tack between its opposite side portions. The wiper 1032 is formed on the end of a rod 1036 which is mounted for limited turning movement in the plate 1028 about an axis extending laterally of the shoe to permit the wiper to adjust itself to the contour of the shoe. On its lower face the wiper is preferably provided with corrugations, as shown in Fig. 21, to render it more effective in wiping the upper tightly inward over the insole. Also mounted in recesses in the sides of the plate 1028 are a pair of spring-pressed tack fingers 1038 provided with a pocket into which a tack is fed through a passage 1040 in the plate from a flexible tube 1042 supplied with tacks by means of the same character as that by which tacks are supplied to the previously-mentioned tubes 950 (Fig. 1). Fast on the lower portion of the plate 1028 is an arm 1044 which carries a stop screw 1046 arranged to engage the lower face of the plate 1026 to limit adjustably turning movement of the plate 1028 in a clockwise direction (Fig. 21) about the stud 1030. A spring 1048 connected at one end to the arm 1044 and at the other end to a member 1050 fast on the plate 1026 tends to turn the plate 1028 in that direction. It will be understood that the plate 1028 is turned more or less in the opposite direction against the resistance of the spring 1048 by the wedging action of the shoe on the wiper 1032 as the wiper rides up over the edge of the shoe bottom. The wiper thus presses the upper yieldingly downward upon the insole under the influence of the spring 1048.

Figure 23:
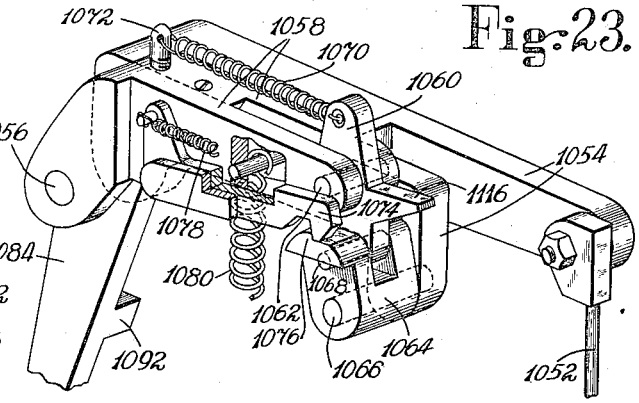
Fig. 23 is a perspective view showing in greater detail a portion of the fastening-inserting means shown in Fig. 21.

The tack is driven from the tack pocket provided by the fingers 1038 by a tack driver 1052 pivotally supported on the end of a driver-operating arm 1054 which is mounted for swinging movement on a pin 1056 on the plate 1028. The arm 1054 is operated by another arm 1058 also mounted to swing about the pin 1056 and connected to the arm 1054 by a toggle. This toggle comprises a link 1060 pivotally mounted on a pin 1062 in a forked portion of the arm 1058, and a link 1064 mounted on a pin 1066 on the arm 1054, the two links being connected together by a pin 1068. A spring 1070 connected to the link 1060 and to a pin 1072 on the arm 1058 tends to break the toggle, for a purpose hereinafter described, but initially the toggle is held in a substantially straight condition against the force of the spring 1070 by a latch 1074 pivoted on the side of the arm 1058 and arranged to engage a lug 1076 on the link 1064, as illustrated in Figs. 21 and 23. The latch is held in such operative position by a spring 1078. The arm 1058, when operated, is thus rendered effective through the straightened toggle to impart downward driver-operating movement to the arm 1054. The arm 1058 is impelled in a downward direction by a spring 1080 connected at its upper end to a pin on the arm and at its lower end to a pin mounted on a member 1082 which is fast on the plate 1026. For controlling the movements of the arm 1058 there is integral therewith a downwardly extending arm 1084 which, upon outward movement of the slide 1024, is engaged by a pin 1086 mounted in a bracket 1088 adjustably secured to the bracket 1022, the pin thus acting on the arm 1084 to swing the arm 1058 upwardly and thus to lift the driver-operating arm 1054 through the toggle links. The arm 1084 is retained in the position which it thus assumes under the action of the pin 1086 by a latch 1090 pivotally mounted on the plate 1028 and arranged to engage a lug 1092 on the arm 1084, the latch being held in operative position by a spring 1094. The driver 1052 is accordingly held in uplifted position as the slide 1024 and the parts thereon are moved inwardly toward the shoe. To render the spring 1080 effective to operate the driver the latch 1090 is lifted to release the arm 1084 when the slide 1024 has arrived substantially at the end of its inward movement. For this purpose there is movably mounted in a horizontal guideway in the plate 1026 a bar 1096 urged inwardly toward the shoe by a spring 1098 mounted on a rod 1100 that projects from the outer end of the bar through a lug on the member 1050, the inward movement of the bar under the influence of the spring being limited by a pin 1102 carried by the bar and extending into a slot in the plate 1026. As the slide 1024 is moved inwardly toward the shoe the bar 1096 is carried into engagement with the arm 992 previously referred to as carrying the side wiping member 994, as illustrated in Fig. 57. The movement of the bar 1096 is thus stopped in a position determined by the shoe. Thereupon, as the slide 1024 continues its inward movement, a pin 1104 on the bar 1096 engages a finger 1106 depending from the latch 1090 and acts to lift the latch and thus to release the arm 1084 to cause the driving of the tack. The tack-driving movement of the arm 1058 under the influence of the spring 1080 is limited by contact of the arm with a bumper comprising a piece of leather 1108 mounted on a member 1110 which is hung on the pin 1056 and fastened to the plate 1028. The inward movement of the slide 1024 is limited by its engagement with a shoulder 1111 (Fig. 21) on the bar 1096.

To insure against any possibility that the driver 1052, as the slide 1024 is retracted from the shoe, might tend to displace the driven tack, the previously mentioned toggle 1060, 1064 is rendered effective to impart a short upward movement to the driver-operating arm 1054 immediately after the downward movement of the arm to drive the tack. For this purpose the latch 1074, previously referred to as holding the toggle in a straightened condition against the pull of the spring 1070, is carried by the downward movement of the arm 1058 into contact with the head of a screw 1112 threaded in the member 1110, so that the latch releases the lug 1076 just at the end of the driving operation, thus rendering the spring 1070 effective to bend the toggle and thereby raise the arm 1054 a little above the lower limit of its movement. It will be understood that at this time the arm 1058 on which the toggle link 1060 is mounted is held stationary against the bumper 1108. The toggle is restored to its straightened condition by a stop screw 1114 mounted in an arm fast on the upper end of the plate 1028, this screw engaging a finger 1116 on the toggle link 1060 as the arms 1054 and 1058 are swung upwardly by the action of the pin 1086 on the arm 1084. When the toggle is thus straightened the latch 1074 again assumes its operative relation to the lug 1076.

In order to afford better insurance against displacement of the upper by dragging action of the wiper 1032 thereon as the wiper is retracted from the shoe, there is provided means for holding the plate 1028 against movement in a clockwise direction (Fig. 21) about the stud 1030 under the influence of the spring 1048 until after the wiper has been withdrawn from over the shoe bottom. This means comprises pawls 1118 pivotally mounted on the member 1050 and arranged to engage ratchet teeth 1120 on an upwardly extending portion of the arm 1044. A spring 1122 on the member 1050 tends to swing the pawls into engagement with the teeth, but initially they are held out of such engagement by a member 1124 on the bracket 1022. As the parts including the members 1044 and 1050 are moved inwardly toward the shoe the pawls 1118 are released by the member 1124 so that they engage the ratchet teeth, and accordingly when the plate 1028 is turned by the wedging action of the shoe on the wiper 1032 the pawls are effective to hold it against retractive movement. When the parts are moved outwardly away from the shoe the member 1124 separates the pawls from the ratchet teeth, so that the spring 1048 turns the plate 1028 back to the position determined by the stop screw 1046.

For imparting inward and outward movements toward and from the shoe to the above described overlaying and fastening mechanism at the left-hand side of the machine there is provided an arm 1126 (Figs. 8 and 21) fast on a rockshaft 1128 (see also Figs. 2 and 4), this arm being connected at its upper end to a sleeve 1130 slidingly mounted on a rod 1132 the inner end of which is pivotally connected to the slide 1024. A spring 1134 on the rod serves as means through which the force of the sleeve 1130 is transmitted yieldingly to the slide 1024, and nuts 1136 on the outer end of the rod are engaged by the sleeve to move the slide 1024 positively outward to its initial position. At the right-hand side of the machine an arm 1138 (Figs. 4 and 8) performs the same function as the arm 1126 with respect to the slide 1024 at that side of the machine, the arm 1138 being fast on a rockshaft 1140. Also fast on this rockshaft is a gear sector 1142 engaged by another gear sector 1144 on a shaft 1146. Integral with the gear sector 1144 is a downwardly extending arm 1148 connected at its lower end by a link 1150 to an arm 1152 fast on the rockshaft 1128. It will thus be seen that the two arms 1126 and 1138 are connected to swing simultaneously toward and from each other. For operating them through the connections described there is provided a path cam 1154 formed in a cam wheel 1156 which is mounted to turn on the shaft 182, this path cam engaging a roll 1158 on the arm 1148.

Figures 9, 10:
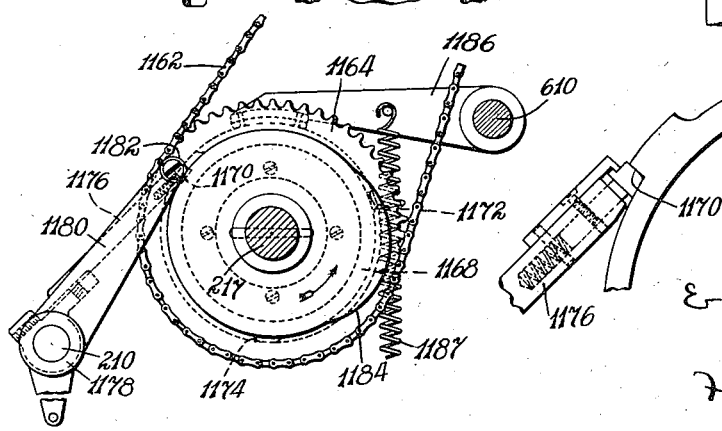
Fig. 9 shows certain parts of the structure illustrated in Fig. 8 as viewed from the left-hand side of the figure.
Fig. 10 is an enlarged detail view of certain parts shown in Fig. 9.

The cam wheel 1156 carries a sprocket wheel 1160 operated by a chain 1162 from another sprocket wheel 1164 fast on a sleeve 1166 which is mounted to turn about the shaft 217. The sleeve 1166 is part of a clutch separate from the main clutch previously referred to as located at the right-hand side of the worm gear 968 as the parts are viewed in Fig. 8, this separate clutch being actuated at the proper time in the cycle of the machine for imparting the operative movements to the above-described overlaying and fastening mechanisms. The construction of this clutch is not illustrated in detail, since it is a clutch of the Horton type of the same general character as the main clutch fully described in the previously mentioned Letters Patent. It includes a ring 1168 having three stop shoulders 1170, 1172 and 1174 thereon (Fig. 9) arranged to be engaged by an arm 1176 to bring the cam wheel 1156 to a stop at the end of each revolution thereof, the ratio between the sprocket wheels 1160 and 1164 being such that one revolution of this cam wheel corresponds to a third of a revolution of the sleeve 1166. It will be understood that through clutch means controlled by the ring 1168 the sleeve 1166 is connected to and disconnected from the worm gear 968. The arm 1176 is fast on a sleeve 1178 (Fig. 1) mounted to turn on the rod 210, and for controlling it there is also fast on this sleeve another arm 1180 provided with a roll 1182 engaged by a cam 1184 which turns with the shaft 217. It will thus be understood that at the proper time in the cycle the arm 1176 is lifted by the cam 1184 to start the overlaying and fastening mechanisms in operation and that the cam releases the arm in time for it to engage the next succeeding stop shoulder on the ring 1168 so as to bring the cam wheel 1156 to a stop at the end of a single revolution thereof. To avoid any overrunning of the parts there is a brake arm 1186 mounted on the shaft 610 and controlled by a spring 1187, this arm being arranged to act on the periphery of the sleeve 1166.

As previously stated, the toe binder 924 is presented in the groove 926 in the toe wipers 278 and the loops 928 (Fig. 60) are formed thereon before the last with its upper and insole are mounted on the work support. For this purpose there is provided binder-presenting mechanism shown in Figs. 31 to 42, inclusive, consisting of a portable device which is first presented by the operator to means hereinafter described for delivering a binder thereto. The device is then carried by the operator and presented in proper relation to the toe wipers, whereupon it is operated to force the binder into the groove 926 in the wipers and to bend its ends to form loops in alinement with the notches 930 at the edges of the wipers. The device includes a main plate 1188 having a forwardly projecting portion or extension 1190 arranged to overlie the previously mentioned upper-clamping plate 576 positioned immediately above the wipers. The plate 1188 has a central depending rib 1192 on the forward end of which is a lug 1194 arranged to project under the wipers substantially in contact with their lower faces. Fastened on the lower face of the rib 1192 is a plate 1196 provided near its opposite side edges with members 1198 arranged also to project under the wipers and to enter recesses 1200 (Fig. 33) formed in portions of the wiper carriers 384 that underlie the wipers. Shoulders 1202 and 1204 (Fig. 33) on the members 1198, by engagement with cooperating faces on the wiper carriers, serve to position the device lengthwise and laterally, its heightwise position being determined by the extension 1190 in engagement with the plate 576 and by the lug 1194 and the members 1198 in engagement with the lower faces of the wipers. In this manner the device is positioned in accurately determined relation to the wipers for the delivery of the binder into the groove 926 in the wiper edges.

Figure 39:
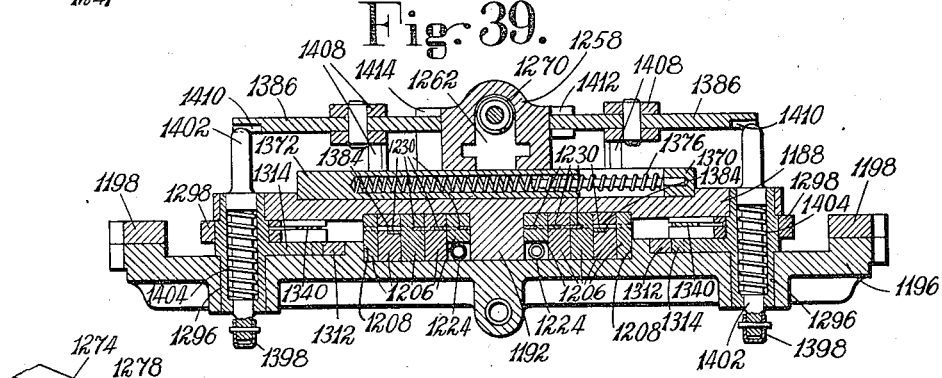
Fig. 39 is a section on the line XXXIX—XXXIX of Fig. 33.
Figure 40:
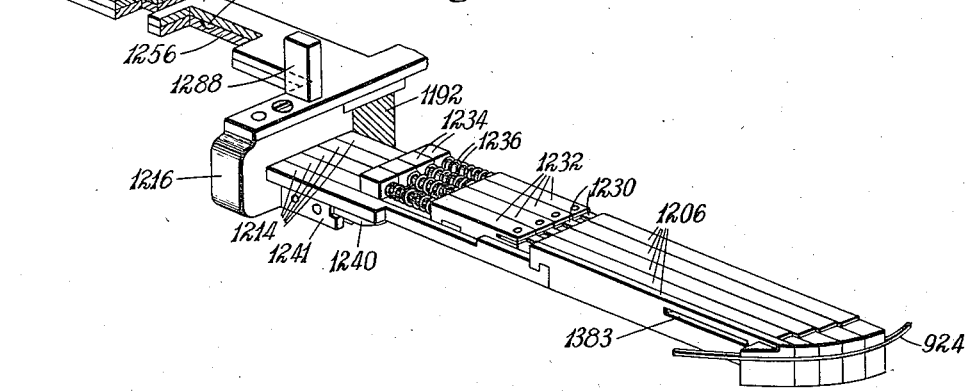
Fig. 40 is a perspective view of a portion of the structure of the binder-presenting device.

For supporting the binder and presenting it in the plane of the groove in the wipers the binder-presenting device is provided with a plurality of fingers 1206 (Figs. 39 and 40) arranged in two groups at the opposite sides of the depending rib 1192. Each group, as illustrated, comprises five such fingers confined between the rib 1192 and a shoulder 1208 on the plate 1196 and supported on the plate for lengthwise sliding movements. Each finger has a curved front end face, as illustrated in Fig. 40, and in the front end of each finger is a slot 1210 (Figs. 37 and 38) in which the binder 924 is received and supported. These slots are all in the same plane which is coincident with the plane of the groove 926 in the wipers when the device is positioned as above described for presenting the binder to the wipers. Between the two groups of fingers the binder extends across the end of the rib 1192 and lies in a recess 1212 (Fig. 35) in the rib. The several fingers 1206 are of such lengths and are so controlled that initially their front end faces are tangent to a curve corresponding approximately to the curve of the edges of the wipers when the latter are in their open positions. Since, however, the binder-presenting device is intended for use with wipers of different sizes and shapes, the several fingers, in the operation of the device, are all pushed forward into contact with the edges of the wipers, so that they adjust themselves to the curvature of these edges. For this purpose the fingers are connected to bars 1214 that are slidingly mounted on the plate 1196 and extend through openings provided in operating members 1216, one of which is associated with each group of bars. The members 1216 are located at opposite sides of the rib 1192 and are fastened on the lower face of a slide 1218 operated as hereinafter described. The bars 1214 are held yieldingly in frictional contact with the members 1216 by balls 1220 (Fig. 36) located in recesses in the members and pressed against the lower faces of the bars by springs 1222. Accordingly, as the members 1216 are moved forward the bars 1214 are operated to force the front ends of the fingers 1206 against the edges of the wipers, and as the different fingers are stopped by the wipers the members 1216 slip along the bars 1214 as the members are moved farther forwardly.

Figure 38:
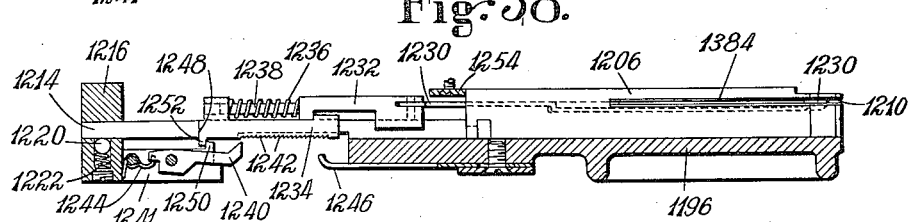
Fig. 38 is a section on the line XXXVIII—XXXVIII of Fig. 33 with parts omitted.

The two fingers 1206 that are next to the rib 1192 are so positioned that their front ends are nearer the edges of the wipers than the ends of the other fingers, and they accordingly are the first to engage the wipers. Between these fingers and the corresponding bars 1214 there are yielding connections each consisting of a spring 1224 (Fig. 37) positioned in a recess in the finger between a shoulder on the finger and a head 1226 on the bar. Projecting from this head through the spring and into an opening in the finger is a rod 1228. It will thus be evident that the bar 1214 may be moved forward relatively to the finger 1206 against the resistance of the spring 1224 when the finger is stopped by the wipers. At its left-hand end (Fig. 37) the finger straddles the bar to provide portions against which the head 1226 abuts initially to limit expansion of the spring 1224 and to determine the initial relation between the finger and the bar. The other fingers 1206 interlock with the corresponding bars 1214 as shown in Fig. 38, so that the fingers and the bars move as units. The purpose of the provision for relative movement between the two innermost fingers and the corresponding bars will be hereinafter explained.

Located in slots in the several fingers 1206, except the two outermost fingers which are narrower than the others, are pushers 1230 (Figs. 39 and 41) which push the binder out of the slots 1210 in the ends of the fingers and into the groove 926 in the wipers. These pushers also are operated by the members 1216. For this purpose they are pivotally connected to slides 1232 mounted on and partially embracing the bars 1214, and these slides are arranged to be operated yieldingly through other slides 1234 also mounted on these bars. Between the end of each slide 1232 and an upstanding lug on the corresponding slide 1234 is a spring 1236 mounted on a rod which projects from the slide 1232 into an opening in the upstanding lug. It will thus be seen that as the slide 1234 is moved forwardly along the bar 1214 it operates the slide 1232 yieldingly through the spring 1236. For imparting such forward movement to each slide 1234 there is provided a pawl 1240 pivotally mounted on extensions 1241 of the member 1216 and arranged to engage ratchet teeth 1242 on the lower face of the slide. Each pawl, however, is normally held out of contact with the ratchet teeth by a spring 1244. For moving each pawl into engagement with the ratchet teeth there is provided a spring finger 1246 on the plate 1196, this finger being arranged to engage the pawl and deflect it upwardly into engagement with the ratchet teeth when the member 1216 has been advanced far enough for this operation to occur. The finger 1246 then yields downwardly to permit further forward movement of the pawl to operate the slide 1234.

It will be understood that all the pawls are thus rendered effective at substantially the same time to impart forward movements to the slides 1234. To insure, however, against objectionable lengthwise displacement of the binder as it is moved into the groove in the wipers the construction is further such that the two pushers 1230 mounted in the fingers 1206 that are next to the rib 1192 are operated before the other pushers, and it is with this in view that there is provision for movement of the bars 1214 connected to these innermost fingers relatively to the fingers against the resistance of the springs 1224, as hereinbefore described. Each of these bars 1214, as well as the others with the exception of the two outermost bars, is reduced in width at the portion thereof upon which the slides 1232 and 1234 are mounted, and accordingly is provided at its opposite sides with shoulders 1248 in the positions indicated in Fig. 37, these shoulders abutting against the end of the slide 1234. The springs 1224 in the two innermost fingers 1206 are weak enough to permit them to yield before the members 1216 begin to slip along the corresponding bars 1214, and accordingly as soon as the two innermost fingers are stopped by the wipers the bars 1214 that are connected to these fingers begin to move relatively to them against the resistance of the springs, carrying the slides 1234 along with them and thus imparting to the corresponding pushers 1230, through the springs 1236 and the slides 1232, movements to force the binder into the groove in the wipers. When the movement of these pushers is stopped by the wipers the springs 1236 yield and thereafter act through the pushers to clamp the binder yieldingly in the wipers. As soon as the resistance to the forward movements of the two innermost bars 1214 becomes great enough to overcome the friction between them and the members 1216, these members begin to slip along the bars in the same manner as along the rest of the bars 1214, thus carrying the pawls 1240 farther forward into positions to be forced against the ratchet teeth. The pawls associated with the innermost bars 1214 will thus act to effect some further compression of the corresponding springs 1236 at the same time that the other pawls are acting on the slides 1234 to impart to the other pushers 1230 their movements to force the binder into the wipers. To insure that the various parts will be returned into their proper relations to one another upon retractive movement of the members 1216, the extensions 1241 of these members are provided with lugs 1250 arranged to engage lugs 1252 on the slides 1234 and thus to return these slides into engagement with the shoulders 1248 on the bars 1214, the retractive movements of the bars and of the fingers 1206 being limited by stops 1254 which are mounted on the plate 1188 for engagement with the rear ends of the fingers. To insure the return of the two outermost bars 1214 and the fingers connected thereto, these bars have lugs 1255 at their rear ends (Figs. 31 and 33) arranged to be engaged by the members 1216.

The slide 1218 that carries the members 1216 is operatively movable along a plate 1256 (Figs. 35 and 36) fast on the rib 1192. Operative movement is imparted to the slide 1218 and to other parts hereinafter described by a main slide 1258 provided with an operating handle 1260. The forward end portion of this slide runs on guideways provided on opposite sides of a block 1262 fast on the plate 1188. At its rear end the slide 1258 has downward extensions 1264 at opposite sides of the rib 1192, and fastened to these extensions are two members 1266 and 1268 each of which partially embraces the rib 1192 and runs along guideways provided by the rib and by parts that are fastened to the rib. Mounted in a bore in the main slide 1258 is a spring 1270 which abuts at its forward end against a lug 1272 on the block 1262 and is compressed by forward movement of the slide, the spring serving thereafter to return the slide to its initial position. Fast on the member 1266 is a plate 1274 provided in its lower face with a recess 1276 to receive the upper portion of a ball 1278 which is mounted in an opening 1280 in the slide 1218. Initially, therefore, the slide 1218 is locked to the plate 1274 by the ball 1278, and since the plate 1274 is carried forwardly by the slide 1258 the slide 1218 also is carried forwardly to operate the fingers 1206 and the pushers 1230 in the manner hereinbefore described. There is further provided means for disconnecting the slide 1218 from the plate 1274 before the slide 1258 completes its forward movement, so as to permit other parts hereinafter described to be operated by the movement of the slide 1258 after the above-described fingers and pushers have been operated. For this purpose the plate 1256 has therein a recess 1282 arranged to receive the ball 1278. It will be evident that when the ball drops into this recess the slide 1218 is released from the plate 1274 and is locked to the plate 1256. To insure that the ball will be forced into the recess 1282, the movement of the slide 1218 is stopped by a shoulder 1284 on the rib 1192 which engages the end of the slide. For returning the slide 1218 when the main slide 1258 receives its return movement there are fast on the opposite sides of the slide 1258 blocks 1286 (Fig. 33) arranged to engage members 1288 that project upwardly from the slide 1218, these members having pins 1290 (Fig. 36) that project downwardly from them into openings in the slide 1218 and the members 1216. It will be understood that as the return movement of the slide 1218 begins the ball 1278 is forced up out of the recess 1282 into the recess 1276 by the action of the slide thereon.

Figure 41:
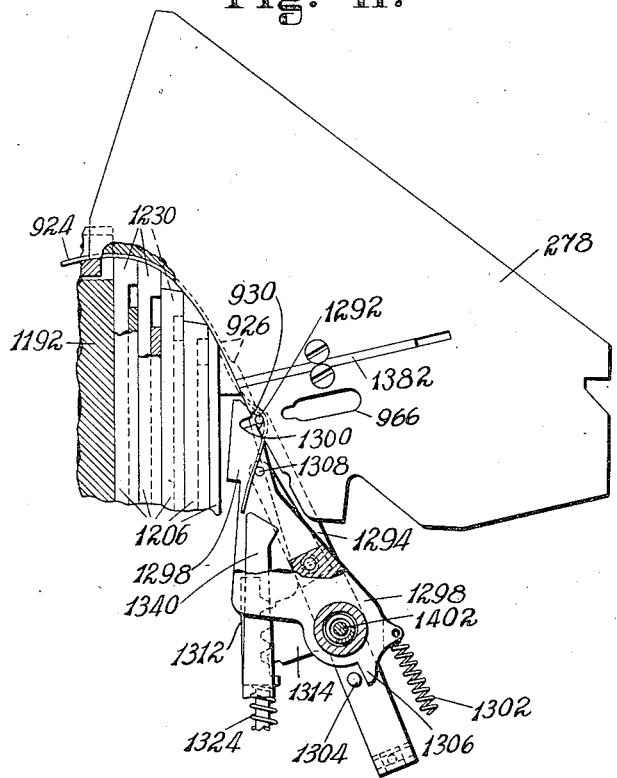
Fig. 41 is a plan view, with parts broken away, illustrating the relation of certain portions of the binder-presenting device to the wipers at an intermediate stage in the operation of the device, before the loops are formed at the ends of the binder.

By reference to Fig. 41 it will be seen that the groups of fingers 1206 terminate short of the portions of the edges of the wipers in which the notches 930 are formed. To assist in forcing the binder into the groove 926 in these portions of the wipers, and also for use in forming at the ends of the binder loops through which tacks are to be driven in the notches 930 as hereinbefore explained, there is provided at each side of the device a pin 1292 (Fig. 32) carried by a lever or arm 1294 formed integral with which is a bushing 1296 rotatably mounted in a bearing formed in the plate 1196 (Fig. 39). Further to assist in controlling the binder there is associated with each lever 1294 an arm 1298 (Figs. 31 and 41) rotatably mounted on the bushing 1296 and divided horizontally throughout the greater portion of its length to provide a slot in the same plane as the slots 1210 in the ends of the fingers 1206 to receive the end portion of the binder when the binder is delivered to the binder-presenting device. In the divided portion of the arm 1298 is a notch 1300 (Fig. 41) in which the pin 1292 is initially located. For controlling each arm 1298 there is provided a spring 1302 which tends to turn it about the bushing 1296 and maintains it normally in a position determined by a pin 1304 on the lever 1294 in engagement with a lug 1306 on the arm. With the arm in this position the pin 1292 is in the slot 1300 as above described. After the binder has been delivered to the binder-presenting device its end portions are retained in the slots in the arms 1298 by balls 1308 which are mounted in openings in the lower portions of the divided arms and pressed up against the upper portions of the arms by spring plates 1310 (Fig. 31) fastened on the lower faces of the arms. By reference to Fig. 41 it will be seen that while the end of the binder is thus behind the ball 1308, the binder extends in front of the pin 1292 which, as the parts are illustrated in that figure, has been moved to force the binder into the notch 930 in the wiper. It will be understood that the arms 1298 serve, in part, the same purpose as the fingers 1206 in supporting the binder and presenting it in the plane of the groove 926 in the wipers.

Initially the forward ends of the levers 1294 and of the arms 1298 associated therewith occupy positions in which they are retracted inwardly nearer the groups of fingers 1206 than illustrated in Fig. 41. For controlling the levers 1294 and through them the arms 1298, there is associated with each lever a rack bar 1312 (Figs. 32 and 39) which is supported on the plate 1196 and engages a gear sector 1314 integral with the lever 1294. Projecting from each rack bar is a rod 1316 which extends through an opening in a lug 1318 formed on a crossbar 1320 fast on a slide 1322. On the rod 1316 between the rack bar and the lug 1318 is a spring 1324, and on the opposite side of the lug from the spring the rod carries nuts 1326 which by engagement with the lug limit expansion of the spring. The slide 1322 is in contact with a plate 1328 (Fig. 5) fast on the lower face of the rib 1192 and extends over the horizontal central portion of the member 1268 previously referred to as fastened to the main slide 1258. Fast on the member 1268 below the plate 1322 is another plate 1330 provided in its upper face with a groove 1332 in which rests the lower portion of a ball 1334 mounted in a hole in the slide 1322. The groove 1332 is of such length that the plate 1330, which moves with the main slide 1258, has no effect on the ball 1334 until such time as the slide 1218, which operates the fingers 1206 and the pushers 1230 as hereinbefore described, has substantially completed its movement. The plate 1330 then picks up the ball 1334 and through it imparts forward movement to the slide 1322 against the resistance of a spring-pressed plunger 1336 mounted in the plate 1196 and bearing on the forward end of the slide 1322. In this manner the crossbar 1320 is operated and through the springs 1324 imparts yieldingly to the rack bars 1312 movements to swing the forward arms of the levers 1294 outward, whereby the pins 1292 are operated to force the binder into the notches 930 in the wipers and to some extent also into portions of the groove 926 adjacent to these notches, as illustrated in Fig. 41. It will be understood that any further movement of the crossbar 1320 after the pins are stopped by the wipers results in compression of the springs 1324. As the levers 1294 are thus operated, the arms 1298 are carried with them into engagement with the edges of the wipers to assist in guiding the binder into the groove in the wipers, the springs 1302 then holding these arms against the edges of the wipers as the levers continue their movements to carry the pins 1292 into the notches 930. The movement of the crossbar 1320 required for the purpose in view is a very short one, and at the completion of this movement the slide 1322 is disconnected from the main slide 1258 to permit the latter to continue its operative movement. For this purpose there is provided in the plate 1328 a recess 1338 (Fig. 35) into vertical alinement with which the ball 1334 is carried, whereupon the ball is forced up into this recess out of the groove 1332 in the plate 1330 by the action of the latter thereon. Thereafter the plate 1330 is carried forward under the ball, and the ball is effective to lock the slide 1322 against retractive movement, so that the levers 1294 and the arms 1298 are maintained in the positions to which they were moved. It will be understood that in the return of the parts to starting positions the ball 1334 drops into the groove 1332 as soon as the latter arrives in a position under it, whereupon the slide 1322 and the parts controlled thereby are returned by the action of the spring plunger 1336, this movement of the slide being limited by engagement of the crossbar 1320 with the end of the plate 1328. By the same means also the return movement of the main slide 1258 is limited when the movement of the plate 1330 relatively to the slide 1322 is stopped by the ball 1334 as illustrated in Fig. 35.

After the parts have arrived in the positions illustrated in Fig. 41 it is necessary to bend the end portions of the binder about the pins 1292 to form the tack-receiving loops and also to force the portions of the binder located immediately in front of the pins farther into the widened portions of the groove 926 in the wipers. For this purpose there is located in the binder-receiving slot in each arm 1298 a pusher 1340 (Figs. 31, 34 and 41). This pusher is fast on a bracket 1342 associated with and partially embracing an enlarged end portion of an arm 1344, both the bracket and the arm being pivotally mounted by means of a pin 1346 (Figs. 31 and 33) controlled as hereinafter described. Normally the arm and the bracket are connected together to swing in unison by a block 1348 (Fig. 34) which lies in a slot in the end of the arm and also in a slot between two lugs 1350 on the bracket. The block 1348 is supported on the end of a rod 1352 slidingly mounted in the arm 1344 and is controlled by a spring 1354 (Fig. 33) which tends to hold it in the position illustrated for locking the arm and the bracket together.

The pins 1346 on which the arms 1344 and the brackets 1342 are mounted as above described are carried by laterally projecting arms 1356 (Fig. 33) of a slide 1358 (Fig. 35) resting in part on the previously mentioned slide 1218 and in part on a plate 1360 fast on the top of the rib 1192. Fast on the main slide 1258 is a member 1362 which has a dovetailed connection with the slide 1358, as illustrated in Fig. 36, but is movable relatively to this slide. Initially the slide 1358 is locked against movement by a ball 1364 located in a hole in the slide with its lower portion extending into a recess in the plate 1360, as illustrated in Fig. 35. Fast on the member 1362 is a plate 1366 provided with a recess 1368 which is carried to a position over the ball 1364 substantially at the time in the movement of the main slide 1258 when the levers 1294 and the arms 1298 have been swung outward as hereinbefore described. At the same time the member 1266 and the plate 1274 that move with the slide 1258 arrive in position to engage the end face of the slide 1358 and start it moving, whereupon the ball 1364 is forced up out of the recess in the plate 1360 into the recess in the plate 1366 by the movement of the slide 1358. As the slide 1358 is thus moved forwardly it imparts forward movement to the arms 1344 and the pushers 1340 connected therewith for bending the ends of the wire around the pins 1292. When the main slide 1258 receives its return movement, it moves the slide 1358 back with it through the ball connection 1364 until the ball drops into the recess in the plate 1360, at which time movement of the slide 1358 is stopped by a pin 1369 that projects upwardly into a slot therein.

Figure 42:
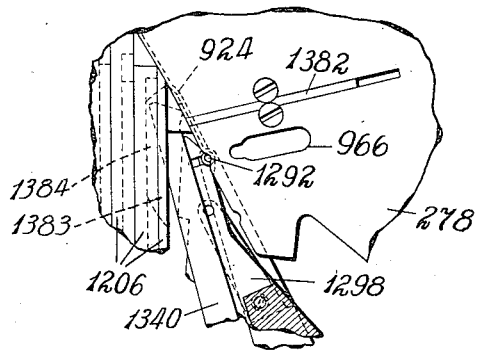
Fig. 42 is a view similar to a portion of Fig. 41, but showing the parts as positioned after the forming of the loops.

In order to render the pushers 1340 satisfactorily effective, they are controlled through the arms 1344 in such manner as to force them yieldingly outward toward the edges of the wipers as they receive their forward movements. For this purpose there are provided two cam slides 1370 and 1372 (Figs. 33, 35 and 39) mounted in recesses in the plate 1188 for movements toward and from each other and held in place on the plate by a member 1374 fast on the plate. Springs 1376 mounted in recesses in these slides tend to force them apart, their outward movements being limited by shoulders on the plate 1188, as shown in Fig. 39. On the outer ends of the slides are cam faces 1378 (Fig. 33) arranged to engage rolls 1380 on the arms 1344 and thus to swing these arms in outward directions as they are carried forwardly. In this manner the pushers 1340 are swung outward so that they engage the end portions of the binder close to the edges of the wipers and bend the binder tightly around the pins 1292, the retaining balls 1308 being wedged downwardly by the pushers. The end faces of the pushers 1340 (Fig. 41) are so inclined as to permit them to be wedged inwardly against the resistance of the springs 1376 by the action of the pins and the binder thereon, so as to pass the pins and thereafter to force the ends of the binder firmly against the portions thereof that are located forwardly of the pins and into the groove 926 in the wipers (Fig. 42). As these portions of the binder enter the groove they are forced under the ends of spring fingers 1382 that are mounted in slots in the wipers 278 and serve by their pressure on the binder to hold it in place in the groove until it is applied to the shoe. To provide sufficient room for the end portions of the binder as they are bent as described, and also to receive the ends of the pushers 1340, the outermost fingers 1206 have slots 1383 (Fig. 40) therein, and as shown in Figs. 38 and 39 the fingers that are next to these outermost fingers have for the same purpose slots 1384 located above downwardly offset portions of the pushers 1230.

It will be evident that as the pushers 1340 are carried forwardly to operate as described they are wedged inwardly more or less not only by the action of the pins 1292, but also by converging portions of the wiper edges located forwardly of the pins, the cam slides 1370 and 1372 yielding to permit such movements of the pushers. In the return of the slide 1358 to starting position it is desirable that the pushers 1340 be no longer pressed outward against the binder, in order to avoid any possibility of displacing its looped end portions. There is accordingly provided means for disconnecting the pushers from the arms 1344 by moving the blocks 1348 out of the slots between the ears 1350 of the brackets 1342 on which the pushers are mounted. This means comprises projections 1385 (Fig. 33) formed on arms 1386 which are mounted and controlled as hereinafter described, these projections being arranged to engage the ends of the rods 1352 near the end of the forward movement of the arms 1344 and thus to force the blocks 1348 out of their locking positions. When this action occurs the cam slides 1370 and 1372 are forced outward to their normal positions by their springs 1376, and the arms 1344 are accordingly swung outward more or less relatively to the brackets 1342. Thereafter, in the reverse movement of the slide 1358, the rods 1352 are carried away from the projections 1384, thus releasing the blocks 1348. When the blocks are thus released, each block is forced by its spring 1354 against the outer end of one of the lugs 1359 on the bracket 1342. To cause the return of each block 1348 into position to lock the arm 1344 and the bracket together, there are provided on the main plate 1188 pins 1388 and 1390 (Fig. 33) arranged respectively to engage a lug 1392 on the arm 1344 and a lug 1394 on the bracket 1342 near the end of the return movement of the slide 1358. In this manner the arm and the bracket are swung relatively to each other into positions to be locked together again by the block 1348.

Before the arms 1294 (Fig. 32) are returned to their starting positions by reverse movement of the crossbar 1320, it is necessary to withdraw the pins 1292 from the loops formed in the ends of the binder. The pins, therefore, are not fast on the arms, but are vertically movable in tubular members 1396 that project downwardly from the arms. At its lower end each pin is pivotally connected to one end of a lever 1398 the other end of which is pivotally mounted on a depending portion 1400 of the arm 1294. Between its opposite ends each lever 1398 is connected to the lower end of a plunger 1402 (Fig. 39) which is vertically movable in the previously mentioned bushing 1296 and is controlled by a spring 1404 which tends to move it upwardly. It will be evident that the spring 1404 thus holds the pin 1292 normally in an upraised position determined by engagement of an enlarged head 1406 (Fig. 32) on the lower end of the pin with the lower end of the tubular member 1396. For depressing the plungers 1402 to withdraw the pins 1292 from the loops in the binder, movements of the previously mentioned arms 1386 are utilized. These arms are pivotally mounted on upstanding ears 1408 formed on the previously mentioned member 1374 and are provided on their outer ends with cam faces 1410 (Figs. 31 and 39) arranged to engage the upper ends of the plungers 1402 and to depress the plungers as the arms are swung. Such swinging movements of the arms results from contact of the previously mentioned blocks 1286 (Fig. 33) on the slide 1258 with the inner end portions of the arms near the end of the forward movement of this slide. It will be evident that as the arms are swung the projections 1385 thereon act to force back the pins 1352 as hereinbefore described. The arms 1386 remain in the positions to which they are swung, with the plungers 1402 depressed and the pins 1292 accordingly in their lowered positions, until near the end of the return movement of the main slide 1258, whereupon one of the arms is engaged by a bar 1412 (Fig.

33) fast on the slide, and the other arm by a projection 1414 on the slide, to swing the arms reversely to their starting positions and thus to release the plungers 1402 and permit them to be raised by their springs.

In supporting and controlling the binder-presenting device the operator makes use of the previously mentioned handle 1260 on the main slide 1258 and also of another handle 1416 mounted on a plate 1418 which is secured to the main plate 1188 in a position spaced a considerable distance above the latter. It is desirable to insure against any forward movement of the slide 1258 until after the device has been properly positioned relatively to the wipers, and for this purpose there is provided a bell-crank lever 1420 (Figs. 31 and 33) pivotally mounted on the forward extension 1190 of the plate 1188 and controlled by a spring-pressed plunger 1422 which normally holds it in such a position that one of its arms is against the block 1262 and in front of the bar 1412 which is fast on the slide 1258. In this manner any forward movement of the slide 1258 is prevented. The swinging of the bell-crank lever 1420 into position to release the slide results from contact of the edges of the wipers 278 with one arm of the lever as the device arrives in binder-presenting position. For this purpose one arm of the lever has a portion that extends downwardly through a slot 1424 in the extension 1190 into position to be engaged by the wipers.

Figure 51:
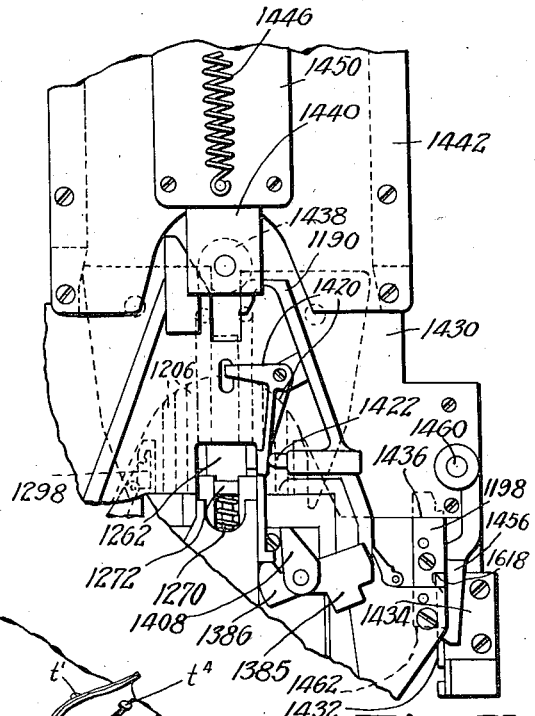
Fig. 51 is a plan view illustrating the relation of the binder-presenting device to the mechanism for delivering the binder to the device.

For delivering each binder to the above-described device which presents it to the wipers there is provided mechanism shown in Figs. 43 to 50, inclusive. This mechanism includes a casting 1426 which is fastened on the right-hand side of the frame of the machine, as illustrated in Fig. 1. Supported on this casting are means for feeding binder wire from a source of supply, for cutting off a piece of wire of the proper length for a binder, and for forcing this piece of wire, herein frequently termed the binder, into the slots 1210 in the fingers 1206 and the slots formed in the arms 1298 of the binder-presenting device. Mounted on the casting 1426 are plates 1428 (Fig. 46), and spaced above portions of these plates a distance approximately equal to the thickness of the binder wire is a plate 1430 (Fig. 43). The plates 1428 and 1430 are recessed to provide an opening in which to receive the fingers 1206 and the arms 1298 of the binder-presenting device, the edges of the plates being curved to conform substantially to the curve along which the end faces of the groups of fingers and the associated arms normally lie. When the binder-presenting device is in position to receive the binder, as shown in Fig. 51, the extension 1190 of the plate 1188 lies upon the top of the plate 1430, and portions of the plate 1196 (Fig. 31) adjacent to the members 1198 rest upon shoulders 1432 formed on blocks 1434 that are fastened on portions of the casting 1426. It will be understood that these blocks, by engagement with the plate 1196, assist also in centralizing the device laterally. Portions of the members 1198, moreover, project under the lower plates 1428, and shoulders 1436 (Figs. 31 and 33) on these members engage the front edges of the plates 1428 and 1430. The forward end portion of the device is further guided and positioned laterally by a member 1438 mounted on a slide 1440 which is movable in a guideway provided in a plate 1442 (Fig. 49) on the top of the casting 1426. The member 1438 is arranged to engage converging faces 1444 (Fig. 33) on the extension 1190. The slide 1440 is urged forwardly toward the operator by a spring 1446 which yields to permit the slide to be moved lengthwise by contact of the extension 1190 with the member 1438 as the operator moves the binder-presenting device into position to receive the binder. The initial position of the slide 1440 is determined by a pin 1448 thereon in engagement with a plate 1450 mounted over the slide, this plate being provided with a slot 1452 to receive the pin. It will be evident that when the device is in binder-receiving position the spring 1446 tends to force it forwardly out of that position, and to prevent such movement of the device there are provided latches 1454 and 1456 fastened respectively to vertical rockshafts 1458 and 1460 which are mounted in bearings in the casting 1426 and are controlled as hereinafter described. These latches, when the device is in binder-receiving position, are arranged to engage shoulders 1462 (Figs. 31 and 33) formed on the members 1198.

The binder wire $w$ (Fig. 43) is fed from a reel 1464 rotatably mounted on a spindle 1466 on the casting 1426 and controlled by a brake shoe 1468 in engagement with its periphery. The brake shoe is mounted on a member 1470 rotatable about an axis parallel to the spindle 1466, this member being controlled by a spring 1472 connected to an arm 1474 thereon. The spring tends to turn the member 1470 in the direction to press the brake shoe against the reel. Supported on a bracket 1476 on the member 1470 is a guide wheel 1478 over which the wire runs as it leaves the reel, the wire extending through slots formed in a shield 1480 that is positioned over the wheel. The pull of the wire against the wheel 1478 tends to turn the member 1470 in the direction to release the pressure of the brake shoe 1468 on the reel, to facilitate the feeding of the wire, the brake shoe, however, being at all times sufficiently effective to prevent uncontrolled movement of the reel.

From the guide wheel 1478 the wire extends over the top of the casting 1426 through an opening in a guide bracket 1482 on the casting. Near the guide bracket are feed wheels 1484 and 1486 which engage the wire and pull it from the reel, the wire passing from the feed wheels through a tube 1488 mounted in a bracket 1490 and thence through a hardened bushing 1492 (Fig. 50) in the bracket, this bushing being alined with the opening between the lower plates 1428 and the upper plate 1430. The feed wheel 1484 is fast on a shaft 1494 rotatable in the casting 1426, this shaft at its lower end carrying a pinion 1496 in engagement with a comparatively large gear wheel 1498 rotatable on a vertical spindle 1500 also mounted on the casting. Fast on the gear wheel 1498 is a ratchet wheel 1502 arranged to be engaged by three staggered pawls 1504 (Fig. 44) carried by a hand lever 1506. This hand lever is mounted to swing on the spindle 1500 and is controlled by a spring 1508 which holds it initially in a position adjustably determined by a stop 1510 on the casting 1426 in engagement with a lug 1512 on the hand lever. The pawls 1504 are pressed against the ratchet wheel by spring plungers 1514. It will thus be seen that when the hand lever 1506 is swung toward the left by the operator the feed wheel 1484 is turned in the direction to feed the wire. The wheel 1486 serves to hold the wire in effective engagement with the wheel 1484 and for this purpose is mounted on a bell-crank lever 1516 controlled by a spring 1518 which tends to swing it in the direction to force the wheel 1486 toward the other wheel. For better control of the feed of the wire the hub of the feed wheel 1484 is engaged by a brake shoe 1520 carried by a bell-crank lever 1522 which is controlled by a spring 1524. The limit of feeding movement of the hand lever 1506 is determined by a block 1526 fast on the casting 1426 and arranged to be engaged by the lug 1512 on the hand lever. It will be understood that the movement of the hand lever from the position determined by the stop 1510 to the position determined by the block 1526 is a movement of exactly the right extent for feeding between the plates 1428 and the plate 1430 the proper length of wire for use as a binder. To prevent any retractive movement of the ratchet wheel 1502 when the hand lever is returned to its starting position there are provided a plurality of pawls 1528 supported on the casting 1426 and arranged to engage the ratchet wheel.

As the wire is advanced beyond the bushing 1492 it is guided by a member 1530 (Figs. 46 and 48) which extends upwardly through an opening in one of the plates 1428 and is provided with a slot to receive the wire. The member 1530 is vertically movable in a guideway in the casting 1426 and is urged upwardly by a spring 1532. Extending upwardly through an opening in the other plate 1428 is another guide member 1534 mounted and controlled similarly to the member 1530 and urged upwardly by a spring 1536 (Fig. 45). The member 1534, however, is arranged to engage the wire only on the side thereof which is farthest from the binder-presenting device, since there is no objection to deflection of the left-hand end portion of the wire toward the fingers that are to receive it, once the wire has passed the central portion of the presenting device.

The end of the hardened bushing 1492 is arranged to serve as a shear member in cooperation with a cutter 1538 (Fig. 50) to cut the wire. The cutter 1538 is mounted on a pin 1540 supported by the bracket 1490 and is held on the pin by a nut 1542 (Fig. 43). A flange 1544 (Fig. 50) on the pin is arranged to engage one side of the bracket 1490. Mounted on the pin at the other side of the bracket is a spring 1546 which tends to move the pin lengthwise in the direction to hold the flange 1544 against the bracket and to hold the cutter 1538 in proper relation to the end of the bushing 1492. For operating the cutter there is provided a lever 1548 pivoted at 1550 on a bracket 1552 on the top of the casting 1426, this lever carrying a pin 1554 that lies in a slot in the cutter. The lever 1548 is connected by a link 1556 to another lever 1558 which is pivoted at 1560 below the top portion of the casting 1426 and carries a roll 1562 engaged by a cam 1564 which is fast on a rockshaft 1566. It will be evident that by the action of the cam 1564 the lever 1558 is raised and the lever 1548 operated to move the cutter 1538 in the direction to cut the wire. The parts are returned when permitted by the cam by means of a spring 1568 connected to the lever 1548.

The rockshaft 1566, which carries not only the cam 1564 but also other parts hereinafter described, is operated by a treadle 1570 (Fig. 1) connected by a link 1572 to a segmental plate 1574 (Fig. 45) fast on the rockshaft. The treadle is lifted and the parts maintained in starting positions by a spring 1576 connected to the link 1572, the limit of movement of the parts under the influence of the spring being determined by a stop 1578 (Fig. 45) in engagement with a lug 1580 on the plate 1574. The limit of the movement of the parts by the treadle is determined by engagement of the stop 1578 with another lug 1582 on the plate 1574.

Before the wire has been cut as above described, it is engaged substantially midway between the opposite ends of the piece to be cut off by a finger 1584 (Figs. 46 and 47) comprising a thin narrow plate mounted on a slide 1586 movable along the lower face of the plate 1430 to force the wire into the recess 1212 (Fig. 35) in the rib 1192 and clamp it in this recess. The slide 1586 is movable in a guideway in the top portion of the casting 1426 and has at its rear end an arm 1588 extending downwardly through a slot in the casting. This arm is engaged on one side by the lug 1582 on the plate 1574 and on the other side by a spring-pressed plunger 1590 which presses it against the lug and imparts operative movement to the slide 1586 as the plate 1574 is operated by the treadle. It will be evident that the clamping of the wire thus occurs at the beginning of the depression of the treadle, and as shown in Fig. 50 the cam 1564 that operates the cutter is so shaped and arranged as to delay the cutting of the wire until this clamping action has occurred. Insurance is thus afforded against any lengthwise displacement of the binder before it is delivered to the binder-presenting device.

For forcing the binder into the slots in the fingers 1206 and the arms 1298 of the binder-presenting device there are provided pushers that consist of thin plates 1592 (Fig. 46) mounted upon the plates 1428 and in a recess provided in the overlying plate 1442. It will be seen that these plates 1592 have binder-engaging edges curved for the most part similarly to the edges of the plates 1428 and 1430. The plates 1592 may turn about pins 1594 that extend downwardly through slots 1595 in the plates 1428 and are mounted in rack bars 1596 movable along guideways formed in the casting 1426. These rack bars are engaged and operated by segmental gear members 1598 that are fast on the rockshaft 1566 and extend into slots in the casting 1426. It will thus be seen that as the treadle 1570 is depressed the pusher plates 1592 are moved forward toward the binder and the binder-presenting device. During a considerable portion of their movement they are prevented from turning about the pins 1594 by contact of the plate 1442 with their straight side edges. As they are thus advanced they wedge the wire guides 1530 and 1534 downwardly by contact with beveled surfaces on these guides and then engage the binder and bend it around the groups of fingers 1206 which are positioned with their end faces against the edges of the plates 1428 and 1430, pushing the binder into the slots 1210 in the fingers. It will be evident that the pins 1292 of the binder-presenting device are in positions to prevent the plates 1592 from being moved to any substantial extent into the portions of the slots in the arms 1298 which are immediately adjacent to the pins. Since it is necessary to force the end portions of the binder into these slots for considerable distances, in order to position them behind the retaining balls 1308 (Fig. 41), there is provided means for imparting to the plates 1592 turning movements about the pins 1594 near the end of their forward movement, so as to render their extreme forward end portions effective as required on the end portions of the binder. This means comprises pins 1600 (Fig. 46) projecting upwardly from the plates 1428 into the path of the plates 1592 and arranged to be engaged by shoulders 1602 formed in recessed portions of these plates. To permit the turning of the plates by the action of the pins 1600 the walls of the recessed plate 1442 are widened, as indicated at 1604 (Fig. 43). It will be understood that in the return movement of the plates 1592 they are turned about the pins to their normal positions by the action of these walls thereon.

The construction is further such that the binder-presenting device, after a binder has been placed therein in the manner above described, is released by the latches 1454 and 1456 through movement of the hand lever 1506 to feed more wire into position between the plates 1428 and 1430. For this purpose there is provided a bar 1606 pivotally connected to an arm 1608 fast on the rockshaft 1458 and to another arm 1610 fast on the rockshaft 1460. A spring 1612 connected to this bar tends to move it in the direction to force the latches 1454 and 1456 toward each other and thus to maintain them in holding relation to the binder-presenting device. Near the end of the binder-feeding movement of the lever 1506 a pin 1614 thereon engages the end of the bar 1606 and moves it in the direction to withdraw the latches from operating positions and thus to release the binder-presenting device. When this occurs the spring 1446 acts through the slide 1440 to move the device forwardly toward the operator far enough to withdraw the ends of the members 1198 from under the plates 1428 and thus permit the device to be removed by simply lifting it off the shoulders 1432. Stops 1616 on the members 1434 serve by engagement with the previously mentioned shoulders 1462 on the members 1198 to prevent the device from being forced entirely off its support. When the operator swings the lever 1506 to its starting position the latches 1454 and 1456 are again swung inwardly and at this time enter notches 1618 in the members 1198 to assist in holding the device until the operator is ready to remove it. Similar notches are provided in the plate 1196 in line with the notches 1618, so that the latches will not interfere with the removal of the device by lifting it off the shoulders 1432.

In the operation of the machine, after the operator has presented a binder to the toe wipers and formed loops on its ends by use of the binder-presenting device in the manner described, he mounts on the work support, in the position illustrated in Fig. 16, a last with an upper and an insole assembled thereon, the work support having been adjusted in various ways, as described, in accordance with the style and size of the last. He also places the forepart of the upper upon the jig pins 280 which are at that time comparatively near together and also in positions sufficiently retracted from the extreme toe end of the last to facilitate the mounting of the upper thereon. By depressing the treadle 362 the operator then advances toward the work the device shown in Fig. 7 for supporting and guiding the extreme toe end of the upper and also the spring-controlled mechanism shown in Fig. 30 which is connected with this guiding device. The latch 320 of this mechanism connects with the lug 316 on one of the jig pin carriers 288 at the end of the movement of the treadle. After arranging the toe end of the upper in proper relation to the guiding device, the operator moves the work support slide 100 forwardly by means of the handle 122, thus advancing the last to the position determined by the end gage 124 and the side gages 132. As the slide begins its movement the jig pin carriers 288 are released by the cam face 314 (Fig. 16) in the manner described, thus rendering the above-mentioned spring-controlled mechanism effective to pull the carriers forward relatively to the slide 100 to take up the slack in the upper. At the same time the jig pins are swung yieldingly apart to straighten the upper laterally. As the movement of the slide 100 continues the jig pin carriers are pulled along with it by the spring-controlled mechanism, the upper-guiding device also moving along with the slide, under control of the same mechanism. Near the end of the forward movement of the slide 100 the jig pin carriers are operated supplementally by it to insure the advance of the jig pins fully to the positions determined by the wipers and the gage plates 284.

After presenting the work as above described, the operator depresses the starting treadle 264. By the depression of this treadle the machine is started in operation, and by the same movement of the treadle the above-mentioned latch 320 is disconnected from the lug 316 and the pawl 240 (Fig. 16) is operated to unlock the vertically movable work support slide 106. As the machine begins its cycle the clamp members 578, 628 and 630 are moved into upper-clamping positions and the side grippers (Fig. 6) are moved somewhat inwardly toward each other and then closed to grip the upper. At substantially the same time the shoe-depressing arm 660 is swung downward to carry the plate 694 into engagement with the insole, the plate being released to the action of the springs 688 which move it forwardly into contact with the lip of the insole at the end of the toe. The arm 660 by its movement depresses the last and the work support enough to bring the top of the forepart of the last a little nearer to the outspread upper, and then comes to a stop, the parts being positioned substantially as illustrated in Fig. 53.

The jig pins 280 are next removed from the jig holes in the upper by downward movements of the slides 408 (Fig. 12). The work support slide 100 also is locked to the slide 102 by the pawls 148 and 150, and the toe rest 726 is moved upward into position to engage the upper at and near the tip seam and press it against the top of the forepart of the last. Thereafter movement is imparted to the slide 102 to effect by movement of the last a lengthwise stretching of the upper the margin of the toe portion of which is held by the clamping means and the side grippers. In this operation the positively controlled clamp member 578 prevents the margin of the upper from slipping. As the last receives its lengthwish movement the plate 694 is carried along with the insole into position to be again held by the latch 690, the plate by its contact with the insole lip maintaining the toe end of the last in proper lateral position as the last is carried away from the side gages 132.

Immediately after the lengthwise stretching of the upper the shoe-depressing arm 660 starts to move downward again, thus moving the last and the work support downward relatively to the upper-clamping means, the grippers and the toe wipers. In this manner the toe portion of the upper is pulled heightwise of the last and conformed to the contour of the toe portion of the last. As the arm starts downward the positive clamp member 578 is lifted from clamping position by a short upward movement of the carrier 584, the other clamp members 628 and 630, however, remaining in positions to control the margin of the upper yieldingly while permitting it to slip inwardly toward the last as the last is depressed and approaches the position illustrated in Fig. 54. During this downward movement of the last the side grippers are moved inwardly toward the last and also receive movements of definite extents lengthwise of the last toward its heel end to position the ends of the tip seam at the correct distances from the toe end face of the last. As the last is moved downward, moreover, the means for conforming the upper to the contour thereof at the rear of the toe portion is moved upward to apply the rubber band 972 and the upwiping members 994 to the upper and to press the pad 974 against the band at the top of the forepart of the upper. These parts then move downward with the last in the relation to the upper illustrated in Fig. 55. After the last has arrived at the end of its downward movement, the members 982 and 992 are moved farther upward, thus wrapping the band 972 farther around the upper and last with a frictional pulling action on the upper and wiping the upper at the sides of the last to the edge of the insole, as illustrated in Fig. 56. At substantially the same time the toe wipers 278 are advanced and closed to wipe the marginal portion of the upper inwardly over the feather and against the lip of the insole and to apply the toe binder to the upper, the work support slide 106 having been locked by the pawl 240 against any further downward movement. Near the end of the wiping movement of the toe wipers the side gripper jaws are opened and the grippers are moved outwardly away from the shoe; and as the wipers complete their wiping movement the shoe-depressing arm is raised a little to permit the shoe to be forced more firmly up against the wipers by the toe rest spring 738. The main portion of the machine then comes to a stop, and the side overlaying and tacking devices (Fig. 21), operated as described through a separate automatically controlled clutch, are moved inwardly to lay over the insole the margin of the portion of the upper acted upon by the band 972 and the upwiping wipers 994. The side tacks $t^4$ (Fig. 60) are driven by these devices in locations at or near the ball line and they are then moved outwardly away from the shoe. The position of one of these devices just after the tack-driving operation is illustrated in Fig. 57, the driver being retracted from the head of the tack as hereinbefore described. After the tacks $t^4$ have been driven, and while the main portion of the machine is still at rest, the tackers 940 and 942 are moved downwardly and inwardly into tacking positions (Figs. 58 and 59) by their separately controlled operating means, are operated to drive the tacks $t^2$ and $t^3$ (Fig. 60) and are then retracted to their starting positions. The tacks $t^2$ thus fasten the binder to the shoe and the tacks $t^3$ fasten portions of the upper at the rear of the ends of the binder. After the driving of these tacks the main portion of the machine is again started and the power-operated parts thereof are returned to their initial positions, the shoe support slide 100 being disconnected from the slide 102. The operator then retracts the slide 100 to withdraw the shoe from the lasting means, and removes the shoe from the shoe support. As the slide 100 is thus retracted, the jig pins are returned to their starting positions ready to receive another upper.

Novel features of the means described for controlling the drivers which drive the tacks at the rear of the toe portion of the shoe, so as to avoid any danger of displacement of the tacks after they are driven, are not claimed herein but in a divisional application, Serial No. 720,274, filed on April 12, 1934. Novel features of the work support, moreover, are claimed in another divisional application, Serial No. 720,273, filed on April 12, 1934.

Having described the invention, what I claim as new and desire to secure by Letters Patent of the United States is:

1. In a lasting machine, the combination with toe-lasting means constructed to clamp the toe end of an upper, of a work carrier provided with means for supporting a last with an upper thereon, and means for imparting to said work carrier rectilinear sliding movement relatively to said toe-lasting means in a direction lengthwise of the last to stretch the upper.

2. In a lasting machine, the combination with toe-lasting means constructed to clamp the toe end of an upper, of a work carrier provided with means for supporting a last with an upper thereon, a support for said work carrier relatively to which the latter is movable in a direction lengthwise of the last to stretch the upper, said support being movable in a direction heightwise of the last in the lasting operation, and means for imparting to said work carrier its movement lengthwise of the last.

3. In a lasting machine, the combination with toe-lasting means constructed to clamp the toe end of an upper, of a work carrier provided with means for supporting a last with an upper thereon, a support for said work carrier relatively to which the latter is movable in a direction lengthwise of the last to stretch the upper, said support being movable in a direction heightwise of the last in the lasting operation, and means on said movable support for imparting to the work carrier its movement lengthwise of the last.

4. In a lasting machine, the combination with toe-lasting means constructed to clamp the toe end of an upper, of a work carrier provided with means for supporting a last with an upper thereon, a support for said work carrier relatively to which the latter is movable in a direction lengthwise of the last to stretch the upper, said support being movable in a direction heightwise of the last in the lasting operation, a toggle on said movable support for imparting to the work carrier its movement lengthwise of the last, and mechanism for operating said toggle.

5. In a lasting machine, the combination with toe-lasting means constructed to clamp the toe end of an upper, of a work carrier provided with means for supporting a last with an upper thereon, said work carrier being movable different distances in a direction lengthwise of the last to present lasts of different sizes with their toe end faces in the same position and reversely movable relatively to the lasting means to stretch the upper, and means for imparting to said work carrier its reverse upper-stretching movement.

6. In a lasting machine, the combination with toe-lasting means constructed to clamp the toe end of an upper, of a work carrier provided with means for supporting a last with an upper thereon, said work carrier being movable different distances in a direction lengthwise of the last to present lasts of different sizes with their toe end faces in the same position and reversely movable relatively to the lasting means to stretch the upper, and mechanism constructed and arranged to effect a connection with said work carrier in any position that it assumes in thus presenting a last and to impart to it its reverse upper-stretching movement.

7. In a lasting machine, the combination with toe-lasting means constructed to clamp the toe end of an upper, of a slide provided with means for supporting a last with an upper thereon and movable in a direction lengthwise of the last to present the last to the lasting means, a second slide supporting said first-named slide and also movable in directions lengthwise of the last, means for connecting said second slide to the first slide after the movement of the latter to present the last, and means for operating said second slide to impart to the last lengthwise movement relatively to the lasting means to stretch the upper.

8. In a lasting machine, the combination with toe-lasting means constructed to clamp the toe end of an upper, of a slide provided with means for supporting a last with an upper thereon and movable in a direction lengthwise of the last to present the last to the lasting means, a second slide supporting said first-named slide and also movable in directions lengthwise of the last, automatic means for locking said two slides together against relative movement in either direction after the movement of the first slide to present the last, and mechanism arranged to act on said second slide to impart to the last lengthwise movement relatively to the lasting means to stretch the upper.

9. In a power-operated lasting machine, the combination with toe-lasting means constructed to clamp the toe end of an upper, of a work carrier provided with means for supporting a last with an upper thereon and movable by the operator in a direction lengthwise of the last to present the last to the lasting means, operating means for imparting to said work carrier reverse movement relatively to the lasting means to stretch the upper, and mechanism for connecting said work carrier to its operating means after the starting of the power operation of the machine.

10. In a power-operated lasting machine, the combination with toe-lasting means constructed to clamp the toe end of an upper, of a work carrier provided with means for supporting a last with an upper thereon, a member along which said work carrier is movable by the operator in a direction lengthwise of the last to present the last to the lasting means, means constructed and arranged to act through said member to impart to the work carrier reverse movement relatively to the lasting means to stretch the upper, and automatic means for connecting said member to the work carrier after the starting of the power operation of the machine.

11. In a lasting machine, the combination with toe-lasting means constructed to clamp the toe end of an upper, of a work support constructed to position a last with an upper thereon, last-depressing means for moving said work support and the last relatively to the lasting means in a direction heightwise of the last in the lasting operation, and mechanism constructed to operate independently of said last-depressing means to impart to the last lengthwise movement relatively to the lasting means to stretch the upper.

12. In a lasting machine, the combination with toe-lasting means constructed to clamp the toe end of an upper, of a work support constructed to to position a last with an upper thereon, said work support being movable in the directions heightwise and lengthwise of the last in the lasting operation, a member arranged to act through the last to impart to said work support its movement heightwise of the last, and means constructed and arranged to move the work support and last relatively to the lasting means in a direction lengthwise of the last to stretch the upper while said member is stationary.

13. In a lasting machine, the combination with toe-lasting means constructed to clamp the toe end of an upper, of a work support constructed to position a last with an upper and an insole thereon said work support being movable in directions heightwise and lengthwise of the last in the lasting operation, means for moving the work support and last relatively to the lasting means in a direction lengthwise of the last to stretch the upper, and last-depressing means movable into engagement with the insole prior to such upper-stretching movement of the work support lengthwise of the last and further movable to impart to the work support its movement heightwise of the last after the completion of its movement lengthwise of the last.

14. In a lasting machine, the combination with toe-lasting means constructed to clamp the toe end of an upper, of a work support constructed to position a last with an upper and an insole thereon, said work support being movable in directions heightwise and lengthwise of the last in the lasting operation, means for moving the work support and last relatively to the lasting means in a direction lengthwise of the last to stretch the upper, and means for imparting to the last and work support movement heightwise of the last by engagement with the insole, said last-named means including an insole-engaging member arranged to partake of the lengthwise upper-stretching movement of the last.

15. In a lasting machine, the combination with toe-lasting means constructed to clamp the toe end of an upper, of a work support constructed to position a last having thereon an upper and an insole provided with a lip on its bottom face, said work support being movable in directions heightwise and lengthwise of the last in the lasting operation, means for imparting to the work support and last movement lengthwise of the last to stretch the upper, and means for also imparting to the work support and last movement heightwise of the last through contact with the insole, said last-named means including a member arranged to engage the inner face of the insole lip at the toe and to be moved with the last by contact of the insole therewith as the last receives its lengthwise movement.

16. In a lasting machine, the combination with means for lasting the toe end of an upper over a last and an insole and against a lip on the insole, of means for moving the last lengthwise relatively to the lasting means, and means for also moving the last heightwise relatively to the lasting means comprising a member arranged to engage the inner face of the insole lip at the toe and to be moved with the last by contact of the insole therewith as the last receives its lengthwise movement.

17. In a lasting machine, the combination with means for lasting the toe end of an upper over a last and an insole and against a lip on the insole, of means for moving the last lengthwise relatively to the lasting means, means for also moving the last heightwise relatively to the lasting means comprising a member arranged to engage the inner face of the insole lip at the toe, and spring means against the resistance of which said member is movable with the last by contact of the insole therewith as the last receives its lengthwise movement.

18. In a lasting machine, the combination with means for lasting the toe end of an upper over a last and an insole and against a lip on the insole, of means for moving the last lengthwise relatively to the lasting means, and means for also moving the last heightwise relatively to the lasting means comprising a member arranged to engage the inner face of the insole lip at the toe and to be moved with the last by contact of the insole therewith as the last receives its lengthwise movement, said member being movable heightwise of the last toward the insole and also movable lengthwise of the last toward the lip at the end of the toe.

19. In a lasting machine, the combination with means for lasting the toe end of an upper over a last and an insole and against a lip on the insole, of means for moving the last lengthwise relatively to the lasting means, means for also moving the last heightwise relatively to the lasting means comprising a member arranged to engage the inner face of the insole lip at the toe, said member being movable heightwise of the last toward the insole, and spring means arranged to move said member lengthwise of the last toward the lip at the end of the toe and against the resistance of which the member is thereafter movable with the last by contact of the lip therewith as the last receives its lengthwise movement.

20. In a lasting machine, the combination with means for lasting the toe end of an upper over a last and an insole and against a lip on the insole, of means for moving the last lengthwise relatively to the lasting means, means for also moving the last heightwise relatively to the lasting means comprising a member arranged to engage the inner face of the insole lip at the toe, spring means for moving said member lengthwise of the last toward the lip at the end of the toe, and a latch movable to release the member to the action of said spring means, the member being thereafter movable with the last into position to be again held by the latch as the last receives its lengthwise movement.

21. In a lasting machine, the combination with means for lasting the toe end of an upper over a last and an insole and against a lip on the insole, of a member arranged to engage the inner face of the insole lip at the toe to back up the lip in the lasting operation, said member being movable heightwise of the last toward the insole, and spring means for moving said member bodily forward toward the lip at the end of the toe when the member has arrived substantially in insole-engaging position.

22. In a lasting machine, the combination with means for lasting the toe end of an upper over a last and an insole and against a lip on the insole, of a member arranged to engage the inner face of the insole lip at the toe to back up the lip in the lasting operation, spring means for moving said member lengthwise of the last toward the lip at the end of the toe, and mechanism arranged to be controlled by contact with the insole for rendering said spring means operative.

23. In a lasting machine, the combination with means for lasting the toe end of an upper over a last and an insole and against a lip on the insole, of a member arranged to engage the inner face of the insole lip at the toe to back up the lip in the lasting operation, spring means for moving said member lengthwise of the last toward the lip at the end of the toe, a device for holding the member normally retracted against the resistance of said spring means, and mechanism arranged to be controlled by contact with the insole for operating said device to release the member.

24. In a lasting machine, the combination with means for lasting the toe end of an upper over a last and an insole and against a lip on the insole, of a member arranged to engage the inner face of the insole lip at the toe to back up the lip in the lasting operation, said member being movable heightwise of the last toward the insole, spring means for moving said member lengthwise of the last toward the lip at the end of the toe, a latch for holding the member normally retracted against the resistance of said spring means, and a pin movable with the member toward the insole and arranged to act upon contact with the insole to lift the latch and thereby release the member to the action of said spring means.

25. In a lasting machine, the combination with means for lasting an upper over a last and an insole, of a support for the last and its shoe materials arranged to receive and position the last when it is initially presented to the machine and mounted for rectilinear movement in a direction heightwise of the last, an arm mounted for swinging movement heightwise of the last, a device on said arm for engaging the insole to impart to the last and its support said rectilinear movement by the swinging of the arm, said device and the arm being relatively movable about an axis extending widthwise of the last, and means connected to said device for determinately varying its position relatively to the arm in the swinging of the arm.

26. In a lasting machine, the combination with means for lasting an upper over a last and an insole, of a support for the last and its shoe materials arranged to receive and position the last when it is initially presented to the machine and mounted for rectilinear movement in a direction heightwise of the last, an arm mounted for swinging movement heightwise of the last, a device on said arm for engaging the insole to impart to the last and its support said rectilinear movement by the swinging of the arm, said device and the arm being relatively movable about an axis extending widthwise of the last, and means mounted for swinging movement about an axis different from that of the arm and connected to said device for determinately varying the position of the device relatively to the arm in the swinging of the arm.

27. In a lasting machine, the combination with means for lasting an upper over a last and an insole, of a support for the last and its shoe materials arranged to receive and position the last when it is initially presented to the machine and mounted for rectilinear movement in a direction heightwise of the last, an arm mounted for swinging movement heightwise of the last, a device on said arm for engaging the insole to impart to the last and its support said rectilinear movement by the swinging of the arm, said device and the arm being relatively movable about an axis extending widthwise of the last, and means connected to said device for determining its position relatively to the arm in the swinging of the arm, said means being constructed to maintain the device with its insole-engaging face in substantially parallel relation to the bottom face of the insole throughout the movement of the device.

28. In a lasting machine, the combination with means for lasting an upper over a last and an insole, of a support for the last and its shoe materials mounted for rectilinear movement in a direction heightwise of the last, a device for engaging the insole to impart to the last and its support said rectilinear movement, an arm supporting said device and mounted for swinging movement heightwise of the last to carry the device into engagement with the insole and to effect the movement of said last and support, said device and the arm being relatively movable about an axis extending widthwise of the last, and controlling mechanism connected to said device for positioning it in such relation to the arm as to present its insole-engaging face in substantially parallel relation to the bottom face of the insole when it first engages the insole and for maintaining it in that relation to the insole during the heightwise movement of the last.

29. In a lasting machine, the combination with means for lasting an upper over a last and an insole, of a support for the last and its shoe materials mounted for rectilinear movement in a direction heightwise of the last, a device for engaging the insole to impart to the last and its support said rectilinear movement, an arm supporting said device and mounted for swinging movement heightwise of the last to carry the device into engagement with the insole and to effect the movement of said last and support, said device and the arm being relatively movable about an axis extending widthwise of the last, and a member mounted for swinging movement about an axis different from that of said arm and connected to said device to position it in such relation to the arm as to present its insole-engaging face in substantially parallel relation to the bottom face of the insole when it first engages the insole and to maintain it in that relation to the insole during the heightwise movement of the last.

30. In a lasting machine, the combination with lasting means, of a support for a last and its shoe materials yieldingly movable relatively to said lasting means in a direction heightwise of the last, means for imparting such movement to the support to perform a part of the lasting operation, and mechanism for thereafter locking the support against further movement in the same direction.

31. In a lasting machine, the combination with means for lasting an upper over a last and an insole, of a support for the last and its shoe materials yieldingly movable relatively to said lasting means in a direction heightwise of the last, means for thus moving the last and support by engagement with the insole to perform a part of the lasting operation, and mechanism controlled by said last-named means for locking the support against further movement in the same direction.

32. In a lasting machine, the combination with toe-lasting means including wipers for wiping the margin of the toe end of the upper inwardly over an insole, of a support for a last and its shoe materials yieldingly movable in a direction heightwise of the last, means for thus moving the last and support relatively to the lasting means to shape the upper over the last prior to the wiping of the upper over the insole, and mechanism for thereafter locking the support against further movement in the same direction to hold the last unyieldingly for the operation of the wipers.

33. In a lasting machine, the combination with lasting means, of a support for a last and its shoe materials yieldingly movable in a direction heightwise of the last, means for thus moving the support relatively to the lasting means to perform a part of the lasting operation, a device for locking the support against such movement while the operator mounts the work thereon, and means to cause said device to release the support to permit its movement and thereafter to lock it against further movement in the same direction.

34. In a lasting machine, means for clamping the marginal portion of the toe end of an upper mounted on a last, means for moving the last lengthwise relatively to said clamping means to stretch the upper, a device for engaging the top of the forepart of the upper, and means for moving said device to press the upper against the last prior to any substantial lengthwise movement of the last and for holding it against the upper during said movement of the last.

35. In a lasting machine, means for clamping the marginal portion of the toe end of an upper mounted on a last, means for moving the last lengthwise relatively to said clamping means to stretch the upper, a toe rest arranged to occupy an initial position out of contact with the clamped upper, and means for moving said toe rest into position to press the upper against the last prior to the lengthwise movement of the last and for holding it in that position during said movement of the last.

36. In a lasting machine, a support for a last with an upper thereon comprising a heel pin for engaging the heel end of the last in its spindle hole, means for clamping the marginal portion of the toe end of the upper, means for moving said support and the last relatively to the clamping means in a direction lengthwise of the last to stretch the upper, a device arranged to engage the top of the forepart of the upper, and means for effecting relative movement of said device and the last support in a direction heightwise of the last to cause the device to press the upper against the last prior to any substantial lengthwise stretching of the upper.

37. In a lasting machine, a support for a last with an upper thereon comprising a heel pin for engaging the heel end of the last in its spindle hole, means for clamping the marginal portion of the toe end of the upper, grippers for gripping and holding the upper at the sides of the toe substantially at the ends of the tip seam, means for operating said support to impart to the last lengthwise movement relatively to said clamping means and grippers to stretch the upper, and a device arranged to press the upper against the top of the forepart of the last as the last receives its lengthwise movement.

38. In a lasting machine, a support for a last with an upper thereon, means for clamping the marginal portion of the toe end of the upper, grippers for gripping and holding the upper at the sides of the toe rearwardly of said clamping means, and means for operating said support to impart to the last lengthwise movement relatively to said clamping means and grippers to stretch the upper.

39. In a lasting machine, a support for a last with an upper thereon comprising a heel pin for engaging the heel end of the last in its spindle hole, means for clamping the marginal portion of the toe end of the upper outspread forwardly of the tip seam, grippers for gripping and holding the upper substantially at the ends of the tip seam, and means for operating said support to impart to the last lengthwise movement relatively to said clamping means and grippers to stretch the upper.

40. In a lasting machine, a support for a last with an upper thereon, wipers for wiping the upper inwardly over an insole on the last around the toe, means for clamping the marginal portion of the toe end of the upper in a plane substantially parallel to the plane of the wipers, grippers for gripping and holding the upper at the sides of the toe substantially at the ends of the tip seam, and means for operating said support to impart to the last lengthwise movement relatively to said clamping means and grippers to stretch the upper before it is wiped inwardly over the insole by the wipers.

41. In a lasting machine, a support for a last with an upper thereon, wipers for wiping the upper inwardly over an insole on the last around the toe, means for clamping the marginal portion of the toe end of the upper independently of the wipers in a plane substantially parallel to the plane of the wipers, and means for operating said support to impart to the last lengthwise movement relatively to said clamping means to stretch the upper.

42. In a lasting machine, wipers for wiping the marginal portion of the toe end of an upper inwardly over an insole on a last, means for clamping the marginal portion of the toe end of the upper independently of said wipers in a plane substantially parallel to the plane of the wipers, and mechanism for effecting relative movement of said clamping means and the last in a direction lengthwise of the last to stretch the upper.

43. In a lasting machine, wipers for wiping the marginal portion of the toe end of an upper inwardly over an insole on a last, a fixed plate arranged to receive the marginal portion of the toe end of the upper outspread along the plane of the wipers, means arranged to cooperate with said plate to clamp the upper, and mechanism for moving the last lengthwise to stretch the upper while its toe end is thus clamped.

44. In a lasting machine, wipers for wiping the marginal portion of the toe end of an upper inwardly over an insole on a last, means constructed to act independently of the wipers to clamp the marginal portion of the toe end of the upper outspread along the plane of the wipers, and means for imparting to the last both lengthwise and heightwise movements relatively to said clamping means to stretch the upper and conform it to the contour of the last.

45. In a lasting machine, means for clamping the marginal portion of the toe end of an upper mounted on a last, and means for effecting relative movement of said clamping means and the last first lengthwise of the last to stretch the upper and thereafter heightwise of the last to conform the upper to the contour of the last, said clamping means being constructed to hold the marginal portion of the upper from slipping during said relative lengthwise movement and to hold it with less pressure while permitting it to slip during said relative heightwise movement.

46. In a lasting machine, means for clamping the marginal portion of the toe end of an upper mounted on a last, and means for imparting to the last lengthwise movement relatively to said clamping means to stretch the upper and thereafter heightwise movement to conform the upper to the contour of the last, said clamping means being constructed to clamp the marginal portion of the upper positively as the last receives its lengthwise movement and thereafter to clamp it yieldingly while permitting it to slip as the last receieves its heightwise movement.

47. In a lasting machine, means for clamping the marginal portion of an upper mounted on a last, and means for moving the last relatively to said clamping means to cause the clamping means to pull the upper, said clamping means being constructed to clamp the margin of the upper with sufficient pressure to prevent it from slipping during a portion of the movement of the last and thereafter to clamp it with less pressure while permitting it to slip as the last is further moved to effect pulling of the upper.

48. In a lasting machine, means for clamping the marginal portion of an upper mounted on a last, means for effecting relative movement of said clamping means and the last to tension the upper, said clamping means comprising different members arranged respectively to clamp the upper positively and yieldingly, and means to render the positive member effective during a portion of said relative movement and thereafter to render said member substantially ineffective with the upper under control of the yielding member during further relative movement of the clamping means and the last.

49. In a lasting machine, means for clamping the marginal portion of the toe end of an upper mounted on a last, means for imparting to the last lengthwise movement relatively to said clamping means to stretch the upper and thereafter heightwise movement to conform the upper to the contour of the last, said clamping means comprising different members arranged respectively to clamp the upper positively and yieldingly, and means to render the positive member effective during the lengthwise movement of the last and thereafter to render said member substantially ineffective with the upper under control of the yielding member as the last receives its heightwise movement.

50. In a lasting machine, means for clamping the marginal portion of an upper mounted on a last, means for effecting relative movement of said clamping means and the last to cause the clamping means to subject the upper to tension, said clamping means comprising different members arranged to engage the same face of the upper, and means to render one of said members effective during a portion of said relative movement and thereafter to render it substantially ineffective with the upper under control of another of the members during further relative movement of the clamping means and the last.

51. In a lasting machine, means for clamping the marginal portion of the toe end of an upper mounted on a last, means for imparting to the last lengthwise movement relatively to said clamping means to stretch the upper and thereafter heightwise movement to conform the upper to the contour of the last, said clamping means comprising different members arranged to engage the same face of the upper, and means to render one of said members effective during the lengthwise movement of the last and thereafter to render it substantially ineffective with the upper under control of another of the members as the last receives its heightwise movement.

52. In a lasting machine, means for clamping the marginal portion of the toe end of an upper mounted on a last with said marginal portion outspread lengthwise of the last, means for imparting to the last lengthwise movement relatively to said clamping means to stretch the upper and thereafter heightwise movement to conform the upper to the contour of the last, said clamping means comprising different members arranged respectively to clamp the upper positively and yieldingly on the same face thereof with the yielding member farther from the edge of the upper than the positive member, and means to render the positive member effective during the lengthwise movement of the last and thereafter to render said member substantially ineffective with the upper under control of the yielding member as the last receives its heightwise movement.

53. In a lasting machine, means for clamping the marginal portion of the toe end of an upper mounted on a last with said marginal portion outspread lengthwise of the last, means for imparting to the last lengthwise movement relatively to said clamping means to stretch the upper and thereafter heightwise movement to conform the upper to the contour of the last, said clamping means comprising different members for engaging the upper on the same face thereof, a support on which one of said members is rigidly mounted and another of the members yieldingly mounted, and means for operating said support to apply both members to the upper and hold them against the upper during the lengthwise movement of the last and thereafter to retract the rigidly mounted member while leaving the yielding member in control of the upper as the last receives its heightwise movement.

54. In a lasting machine, means for clamping the marginal portion of the toe end of an upper mounted on a last with said marginal portion outspread lengthwise of the last, means for imparting to the last lengthwise movement relatively to said clamping means to stretch the upper and thereafter heightwise movement to conform the upper to the contour of the last, said clamping means comprising a member for engaging the upper with positive clamping pressure and other members for engaging the same face of the upper as said first-named member in locations farther from the edge of the upper, a support on which the first-named member is rigidly mounted and the other members are yieldingly mounted, and means for operating said support to maintain all the members in clamping relation to the upper during the lengthwise movement of the last and thereafter to retract the rigidly mounted member while leaving the yielding members in control of the upper as the last receives its heightwise movement.

55. In a lasting machine, the combination with wipers for wiping the marginal portion of the toe end of an upper inwardly over an insole on a last, of a plate arranged to receive the marginal portion of the toe end of the upper outspread over the wipers, means for clamping the marginal portion of the upper upon said plate, means for imparting to the last lengthwise movement relatively to said clamping means to stretch the upper and thereafter heightwise movement to conform the upper to the contour of the last, said clamping means comprising different members arranged respectively to clamp the upper positively and yieldingly, and means to render the positive member effective during the lengthwise movement of the last and thereafter to render said member substantially ineffective with the upper under control of the yielding member as the last receives its heightwise movement.

56. In a lasting machine, cooperating clamp members for clamping the marginal portion of an upper outspread to control it in the lasting operation, and means for moving one of said clamp members bodily from an initial retracted position along the plane of the clamping face of the other member and also toward said plane into clamping position while maintaining it in substantially the same angular relation to said plane during its movement.

57. In a lasting machine, cooperating clamp members for clamping the marginal portion of an upper outspread to control it in the lasting operation, and means for moving one of said clamp members bodily from an initial retracted position toward and along the plane of the clamping face of the other member and thereafter in a direction perpendicular to said plane into clamping relation to the upper while maintaining it in substantially the same angular relation to said plane throughout its movement.

58. In a lasting machine, cooperating clamp members for clamping the marginal portion of an upper outspread to control it in the lasting operation, and parallel links supporting one of said clamp members for bodily movement toward and along the plane of the clamping face of the other clamp member while maintaining it in substantially the same angular relation to said plane.

59. In a lasting machine, cooperating clamp members for clamping the marginal portion of an upper outspread to control it in the lasting operation, parallel links supporting one of said clamp members for bodily movement toward and along the plane of the clamping face of the other member, and means for guiding said movable member in a path substantially perpendicular to said plane in the latter portion of its clamping movement.

60. In a lasting machine, cooperating clamp members for clamping the marginal portion of an upper outspread to control it in the lasting operation, parallel links supporting one of said clamp members for bodily movement toward and along the plane of the clamping face of the other member, means for moving the links bodily to carry the member toward said plane, spring means tending to move the member along said plane toward clamping position while swinging the links, and guiding means for controlling the movement of the member effected by said spring means.

61. In a lasting machine, cooperating clamp members for clamping the marginal portion of an upper outspread to control it in the lasting operation, parallel links supporting one of said clamp members for bodily movement toward and along the plane of the clamping face of the other member, means for moving the links bodily to carry the member toward said plane, spring means tending to move the member along said plane toward clamping position while swinging the links, one of the links having an extension thereon, and a member for engaging said extension to control the movement effected by said spring means.

62. In a lasting machine, the combination with toe-lasting wipers, of means for clamping the marginal portion of the toe end of an upper outspread along the plane of the wipers comprising a clamp member for engaging the inner face of the upper, and means for moving said clamp member bodily from an initial retracted position along the plane of the wipers and toward said plane while maintaining it in substantially the same angular relation to said plane during its movement.

63. In a lasting machine, the combination with toe-lasting wipers, of means for clamping the marginal portion of the toe end of an upper outspread along the plane of the wipers comprising a clamp member for engaging the inner face of the upper, and means for moving said clamp member progressively toward and along the plane of the wipers while maintaining it in substantially the same angular relation to said plane and for thereafter moving it in a path substantially perpendicular to said plane into clamping position.

64. In a lasting machine, the combination with toe-lasting wipers, of means for clamping the marginal portion of the toe end of an upper outspread over the wipers comprising a clamp member for engaging the upper from above, and parallel links supporting said clamp member and movable bodily to lower it while advancing it progressively along the plane of the wipers.

65. In a lasting machine, the combination with toe-lasting wipers, of means for clamping the marginal portion of the toe end of an upper outspread over the wipers comprising a clamp member for engaging the upper from above, parallel links supporting said clamp member and movable to lower it and advance it progressively along the plane of the wipers, and guiding means for directing the clamp member in a path substantially perpendicular to the plane of the wipers in the latter portion of its downward movement.

66. In a lasting machine, the combination with toe-lasting wipers, of means for clamping the marginal portion of the toe end of an upper outspread over the wipers comprising a clamp member for engaging the upper from above, parallel links supporting said clamp member, means for moving said links bodily in a downward direction, spring means tending to advance the clamp member along the plane of the wipers while swinging the links, and means arranged to control the swinging of the links in opposition to the force of said spring means.

67. In a lasting machine, the combination with toe-lasting wipers, of a clamping device for clamping the marginal portion of the toe end of an upper outspread along the plane of the wipers, parallel links supporting said clamping device, and means for moving said links bodily and for also swinging them to move the device along the plane of the wipers and toward said plane.

68. In a lasting machine, the combination with toe-lasting wipers, of a clamping device for clamping the marginal portion of the toe end of an upper outspread along the plane of the wipers, parallel links supporting said clamping device, means for imparting to said links lengthwise bodily movements to carry the device toward the plane of the wipers, spring means for moving the device along the plane of the wipers while swinging the links, and means for controlling the movement effected by said spring means.

69. In a lasting machine, the combination with toe-lasting wipers, of a clamping device for clamping the marginal portion of the toe end of an upper outspread along the plane of the wipers, parallel links supporting said clamping device, crank arms supporting said links for operating them to move the device toward clamping position, and means for controlling and operating said crank arms.

70. In a lasting machine, the combination with toe-lasting wipers, of a clamping device for clamping the marginal portion of the toe end of an upper outspread along the plane of the wipers, parallel links supporting said clamping device, crank arms supporting said links for operating them to move the device toward clamping position, pinions connected to said crank arms, and rack bars engaging said pinions to operate the crank arms while maintaining them in predetermined relation to one another.

71. In a lasting machine, the combination with toe-lasting wipers, of means for clamping the marginal portion of the toe end of an upper outspread along the plane of the wipers, said means comprising a plurality of clamp members for engaging the upper in different locations around the toe, a carrier supporting said clamp members, and means for moving said carrier along the plane of the wipers and toward said plane while maintaining it in substantially the same angular relation to said plane.

72. In a lasting machine, the combination with toe-lasting wipers, of means for clamping the marginal portion of the toe end of an upper outspread along the plane of the wipers, said means comprising a plurality of clamp members for engaging the upper in different locations around the toe, a carrier supporting said clamp members, means for moving said carrier along the plane of the wipers and toward said plane while maintaining it in substantially the same angular relation to said plane, and guiding means to cause the carrier thereafter to move in a direction substantially perpendicular to said plane to carry the clamp members into clamping position.

73. In a lasting machine, the combination with toe-lasting wipers, of means for clamping the marginal portion of the toe end of an upper outspread along the plane of the wipers, said means comprising a plurality of clamp members for engaging the upper in different locations around the toe, a carrier supporting said clamp members, parallel links supporting said carrier, and crank arms for supporting said links and operating the carrier through the links.

74. In a lasting machine, the combination with toe-lasting wipers, of means for clamping the marginal portion of the toe end of an upper outspread along the plane of the wipers, said means comprising a plurality of clamp members for engaging the upper in different locations around the toe, a carrier supporting said clamp members, parallel links supporting said carrier, crank arms connected to said links for moving them bodily lengthwise to cause the clamp members to approach the plane of the wipers, and means for swinging said links to carry the clamp members along the plane of the wipers.

75. In a lasting machine, the combination with toe-lasting wipers, of means for clamping the marginal portion of the toe end of an upper outspread along the plane of the wipers, said means comprising a plurality of clamp members for engaging the upper in different locations around the toe, a carrier supporting said clamp members, parallel links supporting said carrier, crank arms connected to said links for moving them bodily lengthwise to cause the clamp members to approach the plane of the wipers, spring means tending to move the carrier along the plane of the wipers while swinging the links, and means for controlling the swinging of the links.

76. In a lasting machine, cooperating clamp members for clamping the marginal portion of an upper between them, and means for effecting relative movement of said members into clamping relation to each other and for also moving one of the members relatively to the other in a direction outward toward the edge of the upper in contact with the upper in the upper-clamping operation.

77. In a lasting machine, cooperating clamp members relatively movable to clamp the marginal portion of an upper between them, one of said members being movable in a direction outward toward the edge of the upper in response to pressure of the upper thereon in the upper-clamping operation.

78. In a lasting machine, cooperating clamp members relatively movable to clamp the marginal portion of an upper between them, a support for one of said members relatively to which the member is movable, and means on said support for moving said member in a direction outward toward the edge of the upper in response to pressure of the upper thereon in the upper-clamping operation.

79. In a lasting machine, cooperating clamp members for clamping the marginal portion of an upper between them, a support for one of said members relatively to which the member is bodily movable, and deflecting means inclined relatively to the clamping face of said member for moving it relatively to its support in a direction outward toward the edge of the upper in response to pressure of the upper thereon in the upper-clamping operation.

80. In a lasting machine, cooperating clamp members for clamping the marginal portion of an upper between them, a support for one of said members relatively to which the member is movable in a direction outward toward the edge of the upper in response to pressure of the upper thereon in the upper clamping-operation, and spring means against the resistance of which the member is thus movable.

81. In a lasting machine, cooperating clamp members for clamping the marginal portion of an upper between them, a support for one of said members relatively to which the member is movable, and pin-and-slot guiding means arranged to act on the member to move it in a direction outward toward the edge of the upper in response to pressure of the upper thereon in the upper-clamping operation.

82. In a lasting machine, cooperating clamp members for clamping the marginal portion of an upper between them, and means for moving one of said clamp members into clamping relation to the other and for also moving it relatively to the other in a direction outward toward the edge of the upper in contact with the upper before it arrives in final clamping position.

83. In a lasting machine, cooperating clamp members, for clamping the marginal portion of an upper between them, means for moving one of said clamp members into clamping relation to the other, and means arranged to act on said movable clamp member in response to the pressure of the upper thereon to move it in a direction outward toward the edge of the upper before it arrives in final clamping position.

84. In a lasting machine, cooperating clamp members for clamping the marginal portion of an upper between them, a support for one of said clamp members movable to carry it into clamping relation to the other and relatively to which said member is movable, and means on said support for deflecting said movable member outwardly toward the edge of the upper in response to pressure of the upper on the member.

85. In a lasting machine, cooperating clamp members for clamping the marginal portion of an upper between them, a support for one of said clamp members relatively to which the member is movable, said support being movable to carry the member into clamping position, deflecting means on said support arranged to move said member in a direction outward toward the edge of the upper by further movement of the support after the member arrives in contact with the upper, and spring means against the resistance of which the member is thus movable by the deflecting means.

86. In a lasting machine, means for clamping the marginal portion of an upper, said means comprising a member arranged to engage the upper with positive clamping pressure and another member arranged to engage the upper yieldingly on the same face thereof as said positive member.

87. In a lasting machine, means for clamping the marginal portion of an upper comprising different clamp members for engaging the upper on the same face thereof, and a support for said members movable to carry them to clamping positions, one of said members being rigidly mounted on the support and the other member being yieldingly mounted thereon and arranged to engage the upper before said rigidly mounted member arrives in effective clamping position.

88. In a lasting machine, the combination with toe-lasting wipers, of means for clamping the marginal portion of an upper outspread along the plane of the wipers comprising different clamp members arranged to engage the upper on the same face thereof, and means for moving one of said members into contact with the upper and then in a direction outward toward the edge of the upper prior to the effective clamping action of the other member on the upper.

89. In a lasting machine, means for clamping the marginal portion of an upper comprising different clamp members arranged to engage the upper on the same face thereof, one of said members being arranged to engage the upper yieldingly prior to the other, and means for imparting to said yieldable member in response to pressure of the upper thereon movement in a direction outward toward the edge of the upper prior to the effective clamping action of the other member on the upper.

90. In a lasting machine, means for clamping the marginal portion of an upper comprising different clamp members arranged to engage the upper on the same face thereof, one of said members being arranged to engage the upper with positive clamping pressure and the other member to engage it yieldingly in a location farther from the edge of the upper than said positive member, and means arranged to act on said yieldable member in response to pressure of the upper thereon to move it in a direction outward toward the edge of the upper prior to the effective clamping action of the positive member on the upper.

91. In a lasting machine, means for clamping the marginal portion of an upper outspread to control it in the lasting operation, said means comprising a member arranged to engage the upper with positive clamping pressure and another member for engaging it yieldingly on the same face thereof as said positive member in a location farther from the edge of the upper than the latter, a support for said members movable to carry them into clamping positions, and means on said support arranged to act on said yieldable member in response to pressure of the upper thereon to move it in a direction outward toward the edge of the upper before the positive member arrives in effective clamping position.

92. In a lasting machine, means for clamping the marginal portion of the toe end of an upper outspread to control it in the lasting operation, said clamping means comprising a member for engaging the upper with positive clamping pressure and other members for engaging it yieldingly on the same face thereof as said positive member, a support for said members movable to carry the yieldable members first into contact with the upper and thereafter by further movement to apply the positive member to the upper, and means on said support arranged to act in such further movement thereof to move said yieldable members in directions outward toward the edge of the upper before the positive member arrives in effective clamping position.

93. In a lasting machine, grippers for gripping the marginal portion of an upper outspread at the opposite sides of the toe to control it in the lasting operation, said grippers comprising jaws arranged to receive the marginal portion of the upper outspread and other jaws movable into upper-gripping relation to said first-named jaws, and means for moving said other jaws into gripping engagement with the upper and for then moving them relatively to said first-named jaws in directions outward toward the edge of the upper.

94. In a lasting machine, a gripper comprising a pair of jaws for gripping the marginal portion of an upper between them, and means for swinging one of said jaws into upper-gripping relation to the other and for then imparting to it bodily movement relatively to the other jaw in a direction outward toward the edge of the upper.

95. In a lasting machine, a gripper comprising a pair of jaws one of which is movable toward the other to grip the marginal portion of an upper, an arm supporting said movable jaw and mounted for swinging movement to carry it into upper-gripping relation to the other jaw, said arm being arranged to swing thereafter on said other jaw as a fulcrum, and means arranged to act on the arm in such further swinging movement thereof to move it bodily lengthwise and thus to carry the movable jaw in a direction outward toward the edge of the upper.

96. In a lasting machine, a gripper comprising a pair of jaws one of which is movable toward the other to grip the marginal portion of an upper, an arm supporting said movable jaw and mounted for swinging movement, operating means for swinging said arm to carry the movable jaw into upper-gripping relation to the other jaw, said arm being yieldable in response to further movement of its operating means after the gripping of the upper, and cam means arranged to act on the arm in such further movement of the operating means to move it bodily lengthwise and thus to carry the movable jaw in a direction outward toward the edge of the upper.

97. In a lasting machine, a gripper comprising a pair of jaws one of which is movable toward the other to grip the marginal portion of an upper, an arm having said movable jaw mounted on one end thereof, said arm being mounted for swinging movement about an axis at its other end to carry the movable jaw into upper-gripping relation to the other jaw, operating means for engaging the arm between its ends to swing it, the arm being yieldable at its outer end portion in response to further movement of said operating means after the gripping of the upper, and mechanism arranged to act in such yield of the arm to impart to it lengthwise movement to carry the movable jaw in a direction outward toward the edge of the upper.

98. In a lasting machine, toe-lasting means including grippers for gripping the marginal portion of an upper outspread at the opposite sides of the toe, mechanism for effecting relative movement of said grippers and a last heightwise of the last to shape the upper over the toe end of the last, said grippers being mounted for movements inwardly toward the sides of the last in the upper-shaping operation, and pawl-and-ratchet mechanisms mounted for swinging movements about axes extending heightwise of the last to impart to said grippers their inward movements.

99. In a lasting machine, toe-lasting means including grippers for gripping the marginal portion of an upper outspread at the opposite sides of the toe, mechanism for effecting relative movement of said grippers and a last heightwise of the last to shape the upper over the toe end of the last, said grippers being mounted for movements inwardly toward the sides of the last in the upper-shaping operation, arms mounted for swinging movements about axes extending heightwise of the last for imparting to the grippers their inward movements, said arms having ratchet teeth thereon, pawls arranged to engage said ratchet teeth, and means for first moving said pawls into engagement with said ratchet teeth and for then operating them to swing the arms.

100. In a lasting machine, toe-lasting means including grippers for gripping the marginal portion of an upper outspread at the opposite sides of the toe, mechanism for effecting relative movement of said grippers and a last heightwise of the last to shape the upper over the toe end of the last, said grippers being mounted for movements inwardly toward the sides of the last in the upper-shaping operation, arms mounted for swinging movements about axes extending heightwise of the last to impart to the grippers their inward movements, said arms having ratchet teeth thereon, other arms mounted for swinging movements to operate said first-named arms and having pawls thereon for engaging said ratchet teeth, and means movable first to engage the pawls with said ratchet teeth and further movable thereafter to swing said other arms and thus to operate the first-named arms.

101. In a lasting machine, toe-lasting means including grippers having different pairs of jaws arranged respectively to grip the marginal portion of an upper outspread at the opposite sides of the toe to control it in the lasting operation, means for presenting the upper with its marginal portion outspread between the jaws of each pair, and means for moving the opposite pairs of jaws farther inwardly toward each other after the upper has been thus presented and prior to the gripping of the upper.

102. In a lasting machine, toe-lasting means including grippers having different pairs of jaws arranged respectively to grip the marginal portion of an upper outspread at the opposite sides of the toe to control it in the lasting operation, the jaws of each pair being arranged to receive the marginal portion of the upper outspread between them when the upper is presented to the machine, upper-presenting means comprising jig pins arranged to project through jig holes in the upper at the sides of the toe and movable to positions close to said jaws in presenting the upper, and means for moving the opposite pairs of jaws farther inwardly toward each other before they grip the upper, the jaws having recesses therein to receive the jig pins when they are thus moved inwardly.

103. In a lasting machine, means for clamping the marginal portion of the toe end of an upper outspread, means for effecting relative movement of said clamping means and a last heightwise of the last to shape the upper over the toe end of the last, grippers arranged to grip the marginal portion of the upper outspread at the opposite sides of the forepart farther rearwardly than said clamping means, and operating means for imparting to said grippers movements lengthwise of the last in directions away from the toe end thereof in the lasting operation, said operating means being adjustable to vary the amount of movement thus imparted to the grippers.

104. In a lasting machine, means for clamping the marginal portion of the toe end of an upper outspread, means for effecting relative movement of said clamping means and a last heightwise of the last to shape the upper over the toe end of the last, grippers arranged to grip the marginal portion of the upper outspread at the opposite sides of the forepart farther rearwardly than said clamping means, and operating means for imparting to said grippers movements lengthwise of the last in directions away from the toe end thereof in the lasting operation, said operating means comprising mechanisms associated respectively with the different grippers and each adjustable to vary independently the amount of movement imparted to the gripper associated therewith.

105. In a lasting machine, toe-lasting means including grippers for gripping the marginal portion of an upper at the opposite sides of the toe, and means for imparting to said grippers in the lasting operation movements lengthwise of the upper in directions away from the toe end thereof, said means being constructed to permit an adjustably variable amount of lost motion between different portions thereof to vary the amount of movement imparted to the grippers.

106. In a lasting machine, toe-lasting means including grippers for gripping the marginal portion of an upper at the opposite sides of the toe, and means for imparting to said grippers in the lasting operation movements lengthwise of the upper in directions away from the toe end thereof, said means comprising mechanisms arranged respectively to operate the different grippers and each constructed to permit an adjustably variable amount of lost motion between different portions thereof to vary independently for each gripper the amount of movement imparted thereto.

107. In a lasting machine, toe-lasting means including grippers for gripping the marginal portion of an upper at the opposite sides of the toe, and operating means for imparting to said grippers in the lasting operation movements lengthwise of the upper in directions away from the toe end thereof, said operating means comprising rods connected respectively to the different grippers, sleeves movable along said rods, and members arranged to be engaged by said sleeves to operate the rods and adjustable along the rods to vary the time of their engagement by the sleeves.

108. In a lasting machine, lasting means for conforming the toe end of an upper to the contour of a last, said lasting means including grippers for gripping the marginal portion of the upper at the opposite sides of the forepart, means for imparting to said grippers in the lasting operation movements lengthwise of the last in directions away from the toe end thereof, and additional means for preventing further movements of the grippers thereafter in the same directions by strain of the upper thereon.

109. In a lasting machine, lasting means for conforming the toe end of an upper to the contour of a last, said lasting means including grippers for gripping the marginal portion of the upper at the opposite sides of the forepart, means for imparting to said grippers in the lasting operation movements of variably predetermined extent lengthwise of the last in directions away from the toe end thereof, and additional means constructed to prevent further movements of the grippers thereafter in the same directions by strain of the upper thereon irrespective of the positions of the grippers at the end of their movements.

110. In a lasting machine, lasting means for conforming the toe end of an upper to the contour of a last, said lasting means including grippers for gripping the marginal portion of the upper at the opposite sides of the forepart, operating means for imparting to said grippers movements lengthwise of the last in directions away from the toe end thereof, said operating means comprising parts relatively adjustable to permit a variable amount of lost motion between them and thus to vary the amount of movement imparted to the grippers, and stop mechanism for preventing further movements of the grippers in the same directions beyond the positions to which they are moved by said operating means, said stop mechanism comprising parts relatively movable into abutting relation to each other through variable distances inversely proportional to the amount of variable lost motion in said operating means.

111. In a lasting machine, lasting means for conforming the toe end of an upper to the contour of a last, said lasting means including grippers for gripping the marginal portion of the upper at the opposite sides of the forepart, operating means for imparting to said grippers movements lengthwise of the last in directions away from the toe end thereof, said operating means comprising rods connected respectively to the different grippers, sleeves movable along said rods, members mounted on the rods and arranged to be engaged by said sleeves to operate the rods, said members being adjustable along the rods to vary the time of their engagement by the sleeves, and devices arranged to serve as stops to limit movements of said members beyond fixed points irrespective of the adjustment of the members and thus to prevent further movements of the grippers beyond any points to which they are variably moved by the operating means.

112. In a lasting machine, the combination with means for shaping the toe end of an upper over a last, of jig pins arranged to extend heightwise of the last for engaging the upper in jig holes provided therein at the opposite sides of the forepart to position the upper in predetermined relation to said upper-shaping means, and means for supporting said jig pins in positions to receive the upper when the upper is presented to the machine.

113. In a lasting machine, the combination with toe-lasting means, of jig pins for engaging an upper in jig holes provided therein at the opposite sides of the forepart to position the upper in predetermined relation to said lasting means, and means supporting said jig pins in positions to receive the upper when the upper is presented to the machine, said supporting means being mounted for movement to present the upper to the lasting means.

114. In a lasting machine, the combination with toe-lasting means, of a last support movable to present a last to said lasting means, jig pins for engaging an upper in jig holes provided therein at the opposite sides of the forepart to position the upper in predetermined relation to the lasting means, and means supporting said jig pins in positions to receive the upper when the upper is presented to the machine, said supporting means being mounted for movement in the same direction as the last support to present the upper to the lasting means.

115. In a lasting machine, the combination with toe-lasting means, of a work carrier having means for supporting a last with an upper mounted thereon and movable in a direction lengthwise of the last to present the work to the lasting means, jig pins for engaging the upper in jig holes provided therein at the opposite sides of the forepart to position the upper in predetermined relation to the lasting means, and means supporting said jig pins independently of the work carrier in positions to receive the upper when the upper is presented to the machine, said jig pin supporting means being mounted for movement with the work carrier to present the work.

116. In a lasting machine, the combination with toe-lasting means, of a work carrier having means for supporting a last with an upper mounted thereon and movable in a direction lengthwise of the last to present the work to the lasting means, jig pins for engaging the upper in jig holes provided therein at the opposite sides of the forepart to position the upper in predetermined relation to the lasting means, slides supporting said jig pins for movements in the same direction as the work carrier, and means for moving said slides with the work carrier to present the work.

117. In a lasting machine, the combination with toe-lasting means, of a work carrier having means for supporting a last with an upper mounted thereon and movable in a direction lengthwise of the last to present the work to the lasting means, jig pins for engaging the upper in jig holes provided therein at the opposite sides of the forepart to position the upper in predetermined relation to the lasting means, means supporting said jig pins in positions to receive the upper when the work is presented to the machine, and mechanism for moving said jig pin supporting means relatively to the work carrier in a direction lengthwise of the last to take up slack in the upper and for thereafter moving said means with the work carrier to present the work.

118. In a lasting machine, the combination with toe-lasting means, of a work carrier having means for supporting a last with an upper mounted thereon and movable in a direction lengthwise of the last to present the work to the lasting means, jig pins for engaging the upper in jig holes provided therein at the opposite sides of the forepart to position the upper in predetermined relation to the lasting means, means supporting said jig pins in positions to receive the upper when the work is presented to the machine, and spring-operated mechanism for moving said jig pin supporting means lengthwise of the last relatively to the work carrier to take up slack in the upper and for thereafter moving said means with the work carrier to present the work.

119. In a lasting machine, the combination with toe-lasting means, of a work carrier having means for supporting a last with an upper mounted thereon and movable in a direction lengthwise of the last to present the work to the lasting means, jig pins for engaging the upper in jig holes provided therein at the opposite sides of the forepart to position the upper in predetermined relation to the lasting means, means for supporting said jig pins for movements in directions lengthwise of the last, spring-operated mechanism for moving said jig pin supporting means relatively to the work carrier to take up slack in the upper and for thereafter moving said means with the work carrier to present the work, and means for advancing said spring-operated mechanism from a normal retracted position into position to connect with the jig pin supporting means.

120. In a lasting machine, the combination with toe-lasting means, of a work carrier having means for supporting a last with an upper mounted thereon and movable in a direction lengthwise of the last to present the work to the lasting means, jig pins for engaging the upper in jig holes provided therein at the opposite sides of the forepart to position the upper in predetermined relation to the lasting means, means for supporting said jig pins mounted for movement in the same direction as the work carrier, spring-operated mechanism for moving said jig pin supporting means relatively to the work carrier to take up slack in the upper, and means controlled by movement of the work carrier for releasing the jig pin supporting means to the action of said spring-operated mechanism.

121. In a lasting machine, the combination with toe-lasting means, of a work carrier having means for supporting a last with an upper mounted thereon and movable in a direction lengthwise of the last to present the work to the lasting means, jig pins for engaging the upper in jig holes provided therein at the opposite sides of the forepart to position the upper in predetermined relation to the lasting means, means for supporting said jig pins mounted for movement in the same direction as the work carrier, spring-operated mechanism for moving said jig pin supporting means relatively to the work carrier to take up slack in the upper and for thereafter moving said means with the work carrier to present the work, and additional mechanism for moving said jig pin supporting means by the movement of the work carrier to insure the proper positioning of the jig pins relatively to the lasting means.

122. In a lasting machine, the combination with toe-lasting means, of a work carrier having means for supporting a last with an upper mounted thereon and movable in a direction lengthwise of the last to present the work to the lasting means, jig pins for engaging the upper in jig holes provided therein at the opposite sides of the forepart to position the upper in predetermined relation to the lasting means, means for supporting said jig pins mounted independently of the work carrier for movement in the same direction as said carrier, and connections between the work carrier and said supporting means for moving said means with the work carrier in presenting the work.

123. In a lasting machine, the combination with toe-lasting means, of a work carrier having means for supporting a last with an upper mounted thereon and movable in a direction lengthwise of the last to present the work to the lasting means, jig pins for engaging the upper in jig holes provided therein at the opposite sides of the forepart to position the upper in predetermined relation to the lasting means, slides supporting said jig pins and movable in the same direction as the work carrier, and connections between said slides and the work carrier for moving them with said carrier in presenting the work, the connections to each slide comprising parts relatively movable independently of the connections to the other slide in response to resistance to movement of the jig pin associated therewith.

124. In a lasting machine, the combination with toe-lasting means, of a work carrier having means for supporting a last with an upper mounted thereon and movable in a direction lengthwise of the last to present the work to the lasting means, jig pins for engaging the upper in jig holes provided therein at the opposite sides of the forepart to position the upper in predetermined relation to the lasting means, slides supporting said jig pins and movable in the same direction as the work carrier, links connected to said slides, and connections between said links and the work carrier for moving the slides with the work carrier, said connections including members frictionally engaging the links to permit them to slip along the links in response to resistance to movement of the jig pins by the slides.

125. In a lasting machine, the combination with toe-lasting means, of jig pins for engaging an upper in jig holes provided therein at the opposite sides of the forepart to position the toe end of the upper outspread in predetermined relation to said lasting means, means for holding said jig pins initially in positions comparatively near together to receive the upper, and means for thereafter spreading said jig pins apart to straighten the portion of the upper between them.

126. In a lasting machine, the combination with toe-lasting means, of jig pins for engaging an upper in jig holes provided therein at the opposite sides of the forepart to position the toe end of the upper outspread in predetermined relation to said lasting means, arms supporting said jig pins and mounted for swinging movements toward and from each other, spring means tending to swing said arms apart, and means for holding the arms initially with the jig pins in positions comparatively near each other to receive the upper and for thereafter releasing them to permit them to be swung apart by said spring means.

127. In a lasting machine, the combination with toe-lasting means, of jig pins for engaging an upper in jig holes provided therein at the opposite sides of the forepart to position the toe end of the upper outspread in predetermined relation to said lasting means, means supporting said jig pins and movable to carry them toward the lasting means, and mechanism controlled by the movement of said supporting means for holding the jig pins initially in positions comparatively near each other to receive the upper and for thereafter moving them apart to straighten the portion of the upper between them as they are carried toward the lasting means.

128. In a lasting machine, the combination with toe-lasting means, of jig pins for engaging an upper in jig holes provided therein at the opposite sides of the forepart to position the toe end of the upper outspread in predetermined relation to said lasting means, means supporting said jig pins and movable to carry them toward the lasting means, spring means tending to move said jig pins apart, and means for holding the pins initially in positions comparatively near each other to receive the upper and for releasing them to the action of said spring means as they are moved toward the lasting means.

129. In a lasting machine, the combination with toe-lasting means, of jig pins for engaging an upper in jig holes provided therein at the opposite sides of the forepart to position the toe end of the upper outspread in predetermined relation to said lasting means, means supporting said jig pins and movable to carry them toward the lasting means, said supporting means comprising arms mounted for swinging movements toward and from each other, spring means tending to swing said arms apart, and cam means for holding said arms initially in positions with the jig pins comparatively near each other to receive the upper and for releasing them to the action of said spring means as they are moved toward the lasting means.

130. In a lasting machine, the combination with toe-lasting means, of jig pins for engaging an upper in jig holes provided therein at the opposite sides of the forepart to position the toe end of the upper outspread in predetermined relation to said lasting means, means supporting said jig pins and movable to carry them toward the lasting means, spring means for moving said jig pins outwardly away from each other to straighten the portion of the upper between them as they are moved toward the lasting means, and devices for locking said jig pins against retractive movements from any positions to which they are moved by said spring means.

131. In a lasting machine, the combination with toe-lasting means, of jig pins for engaging an upper in jig holes provided therein at the opposite sides of the forepart to position the toe end of the upper outspread in predetermined relation to said lasting means, means supporting said jig pins and movable to carry them toward the lasting means, said supporting means comprising arms carrying the pins and mounted for swinging movements toward and from each other, spring means for swinging said arms apart as they are carried toward the lasting means, devices arranged to act on the arms to hold them against retractive movements from any positions to which they are swung by said spring means, and means for operating said devices to release the arms near the end of their movements toward the lasting means.

132. In a lasting machine, the combination with toe-lasting means, of a work carrier having means for supporting a last with an upper thereon and movable to present the work to the lasting means, jig pins for engaging the upper in jig holes provided therein at the opposite sides of the forepart to position the upper in predetermined relation to said lasting means, slides supporting said jig pins for movements with the work carrier to present the work, arms carrying the jig pins and mounted on said slides for swinging movements toward and from each other, spring means tending to swing said arms apart, and means for holding said arms in positions with the jig pins comparatively near each other when the slides are in their initial positions and for releasing the arms to the action of said spring means in response to the movements of the slides toward the lasting means.

133. In a lasting machine, the combination with toe-lasting means, of jig pins for engaging an upper in jig holes provided therein at the opposite sides of the forepart to position the upper in predetermined relation to said lasting means, means supporting said jig pins in positions to receive the upper when the upper is presented to the machine, said supporting means being mounted for movement to present the upper to the lasting means, and mechanism into operative relation to which said supporting means is moved in presenting the upper for withdrawing the jig pins from the holes in the upper.

134. In a lasting machine, the combination with toe-lasting means, of jig pins for engaging an upper in jig holes provided therein at the opposite sides of the forepart to position the upper in predetermined relation to said lasting means, and means for supporting said jig pins movable to carry them with the upper toward the lasting means, said supporting means including members movable relatively to other portions thereof to withdraw the jig pins from the holes in the upper.

135. In a lasting machine, the combination with toe-lasting means, of jig pins for engaging an upper in jig holes provided therein at the opposite sides of the forepart to position the upper in predetermined relation to said lasting means, and means for supporting said jig pins movable to carry them with the upper toward the lasting means to present the upper in position to be operated upon, said supporting means including members movable relatively to other portions thereof to withdraw the jig pins from the holes in the upper, spring means against the resistance of which said members are thus movable, and mechanism into operative relation to which said members are moved in presenting the upper for operating them to withdraw the jig pins.

136. In a lasting machine, the combination with toe-lasting means, of jig pins for engaging an upper in jig holes provided therein at the opposite sides of the forepart to position the upper in predetermined relation to said lasting means, and spring means for holding said jig pins in positions to engage the upper and against the resistance of which they are movable to withdraw them from the holes in the upper.

137. In a lasting machine, the combination with toe-lasting means, of jig pins for engaging an upper in jig holes provided therein at the opposite sides of the forepart to position the upper in predetermined relation to said lasting means, spring means for holding said jig pins in positions to engage the upper and against the resistance of which they are movable to withdraw them from the holes in the upper, means for thus withdrawing the jig pins, and latch mechanism for holding said pins in withdrawn positions.

138. In a lasting machine, the combination with toe-lasting means, of jig pins for engaging an upper in jig holes provided therein at the opposite sides of the forepart to position the upper in predetermined relation to said lasting means, slides for carrying said jig pins toward the lasting means to present the upper, and other slides movably mounted on said first-named slides for withdrawing the jig pins from the holes in the upper.

139. In a lasting machine, the combination with toe-lasting means, of jig pins for engaging an upper in jig holes provided therein at the opposite sides of the forepart to position the upper in predetermined relation to said lasting means, slides for carrying said jig pins toward the lasting means to present the upper, other slides movably mounted on said first-named slides for withdrawing the jig pins from the holes in the upper, and mechanism into operative relation to which said other slides are carried by the movement of said first-named slides for operating them to withdraw the jig pins.

140. In a lasting machine, the combination with toe-lasting means, of jig pins for engaging an upper in jig holes provided therein at the opposite sides of the forepart to position the upper in predetermined relation to said lasting means, slides for carrying said jig pins toward the lasting means to present the upper, other slides movably mounted on said first-named slides for withdrawing the jig pins from the holes in the upper, means for operating said other slides to withdraw the jig pins, and mechanism for controlling the return movement of said other slides as the first-named slides are withdrawn to their starting positions.

141. In a lasting machine, the combination with toe-lasting means, of jig pins for engaging an upper in jig. holes provided therein at the opposite sides of the forepart to position the upper in predetermined relation to said lasting means, members movable to carry said jig pins toward the lasting means to present the upper, slides movably mounted on said members for withdrawing the jig pins from the holes in the upper, rolls carried by said slides, and guiding means arranged to cooperate with said rolls to control the return movements of the slides as said members are returned to their starting positions.

142. In a lasting machine, the combination with toe-lasting means, of jig pins for engaging an upper in jig holes provided therein at the opposite sides of the forepart to position the upper in predetermined relation to said lasting means, members movable to carry said jig pins toward the lasting means to present the upper, slides movably mounted on said members for withdrawing the jig pins from the holes in the upper, springs against the resistance of which said slides are thus movable, latches for holding said slides against return movements, and means cooperating with said slides to control their return movements as said members are returned to their starting positions.

143. In a lasting machine, toe-lasting wipers for lasting the toes of uppers of different sizes, jig pins for engaging each upper in jig holes provided therein at the opposite sides of the forepart to position the upper in predetermined relation to the wipers, said wipers having slots therein to receive the jig pins, adjustable members adjacent to the wipers for engaging the jig pins to determine variably their positions in said slots for positioning uppers of different sizes, and automatic means for withdrawing said members from any adjusted positions in the course of the operation of the machine and for thereafter returning them to the positions from which they were withdrawn.

144. In a lasting machine, toe-lasting wipers for lasting the toes of uppers of different sizes, jig pins for engaging each upper in jig holes provided therein at the opposite sides of the forepart to position the upper in predetermined relation to the wipers, said wipers having slots therein to receive the jig pins, members adjacent to the wipers for engaging the jig pins to determine their positions in said slots, and mechanism for adjusting said members to vary the positions of the pins for positioning uppers of different sizes, parts of said adjusting mechanism being automatically movable relatively to other parts in the course of the operation of the machine to withdraw said members from any adjusted positions and thereafter to return them to the positions from which they were withdrawn.

145. In a lasting machine, toe-lasting wipers for lasting the toes of uppers of different sizes, jig pins for engaging each upper in jig holes provided therein at the opposite sides of the forepart to position the upper in predetermined relation to the wipers, said wipers having slots therein to receive the jig pins, members adjacent to the wipers for engaging the jig pins to determine their positions in said slots, mechanism for adjusting said members to vary the positions of the pins for positioning uppers of different sizes, said adjusting mechanism comprising parts rotatable in unison about the same axis to effect the adjustment, means for moving one of said parts relatively to the other lengthwise of said axis in the course of the operation of the machine, and a connection between said parts for turning one of them relatively to the other in response to such relative movement to withdraw said members from any adjusted positions and thereafter to return them to the positions from which they were withdrawn.

146. In a lasting machine, toe-lasting wipers for lasting the toes of uppers of different sizes, jig pins for engaging each upper in jig holes provided therein at the opposite sides of the forepart to position the upper in predetermined relation to the wipers, said wipers having slots therein to receive the jig pins, members adjacent to the wipers for engaging the jig pins to determine their positions in said slots, mechanism for adjusting said members to vary the positions of the pins for positioning uppers of different sizes, said adjusting mechanism comprising a shaft and a sleeve thereon rotatable in unison to effect the adjustment, means for moving the sleeve lengthwise of said shaft in the course of the operation of the machine, and a spiral slot-and-pin connection between the sleeve and the shaft for turning the shaft by such movement of the sleeve to withdraw said members from any adjusted positions and thereafter to return them to the positions from which they were withdrawn.

147. In a lasting machine, the combination with toe-lasting means, of work-presenting means movable to carry a last and an upper lengthwise toward said lasting means with the toe portion of the upper outspread, and a device movable with said work-presenting means for supporting the upper at the end of the toe and guiding it into proper relation to the lasting means.

148. In a lasting machine, the combination with toe-lasting means, of work-presenting means movable to carry a last and an upper thereon lengthwise toward said lasting means with the toe portion of the upper outspread, and a device supported independently of said work-presenting means but movable therewith for supporting the upper at the end of the toe and guiding it into proper relation to the lasting means.

149. In a lasting machine, the combination with toe-lasting means, of work-presenting means movable to carry a last and an upper thereon lengthwise toward said lasting means with the toe portion of the upper outspread, a device supported independently of said work-presenting means for supporting the toe end of the upper and guiding it into proper relation to the lasting means, and mechanism for advancing said device toward the work-presenting means into upper supporting position.

150. In a lasting machine, the combination with toe-lasting means, of work-presenting means movable to carry a last and an upper thereon lengthwise toward said lasting means with the toe portion of the upper outspread, a device supported independently of said work-presenting means but movable therewith for supporting the toe end of the upper and guiding it into proper relation to the lasting means, means movable by the operator to advance said device from a normal retracted position into upper-supporting position, and mechanism for then connecting said device to the work-presenting means to coordinate its movement with that of said means.

151. In a lasting machine, the combination with toe-lasting means, of work-presenting means movable to carry a last and an upper thereon lengthwise toward said lasting means with the toe portion of the upper outspread, a device supported independently of said work-presenting means for supporting the upper at the end of the toe and guiding it into proper relation to the lasting means, means movable by the operator to advance said device from a normal retracted position into upper-supporting position, spring means for thereafter returning the device in supporting relation to the upper, and mechanism for coordinating such return movement of the device with the movement of the work-presenting means.

152. In a lasting machine, the combination with toe-lasting means, of work-presenting means movable to carry a last and an upper thereon lengthwise toward said lasting means with the toe portion of the upper outspread, and a device movable from a normal retracted position into position to support the toe end of the upper and thereafter reversely movable with the work-presenting means for guiding the upper into proper relation to the lasting means, said device comprising a plurality of fingers arranged to underlie the toe portion of the upper.

153. In a lasting machine, the combination with toe-lasting means, of work-presenting means comprising jig pins arranged to engage an upper in jig holes provided therein at the opposite sides of the forepart and movable to present the toe portion of the upper outspread to said lasting means, and a device mounted for movement with said jig pins for supporting the upper at the end of the toe and guiding it into proper relation to the lasting means.

154. In a lasting machine, the combination with toe-lasting means, of work-presenting means comprising jig pins for engaging an upper in jig holes provided therein at the opposite sides of the forepart, means for supporting said jig pins movable to carry them with the upper toward the lasting means, and a device mounted independently of said supporting means but movable therewith for supporting the toe end of the upper and guiding it into proper relation to the lasting means.

155. In a lasting machine, the combination with toe-lasting means, of work-presenting means comprising jig pins for engaging an upper in jig holes provided therein at the opposite sides of the forepart, means for supporting said jig pins movable to carry them with the upper toward the lasting means, a device movable from a normal retracted position into position to support the toe end of the upper for guiding it into proper relation to the lasting means, mechanism for connecting said device to said jig pin supporting means, and spring means arranged to impart to said device its return movement and also to act through said connecting mechanism to move the jig pins with the upper toward the lasting means.

156. In a lasting machine, end-lasting means comprising mechanism for applying around an end of a shoe an upper-holding binder having loops previously formed at its ends, and means for driving fastenings through said loops to fasten the binder to the shoe.

157. In a lasting machine, end-lasting means comprising wipers for wiping the marginal portion of an upper inwardly over an insole on a last around an end of the last, said wipers being constructed to apply to the upper a preformed binder having loops at its ends to receive fastenings for fastening the binder to the shoe.

158. In a lasting machine, end-lasting means comprising wipers for wiping the marginal portion of an upper inwardly over an insole on a last around an end of the last, said wipers being constructed to apply to the upper a preformed binder having loops at its ends, and means for driving fastenings through said loops to fasten the binder to the shoe.

159. In a lasting machine, end-lasting means comprising wipers for wiping the marginal portion of an upper inwardly over an insole on a last around an end of the last, said wipers having in their wiping edges a groove formed to position a binder having loops at its ends to adapt them to apply the binder to the upper, and means for driving fastenings through said loops to fasten the binder to the shoe.

160. In a lasting machine, end-lasting means comprising wipers for wiping the marginal portion of an upper inwardly over an insole on a last around an end of the last, said wipers having in their wiping edges a groove formed to position a binder having loops at its ends to adapt them to apply the binder to the upper and having also at their wiping edges notches arranged to aline with said loops to receive fastenings driven through the loops for fastening the binder to the shoe.

161. In a lasting machine, end-lasting means comprising wipers for wiping the marginal portion of an upper inwardly over an insole on a last around an end of the last, said wipers having in their wiping edges a groove formed to position a binder having loops at its ends to adapt them to apply the binder to the upper and having also at their wiping edges notches arranged to aline with said loops to receive fastenings driven through the loops for fastening the binder to the shoe, and automatic means for driving fastenings in said notches through the loops to fasten the binder.

162. In a lasting machine, wipers for wiping the marginal portion of an upper inwardly over an insole on a last around an end of the last, said wipers being formed to apply an upper-holding binder to the upper, and devices movable relatively to the wipers into positions to drive fastenings at the opposite sides of the shoe bottom to fasten the binder to the shoe, said devices and the wipers being constructed for interengagement to determine the positions of the devices widthwise of the shoe.

163. In a lasting machine, wipers for wiping the marginal portion of an upper inwardly over an insole on a last around an end of the last, said wipers being formed to apply an upper-holding binder to the upper, and devices movable relatively to the wipers into positions to drive fastenings at the opposite sides of the shoe bottom to fasten the binder to the shoe, said devices and the wipers being constructed to interlock with each other to determine the relation between them with respect to relative movements both widthwise and lengthwise of the shoe.

164. In a lasting machine, wipers for wiping the marginal portion of an upper inwardly over an insole on a last around an end of the last, said wipers having in their wiping edges a groove formed to position a binder provided with loops at its ends and having also in their wiping edges notches to receive fastenings driven through said loops for fastening the binder to the shoe, and fastening-inserting devices movable relatively to the wipers into positions to drive fastenings through said loops, said devices and the wipers being constructed for interengagement to determine the positions of the devices with respect to movements along the plane of the wipers.

165. In a lasting machine, wipers for wiping the marginal portion of an upper inwardly over an insole on a last around an end of the last, said wipers having in their wiping edges a groove formed to position a binder provided with loops at its ends and having also in their wiping edges notches to receive fastenings driven through said loops for fastening the binder to the shoe, and fastening-inserting devices movable relatively to the wipers into positions to drive fastenings through said loops, the wipers having slots therein and said devices having means thereon arranged to engage the wipers in said slots to determine their positions relatively to the wipers when the fastenings are driven.

166. In a lasting machine, wipers for wiping the marginal portion of an upper inwardly over an insole on a last around an end of the last, said wipers having in their wiping edges a groove formed to position a binder provided with loops at its ends and having also in their wiping edges notches to receive fastenings driven through said loops for fastening the binder to the shoe, and fastening-inserting devices movable relatively to the wipers heightwise and widthwise of the shoe into positions to drive fastenings through said loops, the wipers having slots therein and said devices having projections arranged to enter said slots and to engage the wipers in the slots to determine their positions relatively to the wipers when the fastenings are driven.

167. In a lasting machine, the combination with end-lasting mechanism having means for applying to a shoe an upper-holding binder having loops at its ends to receive fastenings to fasten the binder to the shoe, of means for forming a binder with such loops at its ends and for presenting the binder in position to be applied to the shoe by said lasting mechanism.

168. In a lasting machine, means for forming an upper-holding binder having loops at its ends to receive fastenings to fasten the binder to a shoe, and means for applying said binder around an end of a shoe to hold the upper in lasted position.

169. In a lasting machine, means for forming an upper-holding binder having loops at its ends to receive fastenings to fasten the binder to a shoe, means for wiping an upper into lasted position around an end of a shoe and for applying said binder to the upper, and devices constructed and arranged to drive fastenings through the loops in the binder to fasten the binder to the shoe.

170. In a lasting machine, the combination with end-lasting mechanism having means for applying to a shoe an upper-holding binder having loops at its ends to receive fastenings to fasten the binder to the shoe, of means for severing a section of binder wire from a source of supply to serve as a binder, and mechanism for bending the ends of said binder to form loops to receive the fastenings.

171. In a lasting machine, the combination with end-lasting mechanism having means for applying to a shoe an upper-holding binder having loops at its ends to receive fastenings to fasten the binder to the shoe, of means for severing a section of binder wire from a source of supply to serve as a binder, and mechanism for bending the ends of the binder to form said loops and for presenting the binder to the end-lasting mechanism.

172. In a lasting machine, the combination with end-lasting mechanism having means for applying to a shoe an upper-holding binder having loops at its ends to receive fastenings to fasten the binder to the shoe, of means for severing a section of binder wire from a source of supply to serve as a binder, a device for presenting the binder to said end-lasting mechanism, and means for delivering the binder to said presenting device, said device being provided with means for bending the ends of the binder to form the loops.

173. In a lasting machine, the combination with end-lasting mechanism having means for applying to a shoe an upper-holding binder, of a device movable to present the binder to said end-lasting mechanism and having means thereon for supporting the binder in curved shape, means for severing a section of binder wire from a source of supply to serve as a binder, and mechanism for delivering the binder to said binder-presenting device, said mechanism being constructed to bend the binder into said curved shape.

174. In a lasting machine, the combination with end-lasting mechanism having means for applying to a shoe an upper-holding binder, of a device movable to present the binder to said end-lasting mechanism and having means thereon for supporting the binder in curved shape, means for severing a section of binder wire from a source of supply to serve as a binder, and mechanism for delivering the binder to said binder-presenting device comprising members mounted for bodily movements and also for swinging movements to deliver the binder while bending it into said curved shape.

175. In a lasting machine, the combination with end-lasting mechanism having means for applying to a shoe an upper-holding binder having loops at its ends to receive fastenings to fasten the binder to the shoe, of means for presenting a binder to said end-lasting mechanism, said binder-presenting means being constructed to form the loops at the ends of the binder.

176. In a lasting machine, the combination with end-lasting wipers having in their wiping edges a groove formed to position an upper-holding binder having loops at its ends to adapt them to apply the binder to the shoe, and means for driving fastenings through said loops to fasten the binder to the shoe, of means for presenting a binder in said groove in the wipers, said binder-presenting means being constructed to form the loops at the ends of the binder.

177. In a lasting machine, the combination with end-lasting wipers having in their wiping edges a groove formed to position an upper-holding binder having loops at its ends to adapt them to apply the binder to the shoe, and means for driving fastenings through said loops to fasten the binder to the shoe, of means for forcing a binder into said groove in the wipers, pins arranged to extend transversely of the plane of the wipers and to engage the end portions of the binder, and means for bending said end portions of the binder around the pins to form the loops.

178. In a lasting machine, the combination with end-lasting wipers having in their wiping edges a groove formed to position an upper-holding binder having loops at its ends and having also in their wiping edges notches to receive fastenings driven through said loops to fasten the binder to the shoe, of means for forcing a binder into said groove in the wipers, pins arranged to force portions of the binder into said notches, and means for bending the end portions of the binder about said pins to form the loops.

179. A device for presenting an upper-holding binder to end-lasting wipers, said device comprising a plurality of members relatively movable to adjust themselves to the edges of the wipers and having slots therein to receive and support the binder, and means for moving the binder out of said slots and presenting it to the wipers.

180. A device for presenting an upper-holding binder to end-lasting wipers, said device comprising a plurality of members relatively movable to adjust themselves to the edges of the wipers and having slots therein to receive and support the binder, and a plurality of pushers mounted in said members and movable to push the binder out of said slots and present it to the wipers.

181. A device for presenting an upper-holding binder to end-lasting wipers, said device comprising a plurality of members relatively movable to adjust themselves to the edges of the wipers and having slots therein to receive and support the binder, a plurality of pushers movable to transfer the binder from said members to the wipers, and an operating device movable to force said members against the edges of the wipers and further movable to operate the pushers.

182. A device for presenting an upper-holding binder to end-lasting wipers, said device comprising a plurality of binder-controlling members relatively movable to adjust themselves to the edges of the wipers, a plurality of pushers for transferring the binder from said members to the wipers, an operating device movable to force said members against the edges of the wipers and further movable thereafter relatively to said members, and pawl-and-ratchet mechanism for operating the pushers by such further movement of the operating device.

183. A device for presenting an upper-holding binder to end-lasting wipers, said device comprising a plurality of binder-controlling members relatively movable to adjust themselves to the edges of the wipers, a plurality of pushers for transferring the binder from said members to the wipers, an operating device movable to force said members against the edges of the wipers and further movable thereafter relatively to said members, and mechanism arranged to connect with the pushers in such further movement of the operating device for operating them by the movement of said device.

184. A device for presenting an upper-holding binder to end-lasting wipers, said device comprising a plurality of binder-controlling members relatively movable to adjust themselves to the edges of the wipers, a plurality of pushers for transferring the binder from said members to the wipers, lengthwise movable bars connected to said members, an operating device frictionally engaging said bars for operating them to force said members against the edges of the wipers and movable thereafter along the bars, and means for operating the pushers by the movement of said operating device along the bars.

185. A device for presenting an upper-holding binder to end-lasting wipers, said device comprising a plurality of binder-controlling fingers relatively movable to adjust themselves to the edges of the wipers, a plurality of pushers for transferring the binder from said fingers to the wipers, lengthwise movable bars connected to said fingers, members movable along said bars to operate the pushers, an operating device frictionally engaging said bars for operating them to force the fingers against the edges of the wipers and further movable thereafter along the bars, and mechanism arranged to connect with said pusher-operating members in such further movement of the operating device to operate the pushers by the movement of said device.

186. A device for presenting an upper-holding binder to end-lasting wipers, said device comprising binder-controlling means constructed to position the binder in curved shape along the edges of the wipers prior to the operation of the device thereon, and means for transferring the binder from said controlling means to the wipers.

187. A device for presenting an upper-holding binder to end-lasting wipers, said device comprising binder-controlling members having slots therein arranged to receive the binder and to position it in curved shape along the edges of the wipers prior to the operation of the device thereon, and means for pushing the binder out of said slots and presenting it to the wipers.

188. A device for presenting an upper-holding binder to end-lasting wipers, said device comprising a plurality of members arranged to engage the edges of the wipers and having their wiper-engaging faces normally lying substantially tangent to a curve corresponding approximately to the curve of the edges of the wipers, said members being constructed to support the binder in curved shape near said faces, and means for transferring the binder from said members to the wipers.

189. A device for presenting an upper-holding binder to end-lasting wipers, said device comprising a plurality of fingers arranged with their end faces normally lying substantially tangent to a curve corresponding approximately to the curve of the edges of the wipers and having slots in their ends to receive and support the binder in curved shape, and means for pushing the binder out of said slots and presenting it to the wipers.

190. A device for presenting an upper-holding binder in a groove in the edges of end-lasting wipers, said device comprising a plurality of fingers arranged to engage the edges of the wipers and having slots therein to receive and position the binder, a plurality of pushers movable to push the binder from said slots into the groove in the wipers, and mechanism for operating said pushers including springs yieldable respectively in response to resistance of the wipers to movements of the different pushers.

191. A device for presenting an upper-holding binder in a groove in the edges of end-lasting wipers, said device comprising a plurality of members constructed to receive and position the binder and relatively movable to adjust themselves to the edges of the wipers, a plurality of pushers movable to push the binder from said members into the groove in the wipers, an operating device movable to force said members against the edges of the wipers and further movable thereafter relatively to the members, and means for operating the pushers by such further movement of the operating device, said means including springs associated respectively with the different pushers and separately yieldable in response to resistance of the wipers to movements of the pushers.

192. A device for presenting an upper-holding binder in a groove in the edges of end-lasting wipers, said device comprising means for supporting and positioning the binder, a plurality of pushers movable forwardly in substantially parallel directions to force the binder into the groove in the wipers and relatively movable to adjust themselves to the wipers, and means for operating some of said pushers to force the intermediate portion of the binder into said groove and clamp it therein prior to the effective action of the other pushers on the binder.

193. A device for presenting an upper-holding binder in a groove in the edges of end-lasting wipers, said device comprising a plurality of fingers arranged to engage the edges of the wipers and having slots therein to receive and position the binder, a plurality of pushers mounted in said fingers for movements to push the binder from said slots into the groove in the wipers, and mechanism for operating said pushers, said mechanism being constructed to impart operative movements to some of the pushers to force the intermediate portion of the binder into the groove in the wipers prior to the operative movements of the other pushers.

194. A device for presenting an upper-holding binder to end-lasting wipers, said device comprising a plurality of members constructed to receive and position the binder and relatively movable in substantially parallel directions to adjust themselves to the edges of the wipers, other binder-positioning members mounted for swinging movements laterally of the wipers into engagement with the wiper edges, and means for transferring the binder from all said members to the wipers.

195. A device for presenting an upper-holding binder to end-lasting wipers, said device comprising a plurality of fingers relatively movable lengthwise to adjust themselves to the edges of the wipers and having slots therein to receive and support the binder, arms mounted for swinging movements laterally of the wipers and constructed to receive and support portions of the binder beyond said fingers, an operating member movable to force said fingers against the wipers and further movable to swing said arms against the wipers, and means for transferring the binder from said fingers and arms to the wipers.

196. A device for presenting an upper-holding binder to end-lasting wipers, said device comprising means for receiving and positioning the binder, means for transferring the binder from said positioning means to the wipers, and mechanism for forming loops at the end portions of the binder to receive fastenings for fastening the binder to the shoe.

197. A device for presenting an upper-holding binder to end-lasting wipers, said device comprising means for receiving and positioning the binder, means for transferring the binder from said positioning means to the wipers, pins arranged to engage the end portions of the binder, and means for bending said end portions of the binder about the pins to form loops to receive fastenings for fastening the binder to the shoe.

198. A device for presenting an upper-holding binder in a groove in the edges of end-lasting wipers, said device comprising means for pushing a portion of the binder into said groove, pins arranged to engage the end portions of the binder at the edges of the wipers, and means movable to bend the end portions of the binder about said pins to form loops to receive fastenings for fastening the binder to the shoe.

199. A device for presenting an upper-holding binder in a groove in the edges of end-lasting wipers, said device comprising means for pushing a portion of the binder into said groove, pins arranged to engage the end portions of the binder and to force them into notches at the edges of the wipers, and members movable to bend the end portions of the binder about said pins to form loops in alinement with said notches and also to force portions of the binder adjacent to said loops into the groove in the wipers.

200. A device for presenting an upper-holding binder in a groove in the edges of end-lasting wipers, said device comprising means for pushing a portion of the binder into said groove, members arranged to support the end portions of the binder adjacent to the edges of the wipers, pins associated with said members and arranged to extend transversely of the plane of the wipers in engagement with the binder, and members movable to bend the end portions of the binder about said pins to form loops to receive fastenings for fastening the binder to the shoe.

201. A device for presenting an upper-holding binder in a groove in the edges of end-lasting wipers, said device comprising means for pushing a portion of the binder into said groove, members arranged to support the end portions of the binder adjacent to the edges of the wipers, pins associated with said members and movable relatively to them to force portions of the binder into notches formed at the edges of the wipers, and members movable to bend the end portions of the binder about said pins to form loops in alinement with said notches to receive fastenings for fastening the binder to the shoe.

202. A device for presenting an upper-holding binder in a groove in the edges of end-lasting wipers, said device comprising means for forcing a portion of the binder into said groove, pins arranged to engage the end portions of the binder, arms supporting said pins and mounted for swinging movements to cause the pins to force the portions of the binder that they engage into notches at the edges of the wipers, spring-controlled members associated with said arms for supporting the end portions of the binder and movable with the arms into engagement with the edges of the wipers, and pushers movable along said spring-controlled members to bend the end portions of the binder about said pins to form loops in alinement with said notches to receive fastenings for fastening the binder to the shoe.

203. A device for presenting an upper-holding binder in a groove in the edges of end-lasting wipers, said device comprising means for forcing a portion of the binder into said groove, pins arranged to engage the end portions of the binder at the edges of the wipers, members movable forwardly to bend the end portions of the binder about said pins and also to force portions of the binder adjacent to the pins into the groove in the wipers, and spring-controlled means for forcing said members yieldingly outward toward the edges of the wipers in their forward movements.

204. A device for presenting an upper-holding binder in a groove in the edges of end-lasting wipers, said device comprising means for forcing a portion of the binder into said groove, pins arranged to engage the end portions of the binder at the edges of the wipers, members movable forwardly to bend the end portions of the binder about said pins and also to force portions of the binder adjacent to the pins into the groove in the wipers, arms connected to said members for swinging movements with them laterally of the wipers, and yieldable cam means arranged to act on said arms to force the members outwardly toward the edges of the wipers in their forward movements.

205. A device for presenting an upper-holding binder in a groove in the edges of end-lasting wipers, said device comprising means for forcing a portion of the binder into said groove, pins arranged to engage the end portions of the binder at the edges of the wipers, members movable forwardly to bend the end portions of the binder about said pins and also to force portions of the binder adjacent to the pins into the groove in the wipers, spring-controlled means arranged to force said members yieldingly outward toward the edges of the wipers in their forward movements, and mechanism for rendering said spring-controlled means ineffective on the members prior to the retractive movements of the members.

206. A device for presenting an upper-holding binder in a groove in the edges of end-lasting wipers, said device comprising means for forcing a portion of the binder into said groove, pins arranged to engage the end portions of the binder at the edges of the wipers, members movable forwardly to bend the end portions of the binder about said pins and also to force portions of the binder adjacent to the pins into the groove in the wipers, arms connected to said members and mounted for swinging movements with them laterally of the wipers, spring means arranged to act on said arms to force the members yieldingly outward toward the edges of the wipers in their forward movements, and mechanism for disconnecting said members from the arms to relieve their outward pressure on the binder prior to their retractive movements.

207. A device for presenting an upper-holding binder in a groove in the edges of end-lasting wipers, said device comprising means for forcing a portion of the binder into said groove, pins arranged to engage the end portions of the binder at the edges of the wipers, members movable forwardly to bend the end portions of the binder about said pins and also to force portions of the binder adjacent to the pins into the groove in the wipers, arms mounted for swinging movements with said members laterally of the wipers, locking devices arranged to connect the arms to said members, spring means arranged to act on said arms to force the members outwardly toward the edges of the wipers in their forward movements, and abutments arranged to act on said locking devices to disconnect the arms from said members substantially at the end of their forward movements.

208. A device for presenting an upper-holding binder in a groove in the edges of end-lasting wipers, said device comprising members movable forwardly along portions of the edges of the wipers while in contact with the binder to force the end portions of the binder into said groove, and spring-controlled means arranged to act on said members in their forward movements to urge them yieldingly outward toward the edges of the wipers.

209. A device for presenting an upper-holding binder in a groove in the edges of end-lasting wipers, said device comprising binder-engaging members movable forwardly along portions of the edges of the wipers while in contact with the binder to force the end portions of the binder into said groove, and spring-controlled cam members yieldingly movable inwardly toward each other and arranged to act on said binder-engaging members in their forward movements to urge them outwardly toward the edges of the wipers.

210. A device for presenting an upper-holding binder in a groove in the edges of end-lasting wipers, said device comprising members movable forwardly along portions of the edges of the wipers while in contact with the binder to force the end portions of the binder into said groove, spring-controlled cam means arranged to urge said members yieldingly outward toward the edges of the wipers in their forward movements, and means for releasing said members from the control of said cam means substantially at the end of their forward movements.

211. A device for presenting an upper-holding binder in a groove in the edges of end-lasting wipers, said device comprising an operating member movable forwardly toward the wipers, mechanism arranged to be operated by the movement of said member to force a portion of the binder into the groove in the wipers, and means arranged to be operated by further movement of said member in the same direction to form loops at the ends of the binder.

212. A device for presenting an upper-holding binder in a groove in the edges of end-lasting wipers, said device comprising an operating member movable forwardly toward the wipers, mechanism arranged to be operated by the movement of said member to force a portion of the binder into the groove in the wipers, pins movable to force portions of the binder into notches at the edges of the wipers in response to further movement of said operating member in the same direction, and members arranged to be operated by still further movement of said operating member to bend the end portions of the binder about said pins.

213. A device for presenting an upper-holding binder in a groove in the edges of end-lasting wipers, said device comprising means for forcing a portion of the binder into said groove, members arranged to engage the end portions of the binder, means for bending the end portions of the binder about said members to form loops, and means for thereafter withdrawing said members from the loops.

214. A device for presenting an upper-holding binder in a groove in the edges of end-lasting wipers, said device comprising means for forcing a portion of the binder into said groove, pins arranged to engage the end portions of the binder in notches at the edges of the wipers, members movable to bend the end portions of the binder about said pins to form loops, and means for withdrawing the pins from the loops.

215. A device for presenting an upper-holding binder in a groove in the edges of end-lasting wipers, said device comprising an operating member movable to force the binder into said groove, pins arranged to engage the end portions of the binder, members arranged to be operated by the movement of said operating member to bend the end portions of the binder about said pins to form loops, and means for withdrawing said pins from the loops in response to further movement of said operating member in the same direction.

216. A device for presenting an upper-holding binder in a groove in the edges of end-lasting wipers, said device comprising an operating member movable to force the binder into said groove, pins arranged to engage the end portions of the binder, members arranged to be operated by the movement of said operating member to bend the end portions of the binder about said pins to form loops, devices for controlling said pins, and arms mounted for swinging movements in response to further movement of said operating member in the same direction and having cam means thereon arranged to act on said devices to withdraw the pins from the loops.

217. A device for presenting an upper-holding binder in a groove in the edges of end-lasting wipers, said device comprising pins arranged to engage the end portions of the binder at the edges of the wipers, means for bending the end portions of the binder about said pins to form loops, levers connected to said pins for moving them lengthwise, and means for operating said levers to withdraw the pins from the loops.

218. A device for presenting an upper-holding binder in a groove in the edges of end-lasting wipers, said device comprising pins arranged to engage the end portions of the binder at the edges of the wipers, means for bending the end portions of the binder about said pins to form loops, levers connected to said pins for moving them lengthwise, plungers arranged to act on said levers, and cams for moving said plungers to operate the levers and thereby withdraw the pins from the loops.

219. A device for presenting an upper-holding binder in a groove in the edges of end-lasting wipers, said device comprising pins arranged to engage the end portions of the binder, arms mounted for swinging movements to carry the pins into notches at the edges of the wipers, means for bending the end portions of the binder about said pins to form loops, levers supported on said arms for controlling the pins, and means for operating said levers to withdraw the pins from the loops.

220. A device for presenting an upper-holding binder in a groove in the edges of end-lasting wipers, said device comprising an operating member movable forwardly toward the wipers, pins arranged to engage the end portions of the binder and movable into notches at the edges of the wipers in response to the movement of said operating member, means also operated by said member for bending the end portions of the binder about said pins to form loops, devices associated with said pins for moving them lengthwise, and means for operating said devices to withdraw the pins from the loops by further movement of said operating member after the forming of the loops.

221. A device for presenting an upper-holding binder to end-lasting mechanism, said device including an operating member movable forwardly toward said lasting mechanism relatively to other portions of the device to present the binder, a handle on said member for operating it and for use also by the operator to effect preliminarily a forward positioning movement of the device as a whole, and means for locking said member against operative movement until the device is properly positioned and for then releasing it to permit its movement.

222. A device for presenting an upper-holding binder to end-lasting mechanism, said device including an operating member movable forwardly toward said lasting mechanism relatively to other portions of the device to present the binder, a handle on said member for operating it and for use also by the operator to effect preliminarily a forward positioning movement of the device as a whole, and means for locking said member against operative movement until the device is properly positioned, said locking means being movable to release the member as an incident to the positioning movement of the device.

223. A device for presenting an upper-holding binder in a groove in the edges of end-lasting wipers, said device including an operating member movable forwardly toward the wipers relatively to other portions of the device to present the binder, a handle on said member for operating it and for use also by the operator to effect preliminarily a forward positioning movement of the device as a whole, and means for locking said member against operative movement until the device is properly positioned, said locking means being movable to release the member in response to action of the wipers thereon in the forward movement of the device.

224. A device for presenting an upper-holding binder in a groove in the edges of end-lasting wipers, said device including an operating member movable forwardly toward the wipers relatively to other portions of the device to present the binder, a handle on said member for operating it and for use also by the operator to effect preliminarily a forward positioning movement of the device as a whole, and means for locking said member against operative movement until the device is properly positioned, said locking means comprising a bell-crank lever having one arm arranged to act as a stop for said member and another arm arranged to be engaged by the wipers to swing the lever into position to release the member.

225. In mechanism for use in lasting shoes, the combination with a binder-presenting device movable to present an upper-holding binder to end-lasting means, of manually operated means for feeding binder wire, and mechanism movable by the operator independently of said wire-feeding means to sever a section of the wire to serve as a binder and to deliver it to the binder-presenting device.

226. In mechanism for use in lasting shoes, the combination with a binder-presenting device movable to present an upper-holding binder to end-lasting means, of means for feeding binder wire, a hand lever for imparting to said wire-feeding means feeding movement of predetermined extent, a cutter for severing from the wire a section to serve as a binder, means movable to deliver the binder to the binder-presenting device, and a treadle for operating said cutter and binder-delivering means.

227. In mechanism for use in lasting shoes, the combination with a binder-presenting device movable to present an upper-holding binder to end-lasting means and constructed to support the binder in curved shape, of means for severing a section of binder wire from a source of supply to serve as a binder, and mechanism movable to deliver the binder to said binder-presenting device while bending it into said curved shape.

228. In mechanism for use in lasting shoes, the combination with a binder-presenting device movable to present an upper-holding binder to end-lasting means and constructed to support the binder in curved shape, of means for severing a section of binder wire from a source of supply to serve as a binder, and mechanism for delivering the binder to said binder-presenting device, said mechanism comprising plates having curved binder-engaging edges and mounted for both bodily movements and swinging movements to deliver the binder.

229. In mechanism for use in lasting shoes, the combination with a binder-presenting device movable to present an upper-holding binder to end-lasting means and constructed to support the binder in curved shape, of means for severing a section of binder wire from a source of supply to serve as a binder, plates having curved binder-engaging edges for delivering the binder to said binder-presenting device, means for imparting bodily movements to said plates to deliver the binder, and means for swinging said plates relatively to each other to complete the delivery of the end portions of the binder.

230. In mechanism for use in lasting shoes, the combination with a binder-presenting device movable to present an upper-holding binder to end-lasting means and constructed to support the binder in curved shape, of means for severing a section of binder wire from a source of supply to serve as a binder, plates having curved binder-engaging edges for delivering the binder to said binder-presenting device, means for imparting bodily movements to said plates to deliver the binder, the plates being mounted for swinging movements relatively to each other in the plane thereof, and means into engagement of which portions of said plates are carried for imparting to them such swinging movements to complete the delivery of the end portions of the binder.

231. In mechanism for use in lasting shoes, the combination with a binder-presenting device movable to present an upper-holding binder to end-lasting means, of means for severing a section of binder wire from a source of supply to serve as a binder, and means for delivering the binder to said binder-presenting device comprising a member movable to clamp the intermediate portion of the binder against said device and additional mechanism for thereafter completing the delivery of the binder.

232. In mechanism for use in lasting shoes, the combination with a binder-presenting device movable to present an upper-holding binder to end-lasting means and constructed to support the binder in curved shape, of means for severing a section of binder wire from a source of supply to serve as a binder, a member movable to force the intermediate portion of the binder against said binder-presenting device and to clamp it yieldingly thereon, and additional members movable to deliver other portions of the binder thereafter to said device while bending it into said curved shape.

233. In mechanism for use in lasting shoes, the combination with a binder-presenting device movable to present an upper-holding binder to end-lasting means, of means for feeding binder wire, members for guiding the wire as it is fed, means for severing a section of the wire to serve as a binder, and means movable to deliver the binder to said binder-presenting device, said binder-guiding members being located in the path of the binder-delivering means and displaceable by the action of said means thereon.

234. In mechanism for use in lasting shoes, the combination with a portable binder-presenting device for presenting an upper-holding binder to end-lasting means, of means for delivering a binder to said binder-presenting device, retaining mechanism for holding said device in position to receive the binder, and means for operating said retaining mechanism to release the device.

235. In mechanism for use in lasting shoes, the combination with a portable binder-presenting device for presenting an upper-holding binder to end-lasting means, of means for delivering a binder to said binder-presenting device, retaining mechanism for holding said device in position to receive the binder, means for feeding binder wire to provide the next binder for delivery to said device, and means for operating said retaining mechanism to release the device by the movement of said wire-feeding means.

236. In mechanism for use in lasting shoes, the combination with a portable binder-presenting device for presenting an upper-holding binder to end-lasting means, of means for delivering a binder to said binder-presenting device, spring means against the resistance of which said device is movable by the operator into position to receive the binder, and latch mechanism for holding the device in that position.

237. In mechanism for use in lasting shoes, the combination with a portable binder-presenting device for presenting an upper-holding binder to end-lasting means, of means for delivering a binder to said binder-presenting device, a spring-controlled member yieldingly movable in response to action of said device thereon while assisting in guiding the device as the operator moves it into position to receive the binder, latch mechanism for holding the device in that position, and means for operating said latch mechanism to release the device, said spring-controlled member being arranged to impart to the device a limited forward movement when it is thus released.

238. In mechanism for use in lasting shoes, means for feeding binder wire, means for severing from the wire a section to serve as a binder for holding an upper in lasted position around an end of a shoe, and mechanism for bending the end portions of said binder to provide loops to receive fastenings driven through the loops to fasten the binder to the shoe.

239. In mechanism for use in lasting shoes, means for feeding binder wire, means for severing from the wire a section to serve as a binder for holding an upper in lasted position around an end of a shoe, and means for forming at the ends of said binder loops to receive fastenings for fastening the binder to the shoe, said loop-forming means comprising pins for engaging the binder and members movable to bend the end portions of the binder about said pins.

240. In mechanism for use in lasting shoes, means for feeding binder wire, means for severing from the wire a section to serve as a binder for holding an upper in lasted position around an end of a shoe, members for engaging the end portions of the binder, means for bending the end portions of the binder about said members to form loops to receive fastenings for fastening the binder to the shoe, and mechanism for withdrawing said members from the loops after the forming of the loops.

241. In a lasting machine, means for lasting the toe portion of a shoe, additional means supported independently of said toe-lasting means for working the shoe upper into lasted position from the toe portion substantially as far rearwardly as the ball line, said additional means comprising mechanism for working the upper heightwise of the last by frictional contact therewith in locations opposite the side faces of the last, and means for inserting fastenings to fasten in lasted position the portion of the upper acted upon by said additional means.

242. In a lasting machine, means for lasting the toe portion of a shoe, additional means for working the shoe upper into lasted position from the toe portion substantially as far rearwardly as the ball line, said additional means comprising mechanism for pressing the upper against the top of the forepart of the last and for working the upper heightwise of the last by frictional contact therewith in locations opposite the side faces of the last, and means for inserting fastenings to fasten in lasted position the portion of the upper acted upon by said additional means.

243. In a lasting machine, means for working the toe portion of an upper into lasted position and for applying and fastening a binder about the toe to hold the upper in lasted position, additional means for conforming the upper to the contour of the last and for working it heightwise of the last by frictional contact therewith in locations opposite the side faces of the last between the toe portion and the ball line, and means for fastening in lasted position the portion of the upper acted upon by said additional means.

244. In a lasting machine, means for conforming the toe portion of an upper to the contour of a last and for working its margin into lasted relation to the lip of an insole on the last and fastening it in that relation, additional means for conforming the upper to the contour of the last by frictional contact therewith in locations opposite the side faces of the last between the toe portion and the ball line, and means for working the margin of the portion of the upper acted upon by said additional means into lasted relation to the lip of the insole and for fastening it in that relation.

245. In a lasting machine, means for working the toe portion of an upper into lasted relation to a last and to the lip of an insole on the last and for applying a binder about the toe to hold the upper in lasted position, mechanism for inserting fastenings to fasten the binder, means for pressing the upper against the top of the forepart of the last and for working it into lasted relation to the last and the insole between the toe portion and the ball line, and mechanism for inserting fastenings to fasten in lasted position the portion of the upper acted upon by said last-named means.

246. In a lasting machine, toe-embracing wipers for wiping the marginal portion of the toe end of an upper into lasted relation to an insole, means for fastening the toe portion of the upper in lasted position, means arranged to act beyond the ends of said wipers to work the upper heightwise of the last by frictional contact therewith in locations opposite the side faces of the last between the toe portion and the ball line and also to lay the marginal portion of the upper over the insole, and mechanism for inserting fastenings to fasten in lasted position the portion of the upper acted upon by said last-named means.

247. In a lasting machine, toe-embracing wipers for wiping the marginal portion of the toe end of an upper into lasted relation to an insole, means for fastening the toe portion of the upper in lasted position, means for pressing the upper against the top of the forepart of the last and for working it heightwise of the last by frictional contact therewith in locations opposite the side faces of the last between the toe portion and the ball line, wipers movable inwardly over the shoe bottom beyond the ends of said toe-embracing wipers to wipe the marginal portion of the upper over the insole, and mechanism for inserting fastenings to fasten the upper acted upon by said last-named wipers.

248. In a lasting machine, toe-embracing wipers for wiping the marginal portion of the toe end of an upper into lasted relation to an insole, means for fastening the toe portion of the upper in lasted position, means for pressing the upper against the top of the forepart of the last and for working it heightwise of the last by frictional contact therewith in locations opposite the side faces of the last between the toe portion and the ball line, and wiping and tacking devices movable inwardly beyond the ends of said toe-embracing wipers to wipe the margin of the upper over the insole between the toe portion and the ball line, said devices having means for driving tacks to fasten the upper in lasted position.

249. In a lasting machine, means for clamping the marginal portion of the toe end of an upper outspread and for conforming it to the contour of the toe end of a last by pulling it heightwise of the last through said clamped margin, means for thereafter laying the marginal portion of the toe end of the upper in lasted relation to an insole on the last, and separately controlled means for conforming the upper to the contour of the last and laying its margin over the insole in locations between the toe portion and the ball line.

250. In a lasting machine, means for clamping the marginal portion of the toe end of an upper outspread and for conforming it to the contour of the toe end of a last by pulling it heightwise of the last through said clamped margin, means for thereafter laying the marginal portion of the toe end of the upper in lasted relation to an insole on the last and for fastening it in that relation, separately controlled means for working the upper into conformity to the contour of the last and insole between the toe portion and the ball line, and mechanism for fastening in lasted position the portion of the upper acted upon by said last-named means.

251. In a lasting machine, means for clamping the marginal portion of the toe end of an upper outspread, means for moving a last heightwise relatively to said clamping means to conform the toe end of the upper to the contour of the last, means for thereafter laying the marginal portion of the toe end of the upper inwardly over an insole on the last, and separately controlled means for conforming the upper to the contour of the last and laying its margin over the insole between the toe portion and the ball line.

252. In a lasting machine, means for clamping the marginal portion of the toe end of an upper outspread, means for moving a last heightwise relatively to said clamping means to conform the toe end of the upper to the contour of the last, means for thereafter laying the marginal portion of the toe end of the upper inwardly over an insole on the last and for fastening it in lasted position, and additional means for shaping the upper over the last and insole and fastening it to the insole between the toe portion and the ball line.

253. In a lasting machine, means for clamping the marginal portion of the toe end of an upper outspread, means for moving a last heightwise relatively to said clamping means to conform the toe end of the upper to the contour of the last, means for thereafter wiping the marginal portion of the toe end of the upper inwardly over an insole on the last, and separately controlled means for working the upper heightwise of the last by frictional contact therewith in locations opposite the side faces of the last and for laying its margin over the insole between the toe portion and the ball line.

254. In a lasting machine, means for clamping the marginal portion of the toe end of an upper mounted on a last, mechanism for effecting relative movement of said clamping means and the last lengthwise of the last to stretch the upper, means for also conforming the toe portion of the upper to the contour of the last and for laying its margin over an insole on the last, and separately controlled means for conforming the upper to the contour of the last and laying its margin over the insole between the toe portion and the ball line.

255. In a lasting machine, means for clamping the marginal portion of the toe end of an upper mounted on a last, mechanism for effecting relative movement of said clamping means and the last lengthwise of the last to stretch the upper, means for also conforming the toe portion of the upper to the contour of the last and for laying its margin over an insole on the last; additional means for conforming the upper to the contour of the last and laying its margin over the insole between the toe portion and the ball line, and mechanism for inserting fastenings to fasten the portion of the upper acted upon by said additional means.

256. In a lasting machine, means for clamping the marginal portion of the toe end of an upper mounted on a last, mechanism for moving the last lengthwise relatively to said clamping means to stretch the upper and for also moving it heightwise to conform the toe portion of the upper to the contour of the last, means for laying the marginal portion of the toe end of the upper inwardly over an insole on the last and fastening it, and additional means for conforming the upper to the contour of the last and insole and for fastening it between the toe portion and the ball line.

257. In a lasting machine, means for conforming an upper to the contour of the toe end of a last, means for thereafter laying the marginal portion of the toe end of the upper inwardly over an insole on the last, and mechanism movable heightwise of the last to conform the upper to the contour of the last between the toe portion and the ball line as the marginal portion of the toe end of the upper is being laid inwardly over the insole.

258. In a lasting machine, means for conforming an upper to the contour of the toe end of a last, wipers for thereafter wiping the marginal portion of the toe end of the upper inwardly over an insole on the last, and mechanism movable heightwise of the last to conform the upper to the contour of the last between the toe portion and the ball line by frictional contact therewith as the toe wipers are thus operating.

259. In a lasting machine, means for clamping the marginal portion of the toe end of an upper mounted on a last, means for moving the last heightwise relatively to said clamping means to conform the upper to the toe end of the last, wipers for thereafter wiping the marginal portion of the toe end of the upper inwardly over an insole on the last, and mechanism for partially conforming the upper to the contour of the last between the toe portion and the ball line in the heightwise movement of the last, said mechanism being movable thereafter heightwise of the last to complete its conforming operation as the toe wipers are operating to wipe the upper over the insole.

260. In a lasting machine, the combination with means for lasting the toe portion of an upper over a last, and mechanism for imparting to the last movement in a direction heightwise thereof relatively to said toe-lasting means in the lasting operation, of means for conforming the upper to the contour of the forepart of the last rearwardly of its toe portion by frictional contact therewith, and mechanism automatically operative in the course of said heightwise movement of the last to move said conforming means heightwise of the last in the opposite direction.

261. In a lasting machine, the combination with means for lasting the toe portion of an upper over a last, and mechanism for imparting to the last movement in a direction heightwise thereof relatively to said toe-lasting means in the lasting operation, of means for conforming the upper to the contour of the forepart of the last rearwardly of its toe portion comprising devices arranged to act frictionally on the upper at the opposite sides of the last to work it heightwise of the last, and mechanism automatically operative in the course of said heightwise movement of the last to move said conforming means heightwise of the last in the opposite direction and thereafter to move said devices farther heightwise of the last while the last is stationary.

262. In a lasting machine, the combination with means for lasting the toe portion of an upper over a last, of separately controlled means for conforming the forepart of the upper to the contour of the last rearwardly of the toe portion, said conforming means comprising a flexible elastic band arranged to extend across the top of the forepart of the last, and members connected to the ends of said band for wrapping the band about the last and pulling it heightwise of the last, said members being pivotally mounted for movements toward and from each other.

263. In a lasting machine, the combination with means for lasting the toe portion of an upper over a last, of separately controlled means for conforming the forepart of the upper to the contour of the last rearwardly of the toe portion, said conforming means comprising a flexible elastic band arranged to extend across the top of the forepart of the last, members to which the opposite ends of said band are fastened for wrapping the band about the last and pulling it heightwise of the last, and arms supporting said members and mounted for swinging movements toward and from each other, said members being mounted to turn relatively to the arms about axes extending heightwise of the last to permit them to adjust themselves to the last.

264. In a lasting machine, the combination with means for lasting the toe portion of an upper over a last, of separately controlled means for conforming the forepart of the upper to the contour of the last rearwardly of the toe portion, said conforming means comprising a flexible elastic band arranged to extend across the top of the forepart of the last, members arranged to act on said band to wrap it about the last and pull it heightwise of the last, and a member for engaging and pressing said band against the upper at the top of the forepart of the last.

265. In a lasting machine, the combination with means for lasting the toe portion of an upper over a last, of separately controlled means for conforming the forepart of the upper to the contour of the last rearwardly of the toe portion, said conforming means comprising a flexible elastic band arranged to extend across the top of the forepart of the last, means connected to said band for wrapping it about the last and pulling it heightwise of the last, a member arranged to press said band against the upper at the top of the forepart of the last, and a spring controlling said member and yieldable in response to pressure of the last on the member.

266. In a lasting machine, the combination with means for lasting the toe portion of an upper over a last, of separately controlled means for conforming the forepart of the upper to the contour of the last rearwardly of the toe portion, said conforming means comprising a flexible elastic band arranged to extend across the top of the forepart of the last, members movable heightwise of the last to wrap the band about the last and pull it heightwise of the last, a support for said members movable with them, a member carried by said support for pressing the band against the upper at the top of the forepart of the last, and a spring controlling said pressing member and yieldable in response to pressure of the last on said member.

267. In a lasting machine, the combination with means for lasting the toe portion of an upper over a last, of separately controlled means for conforming the forepart of the upper to the contour of the last rearwardly of the toe portion, said conforming means comprising a flexible elastic band arranged to extend across the top of the forepart of the last, means for wrapping said band about the last and pulling it heightwise of the last, and members arranged to engage and to wipe heightwise of the last portions of the upper located nearer the edge of the last bottom than the portion engaged by said band.

268. In a lasting machine, the combination with means for lasting the toe portion of an upper over a last, of separately controlled means for conforming the forepart of the upper to the contour of the last rearwardly of the toe portion, said conforming means comprising a flexible elastic band arranged to extend across the top of the forepart of the last, members connected to the ends of said band for wrapping it about the last by relative movement between them and the last in a direction heightwise of the last, members arranged to engage and to wipe heightwise of the last portions of the upper located nearer the edge of the last bottom than the portion engaged by said band, and spring means against the resistance of which said last-named members are movable apart in response to wedging action of the shoe thereon.

269. In a lasting machine, the combination with means for lasting the toe portion of an upper over a last, of separately controlled means for conforming the forepart of the upper to the contour of the last rearwardly of the toe portion, said conforming means comprising a flexible elastic band arranged to extend across the top of the forepart of the last, members connected to the ends of said band, a support for said members movable heightwise of the last to wrap the band about the last, members for engaging and wiping heightwise of the last portions of the upper located nearer the edge of the last bottom than the portion engaged by said band, arms carried by said support and on which said wiping members are mounted, and spring means against the resistance of which said arms are movable apart in response to wedging action of the shoe on said wiping members.

270. In a lasting machine, the combination with means for lasting the toe portion of an upper over a last, of separately controlled means for conforming the forepart of the upper to the contour of the last rearwardly of the toe portion, said conforming means comprising a flexible elastic band arranged to extend across the top of the forepart of the last, means connected to said band for wrapping it about the last and pulling it heightwise of the last, members arranged to engage and wipe heightwise of the last portions of the upper located nearer the edge of the last bottom than the portion engaged by said band, and other members movable widthwise of the last to lay the marginal portion of the upper over an insole on the last.

271. In a lasting machine, the combination with means for lasting the toe portion of an upper over a last, of separately controlled means for conforming the forepart of the upper to the contour of the last rearwardly of the toe portion, said conforming means comprising a flexible elastic band arranged to extend across the top of the forepart of the last, means connected to said band for wrapping it about the last and pulling it heightwise of the last, members arranged to engage and to wipe heightwise of the last portions of the upper located nearer the edge of the last bottom than the portion engaged by said band, and overlaying and fastening devices movable widthwise of the last to lay the marginal portion of the upper over an insole on the last, said devices including means for inserting fastenings to fasten the upper to the insole.

272. In a lasting machine, the combination with means for lasting the toe portion of an upper over a last, of additional means comprising a flexible elastic band for conforming the forepart of the upper to the contour of the last rearpart of the toe portion, members for laying inwardly over an insole on the last the margin of the portion of the upper acted upon by said band, and means for inserting fastenings to fasten said overlaid margin to the insole.

273. In a lasting machine, the combination with means for lasting the toe portion of an upper over a last, of additional means for conforming the forepart of the upper to the contour of the last rearwardly of the toe portion, said conforming means comprising a flexible elastic band arranged to extend across the top of the forepart of the last, upwiping devices arranged to engage and to wipe heightwise of the last portions of the upper located nearer the edge of the last bottom than the portion engaged by said band, overlaying and fastening mechanisms movable widthwise of the last to lay the margin of the upper over an insole on the last and including spring-operated drivers arranged to be tripped for driving fastenings to fasten the upper, and means controlled by engagement with said upwiping devices for tripping said drivers.

274. In a lasting machine, the combination with toe-lasting means comprising toe-embracing wipers for wiping the marginal portion of an upper around the toe into lasted relation to an insole on a last, of additional means for conforming the forepart of the upper to the contour of the last rearwardly of the toe portion comprising mechanism for working the upper heightwise of the last by frictional contact therewith in locations opposite the side faces of the last, upper-fastening mechanisms movable inwardly toward the sides of the last and including spring-operated drivers arranged to be tripped for driving fastenings to fasten the portion of the upper acted upon by said additional means, and means for tripping said drivers in response to the inward movements of said fastening mechanisms.

275. In a lasting machine, the combination with means for lasting the toe portion of an upper over a last, of a work carrier movable in a direction lengthwise of the last to present the last with the upper thereon to said toe-lasting means, additional means for conforming the upper to the contour of the forepart of the last at the rear of the toe portion, and devices mounted for movements widthwise of the last into positions to insert fastenings for fastening the portion of the upper acted upon by said additional means.

276. In a lasting machine, the combination with means for lasting the toe portion of an upper over a last, of a work carrier movable in a direction lengthwise of the last to present the last with the upper thereon to said toe-lasting means, additional means for conforming the upper to the contour of the forepart of the last at the rear of the toe portion, slides mounted for movements inwardly toward the last at the opposite sides thereof, and mechanisms carried by said slides for laying over the bottom of the last the margin of the portion of the upper acted upon by said additional means and for driving fastenings to fasten said margin.

277. In a lasting machine, means for conforming the forepart of an upper to the contour of a last at the rear of the toe portion, said means comprising a flexible elastic band arranged to extend across the top of the forepart of the last, arms connected to the ends of said band and mounted for swinging movements toward and from each other about axes extending lengthwise of the last, means for effecting relative movement of said arms and the last heightwise of the last to wrap the band about the last, and a member arranged to engage and press said band against the upper at the top of the forepart of the last.

278. In a lasting machine, the combination with a toe rest for engaging an upper at the top of the toe end of a last, of means for conforming the upper to the contour of the last at the rear of the toe portion, said means comprising a flexible elastic band arranged to extend across the top of the forepart of the last at the rear of the toe rest, and means for effecting relative movement of the last and said band heightwise of the last to wrap the band about the last.

279. In a lasting machine, the combination with a toe rest for engaging an upper at the top of the toe end of a last, of means for conforming the upper to the contour of the last at the rear of the toe portion, said means comprising a flexible elastic band arranged to extend across the top of the forepart of the last at the rear of the toe rest, means for wrapping the band about the last, and a member arranged to engage and press said band against the upper at the top of the forepart of the last.

280. In a lasting machine, means for conforming an upper to the contour of the forepart of a last, said means comprising a flexible elastic band arranged to extend across the top of the forepart of the last, a support for said band movable heightwise of the last to wrap the band about the last, and means carried by said support for pressing the band against the upper at the top of the forepart.

281. In a lasting machine, means for conforming an upper to the contour of the forepart of a last, said means comprising a flexible elastic band arranged to extend across the top of the forepart of the last, arms connected to the ends of said band and mounted for swinging movements toward and from each other about axes extending lengthwise of the last, and means for limiting movements of the arms toward each other, said band being arranged to maintain the arms initially at such limits of movement by its resilience.

282. In a lasting machine, means for conforming an upper to the contour of the forepart of a last, said means comprising a flexible elastic band arranged to extend across the top of the forepart of the last, means connected to said band for wrapping it about the last and pulling it heightwise of the last, and members arranged to engage and to wipe heightwise of the last portions of the upper located nearer the edge of the last bottom than the portion engaged by said band.

283. In a lasting machine, means for conforming an upper to the contour of the forepart of a last, said means comprising a flexible elastic band arranged to extend across the top of the forepart of the last, means connected to said band for wrapping it about the last and pulling it heightwise of the last, members arranged to engage and to wipe heightwise of the last portions of the upper located nearer the edge of the last bottom than the portion engaged by said band, and spring means tending to move said members toward each other and against the resistance of which they are movable apart in response to wedging action of the shoe thereon.

284. In a lasting machine, means for conforming an upper to the contour of the forepart of a last, said means comprising a flexible elastic band arranged to extend across the top of the forepart of the last, arms mounted for swinging movements toward and from each other and connected to the ends of said band for wrapping it about the last, members arranged to engage and to wipe heightwise of the last portions of the upper located nearer the edge of the last bottom than the portion engaged by said band, arms supporting said members and mounted for swinging movements toward and from each other, and spring means tending to swing said last-named arms toward each other.

285. In a lasting machine, means for conforming an upper to the contour of the forepart of a last, said means comprising a flexible elastic band arranged to extend across the top of the forepart of the last, a support for the ends of said band movable heightwise of the last to wrap the band about the last, and spring-controlled members carried by said support and arranged to engage and to wipe heightwise of the last portions of the upper located nearer the edge of the last bottom than the portion engaged by said band.

286. In a lasting machine, means for conforming an upper to the contour of a last, said means comprising a flexible elastic band arranged to extend across the top of the last, mechanism for effecting relative movement of the last and said band heightwise of the last to wrap the band about the last, and means for laying over the bottom of the last the margin of the portion of the upper acted upon by said band and for driving fastenings to fasten said margin.

287. In a lasting machine, means for conforming an upper to the contour of a last, said means comprising a flexible elastic band arranged to extend across the top of the last, mechanism for effecting relative movement of the last and said band heightwise of the last to wrap the band about the last, and overlaying and fastening devices movable inwardly at the opposite sides of the last to lay over the bottom of the last the margin of the portion of the upper acted upon by said band, said devices including means for driving fastenings to fasten said margin.

288. In a lasting machine, means for conforming an upper to the contour of a last, said means comprising a flexible elastic band arranged to extend across the top of the last, means connected to the ends of said band for wrapping it about the last and pulling it heightwise of the last, members arranged to engage and to wipe heightwise of the last portions of the upper located nearer the edge of the last bottom than the portion engaged by said band, and means for inserting fastenings to fasten over the bottom of the last the margin of the portion of the upper acted upon by said members.

289. In a lasting machine, means for conforming an upper to the contour of a last, said means comprising a flexible elastic band arranged to extend across the top of the last, means connected to the ends of said band for wrapping it about the last and pulling it heightwise of the last, members arranged to engage and to wipe heightwise of the last portions of the upper located nearer the edge of the last bottom than the portions engaged by said band, and overlaying and fastening devices movable inwardly at the opposite sides of the last to lay over the bottom of the last the margin of the portion of the upper acted upon by said members, said devices including means for driving fastenings to fasten said margin.

290. In a lasting machine, a member movable inwardly over the bottom of a last to lay the marginal portion of an upper over the last bottom, said member being yieldingly movable heightwise of the last in response to wedging action of the last thereon, and means for holding said member against return movement heightwise of the last as it is retracted from over the last bottom.

291. In a lasting machine, a member for laying the marginal portion of an upper inwardly over the bottom of a last, means for moving said member inwardly over the last bottom and for thereafter retracting it from over the last bottom, said member being yieldingly movable heightwise of the last in response to wedging action of the last thereon in its inward movement, a device for holding said member against return movement heightwise of the last as it is retracted from over the last bottom, and automatic means to cause said device thereafter to release the member.

292. In a lasting machine, a wiper for wiping the marginal portion of an upper inwardly over an insole on a last, means for moving said wiper inwardly over the shoe bottom and for thereafter retracting it from over the shoe bottom, a spring against resistance of which said wiper is mounted for tipping movement heightwise of the last in response to wedging action of the shoe thereon in its inward movement, and a device arranged to hold said wiper against reverse tipping movement as it is retracted from over the shoe bottom.

293. In a lasting machine, a wiper for wiping the marginal portion of an upper inwardly over an insole on a last, means for moving said wiper inwardly over the shoe bottom and for thereafter retracting it from over the shoe bottom, a spring against the resistance of which said wiper is mounted for tipping movement heightwise of the last in response to wedging action of the shoe thereon in its inward movement, a pawl and ratchet device arranged to hold said wiper against reverse tipping movement as it is retracted from over the shoe bottom, and means arranged to act on said pawl and ratchet device near the end of the retractive movement of the wiper to cause it to release the wiper.

294. In a lasting machine, a wiper for wiping the marginal portion of an upper inwardly over an insole on a last, a member on which said wiper is mounted, a support for said member movable toward the shoe to carry the wiper inwardly over the shoe bottom and movable thereafter away from the shoe to retract the wiper from over the shoe bottom, said member being mounted on its support for turning movement to permit the wiper to be tipped heightwise of the shoe by wedging action of the shoe thereon in its inward movement over the shoe bottom, a spring against the resistance of which said member is thus movable, a device for holding the member against return movement about its axis as the wiper is withdrawn from over the shoe bottom, and automatic means to cause said device thereafter to release the member.

295. In a lasting machine, a wiper for wiping the marginal portion of an upper inwardly over an insole on a last, a member on which said wiper is mounted, a support for said member movable toward the shoe to carry the wiper inwardly over the shoe bottom and movable thereafter away from the shoe to retract the wiper from over the shoe bottom, said member being mounted on its support for turning movement to permit the wiper to be tipped heightwise of the shoe by wedging action of the shoe thereon in its inward movement over the shoe bottom, a spring against the resistance of which said member is thus movable, pawl and ratchet mechanism on said member and support for holding the member against reverse turning movement as the wiper is retracted from over the shoe bottom, and means arranged to act in the movement of said support away from the shoe to cause the pawl and ratchet mechanism to release said member.

296. In a lasting machine, a support movable toward and from a shoe, a member carried by said support and having a wiper and fastening-inserting means thereon, said member being mounted on the support for turning movement in response to wedging action of the shoe on the wiper, a spring against the resistance of which the member is thus movable, and a device for holding the member against return movement by said spring as the support is moved away from the shoe.

297. In a lasting machine, the combination with means for shaping an upper over a last, of upper-fastening mechanism comprising a spring-operated driver, a latch for holding the driver retracted against the resistance of its spring, a support for said driver and latch movable to carry them inwardly toward the shoe, and a member movable with said support to a position determined by the shoe, said member being arranged to act on the latch to release the driver as the driver and latch are carried farther inwardly after said member is stopped by the shoe.

298. In a lasting machine, the combination with means for shaping an upper over a last, of upper-fastening mechanism comprising a spring-operated driver, a latch for holding the driver retracted against the resistance of its spring, a slide movable inwardly toward the shoe and carrying said driver and latch, and a member movably mounted on said slide and arranged to be carried by the slide to a position determined by the shoe, said member having means thereon for then operating said latch to release the driver as the driver and latch are carried farther inwardly by the slide.

299. In a lasting machine, the combination with means for shaping an upper over a last, of upper-fastening mechanism movable inwardly toward the shoe, said mechanism comprising a driver, a spring-operated arm mounted for swinging movement and connected to the driver to operate it, another arm mounted to swing with said first-named arm and extending at an angle thereto, a latch for engaging said other arm to hold the driver retracted, means for operating said latch to release the driver in response to the inward movement of the upper-fastening mechanism toward the shoe, and means for engaging said other arm to retract the driver into position to be held by the latch in response to the outward movement of the mechanism away from the shoe.

300. In a lasting machine, the combination with means for lasting the toe end of an upper over a last and an insole and against a lip on the insole, of a device arranged to engage the inner face of the insole lip at the toe to support the lip against pressure in the lasting operation, a spring for moving said device in a direction lengthwise of the last toward the toe-lasting means, and mechanism arranged to hold the device initially retracted against the resistance of said spring and for releasing the device to permit its movement by the spring after the work has been presented to the machine.

301. In a lasting machine, the combination with means for lasting the toe end of an upper over a last and an insole and against a lip on the insole, of a toe-end gage arranged to act as a stop to determine the lengthwise position of the last, a device arranged to engage the inner face of the insole lip at the toe to support the lip against pressure in the lasting operation, and means for moving said device in a direction lengthwise of the last toward said end gage after the work has been presented to the machine.

302. In a lasting machine, the combination with means for lasting the toe end of an upper over a last and an insole and against a lip on the insole, of a toe-end gage arranged to act as a stop to determine the lengthwise position of the last, a device arranged to engage the inner face of the insole lip at the toe to support the lip against pressure in the lasting operation, a spring for moving said device in a direction lengthwise of the last toward said end gage, and a member arranged to hold the device initially retracted against the resistance of said spring and movable to release the device and permit its movement by the spring.

303. In a lasting machine, the combination with means for lasting the toe end of an upper over a last and an insole and against a lip on the insole, of a toe-end gage arranged to act as a stop to determine the lengthwise position of the last, a device arranged to engage the inner face of the insole lip at the sides of the toe to determine the lateral position of the toe end of the last and also to support the lip at the end and the sides of the toe against pressure in the lasting operation, and means for moving said device in a direction lengthwise of the last toward said end gage after the work has been presented to the machine.

ERIC A. HOLMGREN.